United States Patent [19]

Christain et al.

[11] 4,322,581
[45] Mar. 30, 1982

[54] MULTIFUNCTION TELEPHONE WITH MESSAGE INFORMATION AND CONTROL INFORMATION CIRCUITS FOR CONNECTING STATIONS AND COMMON EQUIPMENT IN A TELEPHONE NETWORK

[75] Inventors: Ronald W. Christain, Longwood; Barry Slingsby, Altomante Springs, both of Fla.

[73] Assignee: Stromberg-Carlson Corporation, Orlando, Fla.

[21] Appl. No.: 120,571

[22] Filed: Feb. 11, 1980

[51] Int. Cl.³ ............................................. H04Q 5/18
[52] U.S. Cl. ............................... 179/18 ES; 179/99 M; 179/18 AD
[58] Field of Search ............ 179/18 ES, 18 AD, 18 J, 179/99 M, 99 P, 99 R, 84 R

[56] References Cited

U.S. PATENT DOCUMENTS

| | | | |
|---|---|---|---|
| 3,973,085 | 8/1976 | Shiff | 179/99 M |
| 4,061,887 | 12/1977 | Kasson et al. | 179/18 J |
| 4,125,749 | 11/1978 | Kinoshita et al. | 179/18 J |
| 4,160,131 | 7/1979 | Kaul et al. | 179/99 M |
| 4,203,011 | 5/1980 | Coviello | 179/99 P |
| 4,211,895 | 7/1980 | Davis et al. | 179/18 J |

OTHER PUBLICATIONS

"ITT Electronic Key Telephones", F-482-1 (1-77) 2M Issue 1, Jan., 1977.
"Electronic Key Telephone", Soles Bulletin ITT Telecommunications Apparatus Dept. vol. No. III, Issue No. 23 11-30-77.
"Novakey Data Controlled Key System", *Electrical Communication*, vol. 52, No. 4, 1977, Howett and Sarby.

*Primary Examiner*—Gerald L. Brigance
*Attorney, Agent, or Firm*—Cesari and McKenna

[57] ABSTRACT

A private telephone network that includes multifunction telephones. Multifunction telephones are connected to common equipment by a voice signal path and a data signal path. Supervisory information passes over the data signal path in the form of polled messages that are sent from the common equipment to the telephone. Sense information is received by the common equipment from the telephone. The transmission is by frequency modulation, such as frequency-shift-keying modulation, techniques. At the multifunction telephone, a programmed microcomputer contains three blocks of instructions for enabling the microcomputer to perform background operations, to respond to the initial receipt of a message, and to thereafter transmit and decode the message. Further, in response to the decoding block of instructions, that are provided on a fixed time basis, the microcomputer is able to transmit frequency-shift-keyed signals without the need for a separate frequency-shift-keyed transmitter.

38 Claims, 72 Drawing Figures

CENTRAL LOCATION 10
COMMON EQUIPMENT 12

FIG. 3 MULTIPLE FUNCTION TELEPHONE 16A

PHASE LOOP RECEIVER AND
TRANSMIT DRIVER
54

TONE RINGER 63

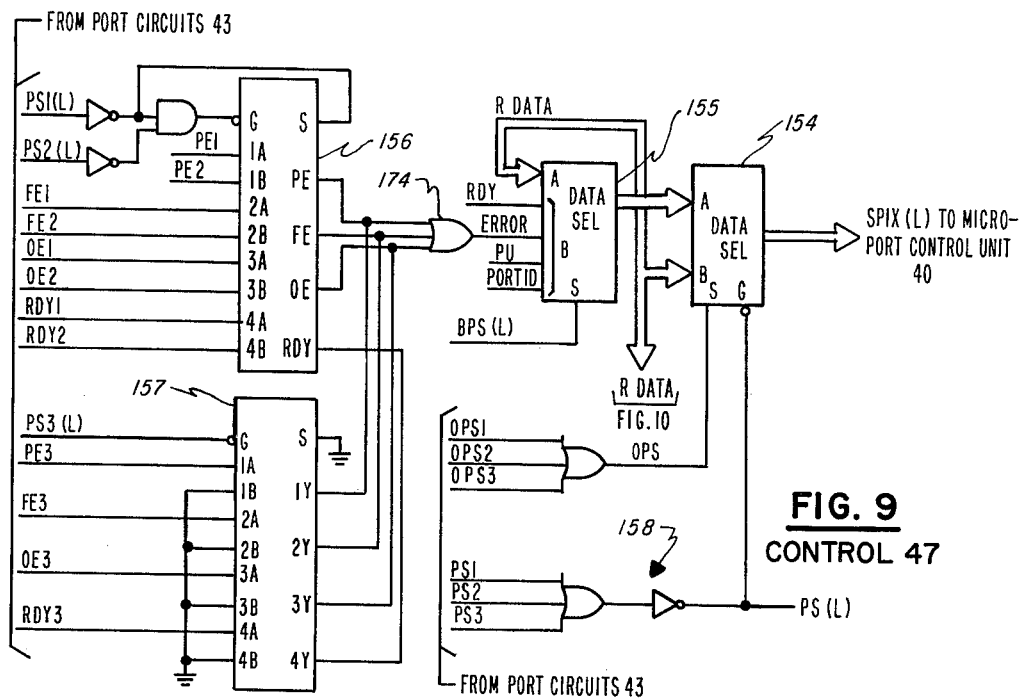
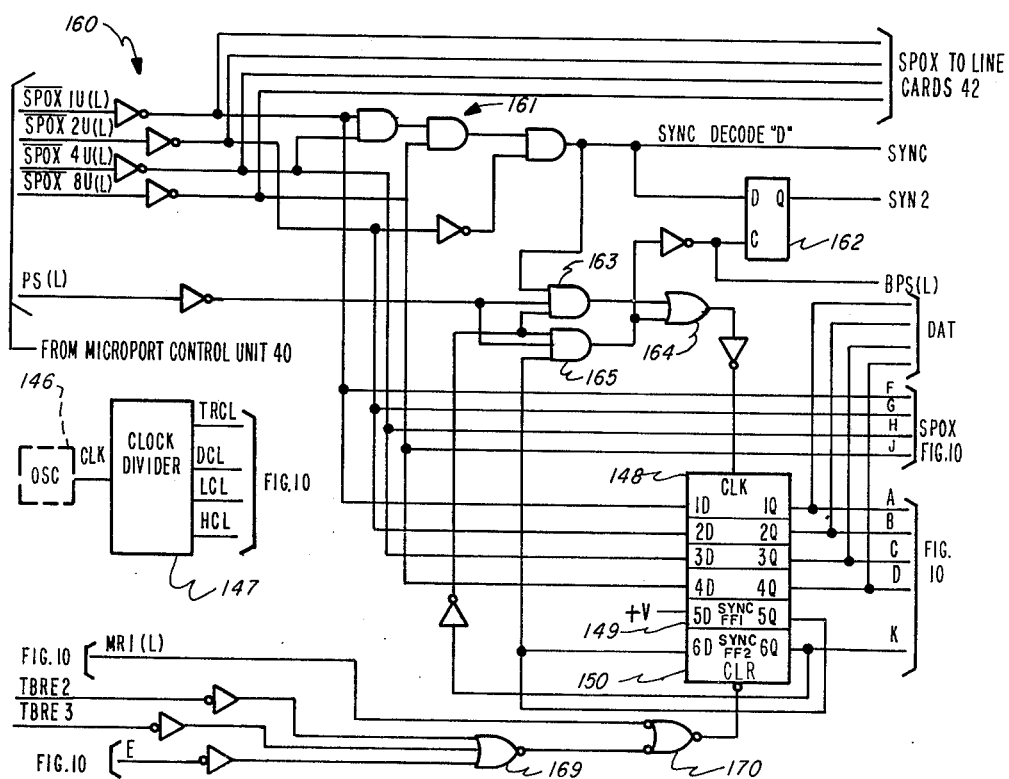
FIG. 9
CONTROL 47

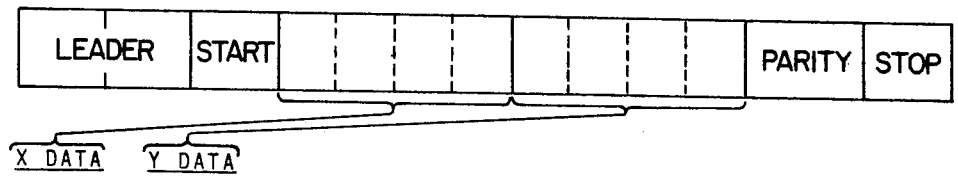

| X DATA | Y DATA | COMMAND MESSAGE | STATUS MESSAGE |
|---|---|---|---|
| 0 | 0 | | LINK ALARM |
| 0 | "M" | TURN ON LAMP "M" | BUTTON "M" DEPRESSED |
| 1 | "P" | TURN ON LAMP "P" | BUTTON "P" DEPRESSED |
| 2 | "M" | TURN OFF LAMP "M" | |
| 3 | "P" | TURN OFF LAMP "P" | |
| 4 | "M" | WINK LAMP "M" | |
| 5 | "P" | WINK LAMP "P" | |
| 6 | "M" | SLOW FLASH LAMP "M" | |
| 7 | "P" | SLOW FLASH LAMP "P" | |
| 8 | "M" | FAST FLASH LAMP "M" | |
| 9 | "P" | FAST FLASH LAMP "P" | |
| A | "M" | FLUTTER LAMP "M" | |
| B | "P" | FLUTTER LAMP "P" | |
| C | "Q" | TURN ON DISPLAY "Q" (DISPLAY TURNED OFF BY SENDING BLANK) | |
| D | – | DBX RESERVED | |
| E | "R" | "R" NUMBER OF DATA FIELDS FOLLOW ERROR AND OTHER MESSAGES | |
| F | 0 | TURN ON PRINTER | |
| F | 1 | TURN OFF PRINTER | |
| F | 2 | TURN ON AMP | |
| F | 3 | TURN OFF AMP | |
| F | 4 | DSS DATA FOLLOWS | |
| F | 5 | TURN TONE GENERATOR OFF | |
| F | 6 | MULTITONE RINGER ON | |
| F | 7 | SINGLETONE RINGER ON | |
| F | 8 | TURN MIC ON | |
| F | 9 | TURN MIC OFF | |
| F | A | RESET | |
| F | B | LOOPBACK | |
| F | C | SPARE | |
| F | D | SPARE | OFF HOOK |
| F | E | SPARE | ON HOOK |
| F | F | RUL | |
| F | "G" | | DIAL PAD BUTTON "G" DEPRESSED |

FIG. 11

FIG. 12B  MULTIFUNCTION TELEPHONE/ COMMON EQUIPMENT (CB) INFORMATION CYCLE

FIG. 15A

DATA MEMORY 142

| ADDRESS | | CONTENTS |
|---|---|---|
| 00 | RB0: R0 | KEY LOCATION REGISTER POINTER |
| 01 | R1 | HOOKSWITCH TRANSITION REGISTER POINTER |
| 02 | R2 | BIT SCAN COUNTER REGISTER |
| 03 | R3 | BUTTON DECODING REGISTER |
| 04 | R4 | |
| 05 | R5 | CURRENT DIGIT REGISTER |
| 06 | R6 | LAST KEY REGISTER |
| 07 | R7 | |
| 08 | | ! |
| 09 | | ! |
| 0A | | ! |
| 0B | | ! |
| 0C | | ! |
| 0D | | ! |
| 0E | | ! |
| 0F | | STACK |
| 10 | | ! |
| 11 | | ! |
| 12 | | ! |
| 13 | | ! |
| 14 | | ! |
| 15 | | ! |
| 16 | | ! |
| 17 | | ! |
| 18 | RB1: R0 | |
| 19 | R1 | RXTXF REGISTER POINTER |
| 1A | R2 | |
| 1B | R3 | |
| 1C | R4 | STATES REGISTER |
| 1D | R5 | ROW COUNTER REGISTER |
| 1E | R6 | TRANSMITTED CHARACTER COUNTER |
| 1F | R7 | |
| 20 | | RXTXF REGISTER |
| 21 | | PARITY BUFFER |
| 22 | | SERIAL BUFFER #1 |
| 23 | | SERIAL BUFFER #2 |
| 24 | | KEY LOCATION REGISTER |
| 25 | | SWITCHHOOK TRANSITION REGISTER |

FIG. 15B

| ADDRESS | CONTENTS |
|---|---|
| 26 | AUDIBLE FEEDBACK REGISTER |
| 27 | IGNORE MESSAGE COUNTER |
| 28 | KEY DEBOUNCE COUNTER |
| 29 | HEAD OF FIFO MEMORY |
| 2A | TAIL OF FIFO MEMORY |
| 2B | POINTER TO LAMP BUFFER |
| 2C | ! |
| 2D | ! |
| 2E | ! |
| 2F | ! |
| 30 | ! |
| 31 | ! |
| 32 | ! |
| 33 | ! |
| 34 | ! |
| 35 | LAMP BUFFER |
| 36 | ! |
| 37 | ! |
| 38 | ! |
| 39 | ! |
| 3A | ! |
| 3B | ! |
| 3C | ! |
| 3D | ! |
| 3E | ! |
| 3F | ! |
| 40 | |
| 41 | LOOP BACK REGISTER |
| 42 | FLUTTER COUNTER |
| 43 | FAST FLASH COUNTER |
| 44 | SLOW FLASH COUNTER |
| 45 | DUTY FLAG |
| 46 | WINK COUNTER |
| 47 | |
| 48 | WATCHDOG TIMER COUNTER |
| 49 | DISPLAY STATUS REGISTER |
| 4A | CLOCK REGISTER |
| 4B | FLUTTER CLOCK REGISTER |
| 4C | FAST FLASH CLOCK REGISTER |
| 4D | SLOW FLASH CLOCK REGISTER |
| 4E | WINK CLOCK REGISTER |

FIG. 16A

180. EVENT: POWER ON

(BS)

251. TURN OFF LIGHTS 56, AMPLIFIER 61 AND SPEAKER 62, DISPLAY OPTION 65 AND TONE RINGER 63 AND TRANSDUCER 64

252. INITIALIZE THE TRANSMIT DRIVER 54 AND THE TELEPHONE RECEIVER AND TRANSMITTER 52

253. CLEAR THE DATA MEMORY 142 AND INTERNAL FLAGS

254. STOP AND DISABLE THE TIMER/COUNTER 144

255. INITIALIZE A CURRENT DIGIT REGISTER, A LAST KEY REGISTER, A KEY LOCATION REGISTER, A FIRST-IN FIRST-OUT MEMORY, A POINTER TO A TRANSFER STATUS REGISTER, THE TRANSFER STATUS REGISTER, A LAMP BUFFER POINTER REGISTER AND A WATCH DOG TIMER REGISTER IN THE DATA MEMORY 142

(BEGIN)

256. ENABLE INTERRUPTIONS IN RESPONSE TO THE LOCK DETECTION SIGNAL

257. SET THE TIMER 144 TO A BASE VALUE, START THE TIMER 144 AND ENABLE INTERRUPTIONS BY THE TIMER 144

(SUB2)

260. CALL A LAMP REFRESH SUBROUTINE (SEGIN FIG. 16B)

FIG. 17A

DEFINITIONS

```
BOUNCE  EQU 5      DUMP2    EQU 70
RPATN   EQU R3     ADTMR    EQU 70
WDOG    EQU 48H    SERBUF2  EQU 23H
SEDGE0  EQU 165    PTRP     EQU 035H
DUMP1   EQU 106    PTRM     EQU 02BH
SHSTT   EQU 25H    DSST     EQU 49H
KEYLOC  EQU 24H    FIFO     EQU 29H
POINTER EQU 2BH    CLOCK    EQU 4AH
LASKY   EQU R6     BTSC9    EQU 0500H
CURDIG  EQU R5     AUDIBLE  EQU 26H
REPEATS EQU 28H    FLUTT    EQU 42
KEYBUF  EQU 29H    FLASH FAS EQU 43
RXTFG   EQU 20H    FLASH SU EQU 44
ONHK    EQU 1D     DUTY FG  EQU 45
OFFHK   EQU 1E     WINK     EQU 46
IGNORE  EQU 27H    LOOKBK   EQU 41H

0000        NOP
BS:         JMP    PWRUP
PWRUP:      MOV    A,#07FH
            OUTL   P1,A
            MOV    A,#1FH
            OUTL   P2,A
            CLR    A
            MOV    R2,#DUMP1
            MOV    R0,#08H
CLEAR:      MOV    @R0,A
            INC    R0
            DJNZ   R2,CLEAR
            CLR    F0
            CLR    F1
            STOP   TCNT
            DIS    TCNT1
            MOV    CURDIG,#0FEH
            MOV    LASKY,#0FFH
            MOV    R0,#KEYLOC
            INC    @R0
            MOV    R0,#2AH
            MOV    @R0,#1FH
            MOV    R0,#RXTFG
            MOV    R1,#19H
            MOV    @R1,#RXTFG
            MOV    @R0,#80H
            MOV    R0,#POINTER
            MOV    @R0,#02CH
            MOV    R0,#WDOG
            MOV    @R0,#10
BEGIN:      EN     I
            MOV    A,#236
            MOV    T,A
            STRT   T
            EN     TCNTI
SUB2:       CALL   REFR
```

```
BUTTON:  MOV   R0,#KEYLOC
         MOV   R1,#SHSTT
         INS   A,BUS
         CPL   A
         JZ    $+4
         JMP   CHEC1
         MOV   RPATN,A
LINE:    MOV   @R1,#ONHK
         JMP   CHEC2
CHEC1:   CLR   C
         RRC   A
         MOV   RPATN,A
         JC    $+4
         JMP   LINE
         MOV   A,@R1
         XRL   A,#ONHK
         JNZ   HOOK
         ANL   P2,#0CFH
         ORL   P2,#10H
         INC   R1
         MOV   @R1,#0
         DEC   R1
HOOK:    CLR   C
         MOV   @R1,#OFFHK
```

FIG. 16E

```
            ( CHEC2 )
               ↓
    293. IS THE TONE RINGER 63 ON?  →N
               ↓Y                       │
    294. IS THE TONE RINGER 63 BEING  N→│
    USED FOR DIAL OR FUNCTION BUTTON    │
              SIGNALLING?                │
               ↓Y                        │
    295. DECREMENT THE AUDIBLE FEEDBACK  │
              COUNTER                    │
               ↓                         │
    296. IS THE AUDIBLE FEEDBACK   →N    │
           INTERVAL COMPLETE?            │
               ↓Y                        │
    297. TURN OFF THE TONE RINGER 63 TO  │
         TERMINATE AUDIBLE FEEDBACK      │
               ↓                         │
            ( CHEC3 )←──────────────────┘
               ↓
    298. RESTORE THE AUDIBLE FEEDBACK
              REGISTER
               ↓
            ( CHEC4 )
               ↓
    300. RETRIEVE THE SHIFTED DIAL PAD
    AND FUNCTION BUTTON ROW CONDUCTOR
      STATES FROM THE BUTTON DECODING
              REGISTER
               ↓
            ( KEYS )
               ↓
    301. ARE ANY BUTTONS ACTIVATED?  →Y
               ↓N                       │
    302. INITIALIZE THE KEY LOCATION    │
              REGISTER                   │
               ↓                         │
           ( BTSC6 )                     │
           ( FIG. 16G )                  │
                                         │
           ( BTSC1 )←───────────────────┘
               ↓
    303. SET A BIT SCAN COUNTER
              REGISTER
               ↓
           ( NXLOC )
           ( FIG. 16F )
```

FIG. 17E

```
CHEC2:  INC   R1
        MOV   A,@R1
        JB7   CHEC3
        JZ    CHEC4
        DEC   A
        JNZ   CHEC3
        ANL   P2,#0CFH
        ORL   P2,#010H
CHEC3:  MOV   @R1,A
CHEC4:  MOV   A,RPATN
KEYS:   JNZ   BTSC1
        MOV   A,@R0
        ADD   A,#7
        MOV   @R0,A
        JMP   BTSC6
BTSC1:  MOV   R2,#7
```

```
NXLOC:   RRC   A
         MOV   RPATN,A
         JNC   BTSC5
BTSC2:   CLR   F0
         CPL   F0
         MOV   A,@R0
         XCH   A,LASKY
         XRL   A,LASKY
         MOV   R0,#REPEATS
         JZ    BTSC3
         MOV   @R0,#BOUNCE
         JMP   BTSC5
BTSC3:   MOV   A,@R0
         JZ    BTSC5
         DEC   A
         MOV   @R0,A
         JNZ   BTSC5
         MOV   R0,#WDOG
         MOV   A,@R0
         JZ    BTSC4
         MOV   A,@R1
         JB7   BTSC4
```

FIG. 16G (PEEP)

316. TURN ON THE TONE RINGER 63 IN A SINGLE TONE MODE

317. TRANSFER AN INTERVAL VALUE TO THE AUDIBLE FEEDBACK REGISTER (BTSC4)

320. MOVE THE CONTENTS OF THE LAST KEY REGISTER TO THE HEAD OF A FIFO MEMORY

N 321. WAS THE PRIOR TAIL LOCATION IN THE FIFO MEMORY CLEARED?

Y → SEC FIG. 16H

→ DONE

322. MOVE THE PRIOR CONTENTS OF THE HEAD LOCATION OF THE FIFO MEMORY TO THE TAIL LOCATION AND OF THE PRIOR TAIL LOCATION TO THE ACCUMULATOR

BTSC5 FIG. 16H (BTSC6)

330. IDENTIFY THE NEXT COLUMN CONDUCTOR

331. HAVE ALL THE COLUMN CONDUCTORS BEEN TESTED? N

Y

332. RESET THE CURRENT DIGIT REGISTER AND THE KEY LOCATION REGISTER TO INITIAL VALUES

X FIG. 16H

BTSC7 FIG. 16H

FIG. 17G

```
PEEP:   ANL   P2,#0CFH
        ORL   P2,#020H
        MOV   @R1,#50
BTSC4:  MOV   A,LASKY
        MOV   R0,#KEYBUF
        DEC   R1
STACK:  XCH   A,@R0
        INC   R0
        JZ    SEC
DONE:   XCH   A,@R0
        JMP   BTSC5
SEC:    XCH   A,@R0
        JNZ   DONE
        MOV   A,@R1
        XCH   A,@R0
BTSC5:  MOV   R0,#KEYLOC
        INC   @R0
        MOV   A,RPATN
        DJNZ  R2,NXLOC
BTSC6:  MOV   A,CURDIG
        RL    A
        JB5   BTSC7
        MOV   CURDIG,#0FEH
        MOV   @R0,#1
        JMP   $+5
```

```
BTSC7:  MOV   CURDIG,A
        JMP   DECD
        JFO   BTSC8
        MOV   LASKY,#0FFH
BTSC8:  CLR   F0
```

```
DECD:   MOV    R1,#RXTFG
        MOV    A,@R1
        JB2    RECDN
        JB1    LOAF
        JMP    BTSC9
LOAF:   MOV    R1,#CLOCK
        MOV    A,@R1
        MOV    R4,#ADTMR
        JNZ    REAJ
RND:    NOP
        DJNZ   R4,RND
REAJ:   JMP    BTSC9
RECDN:  MOV    R0,#WDOG
        MOV    @R0,#10
        MOV    R0,#IGNORE
        MOV    A,@R0
        JNZ    $+4
        JMP    DEWRD
        DEC    A
        MOV    @R0,A
        JZ     $+4
        JMP    DNFG
        MOV    R0,#DSST
        MOV    A,@R0
        JZ     FGT
        MOV    @R0,#0
        JMP    DNFG
```

```
FGT:    ORL   P1,#40H
        IN    A,P1
        ANL   A,#40H
        JNZ   $+4
        JMP   DCTX
BFLAG:  MOV   R1,#SERBUF2
        MOV   @R1,#60H
        DEC   R1
        MOV   A,#3EH
        JMP   PRTY
DNFG:   MOV   @R1,#80H
        EN    I
        JMP   BTSC9
DEWRD:  MOV   R1,#SERBUF2
        CLR   A
        XCH   A,@R1
        SWAP  A
        ANL   A,#0FH
        MOV   R2,A
        DEC   R1
        CLR   A
        MOV   R3,A
        XCH   A,@R1
        RLC   A
        RLC   A
        RLC   A
        JNC   $+4
        JMP   CPAR
FRAME:  MOV   R1,#SERBUF2
        MOV   @R1,#60H
        DEC   R1
        MOV   A,#2EH
        JMP   PRTY
```

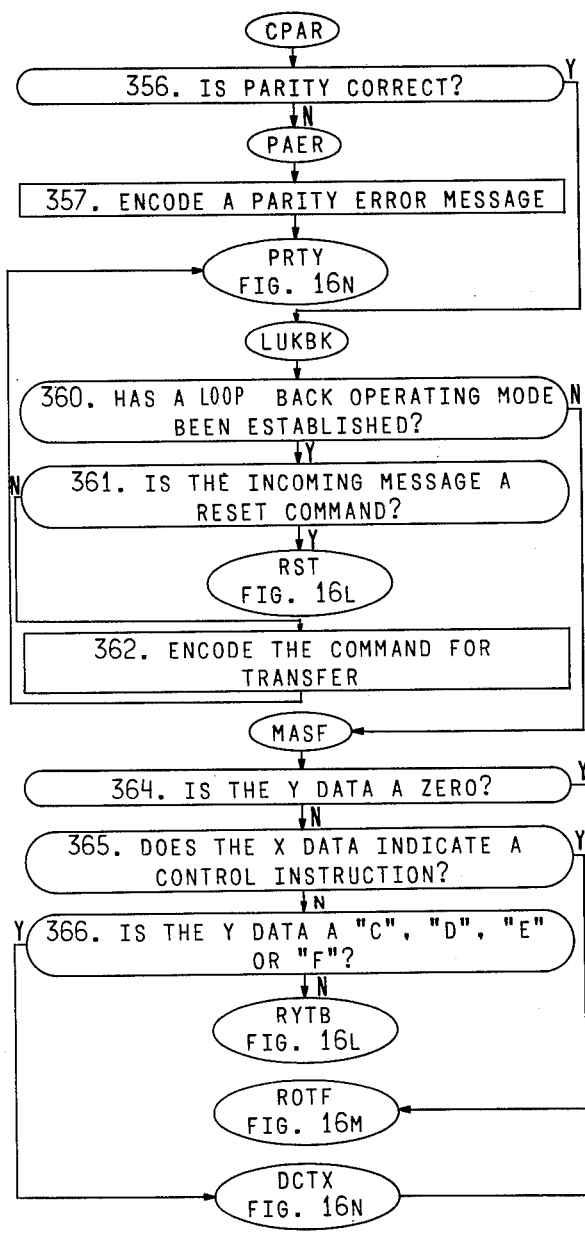

```
CPAR:   RLC    A
        JNC    $+3
        INC    R3
        ANL    A,#0F0H
        ORL    A,R2
        MOV    R2,A
        CALL   PAR
        XRL    A,R3
        JZ     LUKBK
PAER:   MOV    R1,#SERBUF2
        MOV    @R1,#60H
        DEC    R1
        MOV    A,#1EH
        JMP    PRTY
LUKBK:  MOV    R0,#LOOKBK
        MOV    A,R2
        JNZ    $+4
        JMP    MASF
        MOV    A,@R0
        XRL    A,#0AFH
        JNZ    $+4
        JMP    RST
        MOV    R1,#SERBUF2
        MOV    @R1,#60H
        DEC    R1
        MOV    A,R2
        JMP    PRTY
MASF:   MOV    A,R2
        ANL    A,#0F0H
        JNZ    $+4
        JMP    DCTX
        MOV    A,R2
        ANL    A,#0FH
        MOV    R3,A
        MOV    R4,#0FH
        XRL    A,R4
        JZ     $+4
        JMP    ROTF
CONTR:  MOV    A,R2
        SWAP   A
        ANL    A,#0FH
        MOV    R3,A
        XRL    A,R4
        JNZ    RYTE
        JMP    DCTX
RYTE:   CALL   ITERT
        JNZ    RYTD
        JMP    DCTX
RYTD    CALL   ITERT
        JNZ    RYTC
        JMP    DCTX
RYTC:   CALL   ITERT
        JNZ    RYTB
        JMP    DCTX
```

```
RYTB:   CALL    ITERT
        JNZ     RYTA
        MOV     R0,#LOOKBK
        INC     @R0
        JMP     DCTX
RYTA:   CALL    ITERT
        JNZ     RYT9
RST:    MOV     A,#7FH
        OUTL    P1,A
        MOV     A,#1FH
        OUTL    P2,A
        CLR     A
        MOV     R2,#DUMP2
        MOV     R0,#22H
RSTM:   MOV     @R0,A
        INC     R0
        DJNZ    R2,RSTM
        MOV     R0,#WDOG
        MOV     @R0,#10
        MOV     CURDIG,#0FEH
        MOV     LASKY,#0FFH
        MOV     R0,#02BH
        MOV     @R0,#02CH
        MOV     R0,#2AH
        MOV     @R0,#1FH
        MOV     R0,#KEYLOC
        INC     @R0
        MOV     R1,#19H
        MOV     @R1,#20H
        JMP     DCTX
RYT9:   CALL    ITERT
        JNZ     RYT8
        ANL     P2,#7FH
        JMP     DCTX
RYT8:   CALL    ITERT
        JNZ     RYT7
        JF0     $+4
        ORL     P2,#80H
        JMP     DCTX
```

FIG. 16M

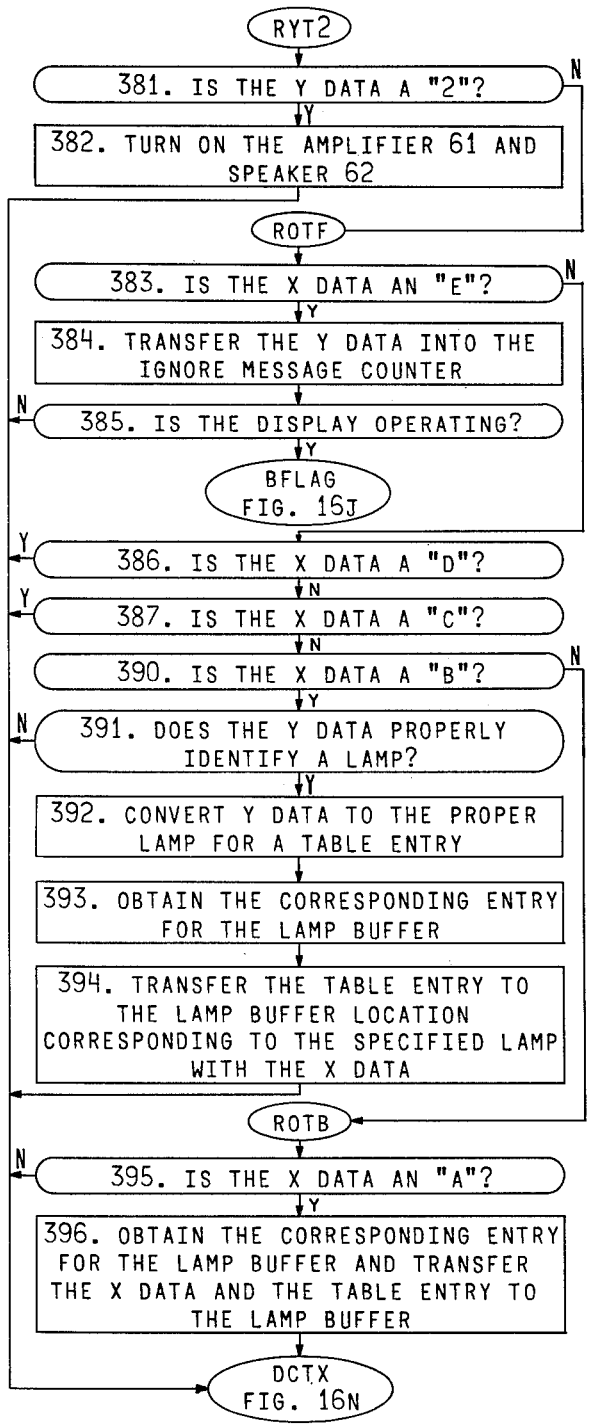

- (RYT2)
- 381. IS THE Y DATA A "2"? →N
- ↓Y
- 382. TURN ON THE AMPLIFIER 61 AND SPEAKER 62
- (ROTF)
- 383. IS THE X DATA AN "E"? →N
- ↓Y
- 384. TRANSFER THE Y DATA INTO THE IGNORE MESSAGE COUNTER
- N← 385. IS THE DISPLAY OPERATING?
- ↓Y
- (BFLAG FIG. 16J)
- Y← 386. IS THE X DATA A "D"?
- ↓N
- Y← 387. IS THE X DATA A "C"?
- ↓N
- 390. IS THE X DATA A "B"? →N
- ↓Y
- N← 391. DOES THE Y DATA PROPERLY IDENTIFY A LAMP?
- ↓Y
- 392. CONVERT Y DATA TO THE PROPER LAMP FOR A TABLE ENTRY
- 393. OBTAIN THE CORRESPONDING ENTRY FOR THE LAMP BUFFER
- 394. TRANSFER THE TABLE ENTRY TO THE LAMP BUFFER LOCATION CORRESPONDING TO THE SPECIFIED LAMP WITH THE X DATA
- (ROTB)
- N← 395. IS THE X DATA AN "A"?
- ↓Y
- 396. OBTAIN THE CORRESPONDING ENTRY FOR THE LAMP BUFFER AND TRANSFER THE X DATA AND THE TABLE ENTRY TO THE LAMP BUFFER
- (DCTX FIG. 16N)

FIG. 17M-1

```
RYT2:   CALL    ITERT
        JNZ     RYT1
        ANL     P1,#0DFH
RYT1:   JMP     DCTX
ROTF:   CALL    ITERT
        JZ      $+4
        JMP     ROTE
        MOV     A,R2
        SWAP    A
        ANL     A,#0FH
        MOV     R2,A
        MOV     R0,#IGNORE
        MOV     A,R2
        MOV     @R0,A
        ORL     P1,#40H
        IN      A,P1
        ANL     A,#40H
        JZ      $+4
        JMP     BFLAG
ILL:    JMP     DCTX
ROTE:   CALL    ITERT
        JNZ     ROTD
        JMP     DCTX
ROTD:   CALL    ITERT
        JNZ     ROTC
        JMP     DCTX
ROTC:   CALL    ITERT
        JZ      $+4
        JMP     ROTB
        CALL    TRAP
        JC      $+4
        JMP     DCTX
        CALL    TRANSP
        MOV     A,@R0
        ANL     A,#0FH
        ORL     A,#80H
        MOV     @R0,A
        JMP     DCTX
```

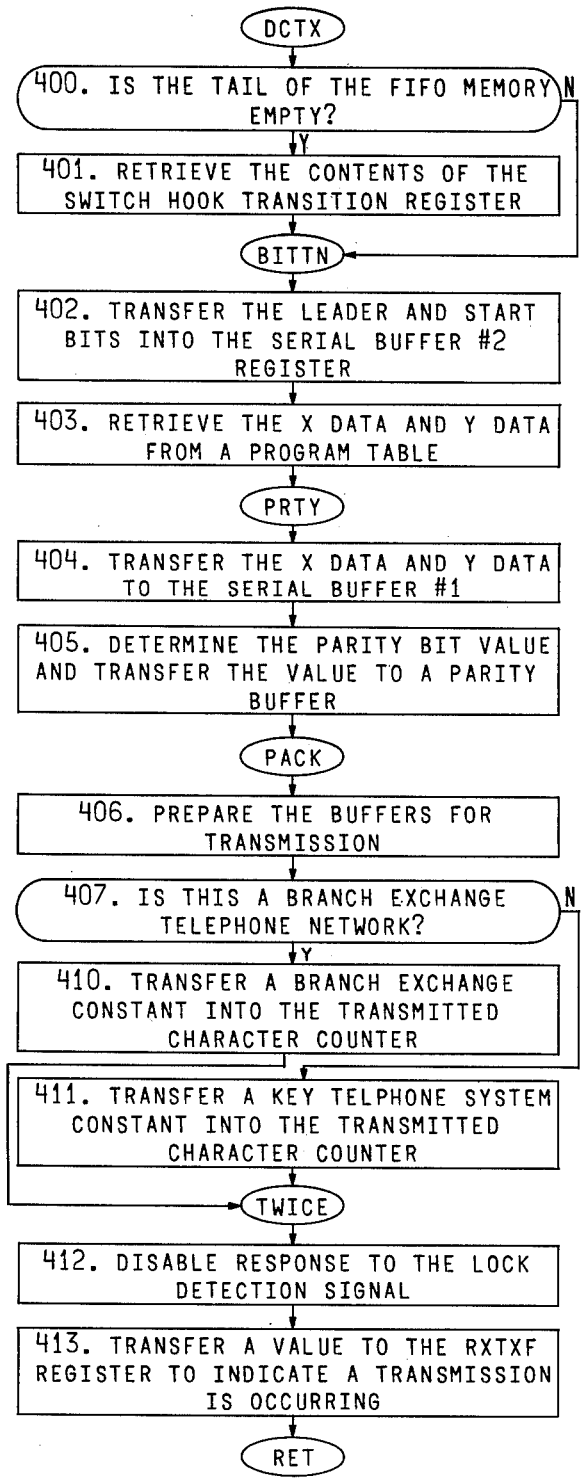

FIG. 16N

- DCTX
- 400. IS THE TAIL OF THE FIFO MEMORY EMPTY? —N→
- Y
- 401. RETRIEVE THE CONTENTS OF THE SWITCH HOOK TRANSITION REGISTER
- BITTN
- 402. TRANSFER THE LEADER AND START BITS INTO THE SERIAL BUFFER #2 REGISTER
- 403. RETRIEVE THE X DATA AND Y DATA FROM A PROGRAM TABLE
- PRTY
- 404. TRANSFER THE X DATA AND Y DATA TO THE SERIAL BUFFER #1
- 405. DETERMINE THE PARITY BIT VALUE AND TRANSFER THE VALUE TO A PARITY BUFFER
- PACK
- 406. PREPARE THE BUFFERS FOR TRANSMISSION
- 407. IS THIS A BRANCH EXCHANGE TELEPHONE NETWORK? —N→
- Y
- 410. TRANSFER A BRANCH EXCHANGE CONSTANT INTO THE TRANSMITTED CHARACTER COUNTER
- 411. TRANSFER A KEY TELEPHONE SYSTEM CONSTANT INTO THE TRANSMITTED CHARACTER COUNTER
- TWICE
- 412. DISABLE RESPONSE TO THE LOCK DETECTION SIGNAL
- 413. TRANSFER A VALUE TO THE RXTXF REGISTER TO INDICATE A TRANSMISSION IS OCCURRING
- RET

FIG. 17N-1

```
DCTX:   MOV   R0,#FIFO
        CLR   A
        XCH   A,@R0
        INC   R0
        XCH   A,@R0
        JNZ   BITTN
        MOV   R0,#SHSTT
        MOV   A,@R0
BITTN:  MOV   R1,#SERBUF2
        MOV   @R1,#60H
        DEC   R1
        CALL  TABLO
PRTY:   MOV   @R1,A
        CALL  PAR
        DEC   R1
        MOV   @R1,#0FEH
        JZ    THERE
        INC   @R1
THERE:  CLR   A
PACK:   MOV   R4,#5
ROWP:   MOV   R3,#3
        MOV   R1,#21H
SHVE:   XCH   A,@R1
        RRC   A
        XCH   A,@R1
        INC   R1
        DJNZ  R3,SHVE
        DJNZ  R4,ROWP
        MOV   R0,#01EH
        MOV   @R0,#15
        JT0   TOHI
        MOV   @R0,#14
        MOV   R0,#01CH
        MOV   @R0,#1
TOHI:
TWICE:  DIS   I
        MOV   R0,#RXTFG
        MOV   @R0,#2
        RET
```

FIG. 17O/T-1

```
BTSC9   MOV   R0,#CLOCK
        MOV   A,@R0
        JB0   c0
        JB1   c1
        JB2   c2
        JB3   c3
        JB4   c4
        MOV   R1,#FLUTT
        MOV   A,@R1
        JNZ   INKR
        MOV   @R0,#01H
        JMP   FLEG
c0      MOV   @R0,#0
        MOV   R1,#FLUTT
        MOV   @R1,#33
        MOV   R3,#80H
        MOV   R1,#4BH
        CALL  ARRAY
        MOV   A,@R1
        CPL   A
        MOV   @R1,A
        MOV   R1,#FLASHFAS
        MOV   A,@R1
        JNZ   INKR
        MOV   R0,#CLOCK
        MOV   @R0,#02H
        JMP   FLEG
```

FIG. 16P

ARRAY SUBROUTINE

421. INITIALIZE A SECONDARY LAMP BUFFER POINTER REGISTER AND A LAMP ROW POINTER

422. DOES THE SPECIFIED LAMP BUFFER CONTAIN A FLUTTER CODE? — N
 ↓ Y
 FOUND
 ↓
 TOP ←

423. HAVE ALL ROWS BEEN SCANNED? — N
 ↓ Y
 RET

424. INCREMENT SECONDARY LAMP BUFFER POINTER REGISTER

425. ARE ALL THE ROWS UPDATED? — Y
 ↓ N
426. SET THE LAMP ROW POINTER TO IDENTIFY THE NEXT ROW

FOUND
↓
427. IS THE FLUTTER CLOCK REGISTER CLEARED? — N
 ↓ Y
428. SET THE ROW BIT IN THE LAMP BUFFER

430. CLEAR THE LAMP BUFFER
↓
TOP

RETURN FROM ARRAY

432. COMPLEMENT THE CLOCK REGISTER

433. IS THE FAST FLASH COUNTER AT A ZERO VALUE? — Y
 ↓ N
 INKR
434. DECREMENT THE SPECIFIED CLOCK REGISTER

435. SET THE FAST FLASH FLAG
↓
RET

FIG. 17O/T-2

```
c1    MOV    @R0,#0
      MOV    R1,#FLASHFAS
      MOV    @R1,#6
      MOV    R3,#40H
      MOV    R1,#4CH
      CALL   ARRAY
      MOV    A,@R1
      CPL    A
      MOV    @R1,A
      MOV    R1,#DUTYFG
      MOV    A,@R1
      MOV    R1,#FLASHSW
      JZ     BACK
      MOV    A,@R1
      XRL    A,#01H
      JNZ    BACK
      MOV    R0,#CLOCK
      MOV    @R0,#04H
      JMP    FLEG
c2:   MOV    @R0,#0
      CALL   WINST
      MOV    R1,#FLASHSW
BACK: MOV    A,@R1
      JNZ    INKR
      MOV    R0,#CLOCK
      MOV    @R0,#08H
      JMP    FLEG
c3:   MOV    @R0,#0
      MOV    R1,#FLASHSW
      MOV    @R1,#2
      MOV    R3,#20H
      MOV    R1,#4DH
      CALL   ARRAY
      MOV    A,@R1
      CPL    A
      MOV    @R1,A
      MOV    R1,#DUTFG
      MOV    A,@R1
      JZ     STWNK
      CLR    A
      MOV    @R1,A
      JMP    PREWK
```

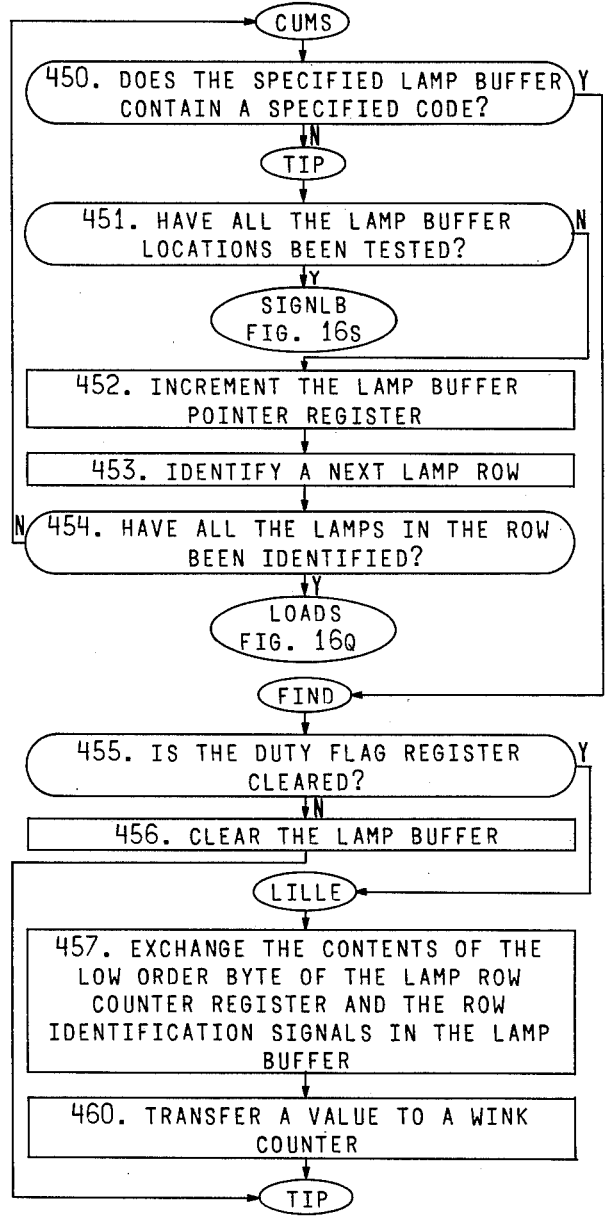

FIG. 17O/T-4

```
SIGNLB:   MOV    R1,#DUTYFG
          MOV    A,@R1
          JNZ    NEXIT
          JMP    NEXT
LONG:     DEC    A
          MOV    @R1,A
          JNZ    NEXT
          DEC    R1
          MOV    @R1,#01H
NEXT:     MOV    R1,#WDOG
          MOV    A,@R1
          JZ     FLEG
          DEC    A
          MOV    @R1,A
          JMP    FLEG
INKR:     DEC    A
          MOV    @R1,A
FLEG:     NOP
NEXIT:    RET
ARRAY:    MOV    R0,#02CH
LPONS:    MOV    R2,#1
COMS:     MOV    A,@R0
          ANL    A,#0F0H
          XRL    A,R3
          JZ     FOUND
TOP:      MOV    A,#3FH
          XRL    A,R0
          JZ     NEXIT
          INC    R0
          MOV    A,R2
          RL     A
          JB4    LPNOS
          MOV    R2,A
          JMP    COMS
FOUND:    MOV    A,@R1
          JZ     LPPON
          CLR    A
          XCHD   A,@R0
          JMP    TOP
LPPON     MOV    A,R2
          XCHD   A,@R0
          JMP    TOP
          END
```

FIG. 17L-2

```
RYT7:   CALL    ITERT
        JNZ     RYT6
        ANL     P2,#0CFH
        ORL     P2,#020H
        MOV     R0,#AUDIBLE
        MOV     @R0,#80H
        JMP     DCTX
RYT6:   CALL    ITERT
        JNZ     RYT5
        ANL     P2,#0CFH
        MOV     R0,#AUDIBLE
        MOV     @R0,#80H
        JMP     DCTX
RYT5:   CALL    ITERT
        JNZ     RYT4
        ANL     P2,#0CFH
        ORL     P2,#010H
        MOV     R0,#AUDIBLE
        MOV     @R0,#0
        JMP     DCTX
RYT4:   CALL    ITERT
        JNZ     RYT3
        MOV     R0,#DSST
        INC     @R0
        MOV     R0,#IGNORE
        MOV     @R0,#2
        JMP     DCTX
RYT3:   CALL    ITERT
        JZ      $+4
        JMP     RYT2
        ORL     P1,#20H
        JMP     DCTX
```

FIG. 17M-2

```
ROTB:   CALL    ITERT
        JNZ     ROTA
        CALL    TRANSM
        MOV     A,@R0
        ANL     A,$0FH
        ORL     A,#80H
        MOV     @R0,A
        JMP     DCTX
ROTA:   CALL    ITERT
        JNZ     ROT9
        CALL    TRAP
        JC      $+4
        JMP     DCTX
        CALL    TRANSP
        MOV     A,@R0
        ANL     A,#0FH
        ORL     A,#40H
        MOV     @R0,A
        JMP     DCTX
ROT9:   CALL    ITERT
        JNZ     ROT8
        CALL    TRANSM
        MOV     A,@R0
        ANL     A,#0FH
        ORL     A,#40H
        MOV     @R0,A
        JMP     DCTX
ROT8:   CALL    ITERT
        JZ      $+4
        JMP     ROT7
        CALL    TRAP
        JC      $+4
        JMP     DCTX
        CALL    TRANSP
        MOV     A,@R0
        ANL     A,#0FH
        ORL     A,#20H
        MOV     @R0,A
        JMP     DCTX
```

FIG. 17M-3

```
ROT7     CALL   ITERT
         JZ     $+4
         JMP    ROT6
         CALL   TRANSM
         MOV    A,@R0
         ANL    A,#0FH
         ORL    A,#20H
         MOV    @R0,A
         JMP    DCTX
ROT6:    CALL   ITERT
         JZ     $+4
         JMP    ROT5
         CALL   TRAP
         JC     $+4
SKIPW:   JMP    DCTX
         CALL   TRANSP
         MOV    A,@R0
         JB4    SKIPW
         MOV    @R0,#10H
         CALL   TABN
         ORL    A,@R0
         MOV    @R0,A
         JMP    DCTX
ROT5:    CALL   ITERT
         JNZ    ROT4
         CALL   TRANSM
         MOV    A,@R0
         JB4    SKIPW
         MOV    @R0,#10H
         CALL   TABN
         ORL    A,@R0
         MOV    @R0,A
         JMP    DCTX
ROT4:    CALL   ITERT
         JNZ    ROT3
         CALL   TRAP
         JC     $+4
         JMP    DCTX
```

FIG. 17M-4

```
OFFP:    CALL   TRANSP
         CLR    A
         MOV    @R0,A
         JMP    DCTX
ROT3:    CALL   ITERT
         JNZ    TUN4
OFFM:    CALL   TRANSM
         CLR    A
         MOV    @R0,A
         JMP    DCTX
TUN4:    MOV    A,R2
         ANL    A,#0FH
         JZ     TUN5
         CALL   TRAP
         JC     TUN5
         JMP    DCTX
TUN5:    CALL   TABL1
         MOV    R2,A
         ANL    A,#0FH
         MOV    R3,A
ROT2:    CALL   ITERT
         JNZ    ROT1
ONNP:    MOV    R0,#PTRP
         CALL   LPPS
         JMP    DCTX
ROT1:    CALL   ITERT
         NOP
         NOP
         JNZ    DCTX
ONNM:    MOV    R0,#PTRM
         CALL   LPPS
```

FIG. 17N-2

```
PAR:    MOV     R4,#8
        CLR     C
FLOOP:  RR      A
        JB0     DNE
        CPL     C
DNE:    DJNZ    R4,FLOOP
        CLR     A
        RLC     A
        RET
ITERT:  DEC     R4
        MOV     A,R3
        XRL     A,R4
        RET
TRAP:   MOV     A,R2
        ANL     A,#0F0H
        CPL     A
        INC     A
        CLR     C
        ADD     A,#50H
        RET
TRANSP  MOV     A,R2
        ANL     A,#0F0H
        ORL     A,#01H
        MOV     R2,A
        CALL    TABL1
        JMP     TUN3
TRANSM: MOV     A,R2
        ANL     A,#0F0H
        MOV     R2,A
        CALL    TABL1
TUN3    MOV     R2,A
        ANL     A,#0FH
        MOV     R0,#PTRP
        JNZ     $+4
        MOV     R0,#PTRM
        MOV     A,R2
        SWAP    A
        MOV     R2,A
        ANL     A,#0FH
        ADD     A,R0
        MOV     R0,A
        RET
```

FIG. 17N-3

```
LPPS:   MOV     A,R2
        SWAP    A
        MOV     R2,A
        ANL     A,#0FH
        ADD     A,R0
        MOV     R0,A
        CALL    TABN
        MOV     @R0,A
        RET
        NOP
        NOP
        NOP
        NOP
        NOP
        NOP
        NOP
        JMP     PWRUP
```

FIG. 17N-4

```
TABL0:  ADD   A,#094H
        MOVP  A,@A
        RET
        DB    0FFH
        DB    3FH
        DB    2FH
        DB    1FH
        DB    21H
        DB    0C0H
        DB    70H
        DB    20H
        DB    6FH
        DB    5FH
        DB    4FH
        DB    31H
        DB    0D0H
        DB    80H
        DB    30H
        DB    9FH
        DB    8FH
        DB    7FH
        DB    41H
        DB    0E0H
        DB    90H
        DB    40H
        DB    0CFH
        DB    0AFH
        DB    0BFH
        DB    51H
        DB    0F0H
        DB    0A0H
        DB    50H
        DB    0EFH
        DB    0DFH
        DB    0DH
        DB    11H
        DB    0B0H
        DB    60H
        DB    10H
        NOP
        NOP
        NOP
        NOP
        NOP
        NOP
        JMP   PWRUP
```

FIG. 17N-5

```
TABL1:  MOV   A,R2
        SWAP  A
        ADD   A,#0C6H
        MOVP  A,@A
        RET
        DB    0FFH
        DB    0A1H
        DB    40H
        DB    80H
        DB    21H
        DB    61H
        DB    91H
        DB    30H
        DB    70H
        DB    11H
        DB    51H
        DB    81H
        DB    20H
        DB    60H
        DB    0A0H
        DB    41H
        DB    0FFH
        DB    71H
        DB    10H
        DB    50H
        DB    90H
        DB    31H
        NOP
        NOP
        JMP   PWRUP
```

FIG. 17N-6

```
TABN:   MOV     A,R2
        ADD     A,#0E5H
        MOVP    A,@A
        RET
        DB      00H
        DB      01H
        DB      02H
        DB      04H
        DB      08H
        DB      01H
        DB      02H
        DB      04H
        DB      08H
        DB      01H
        DB      02H
        DB      00H
        DB      00H
        DB      00H
        DB      00H
        DB      00H
        DB      00H
        DB      04H
        DB      08H
        DB      01H
        DB      02H
        DB      04H
        DB      08H
        DB      01H
        DB      02H
        DB      04H
        DB      08H
        END
```

FIG. 18

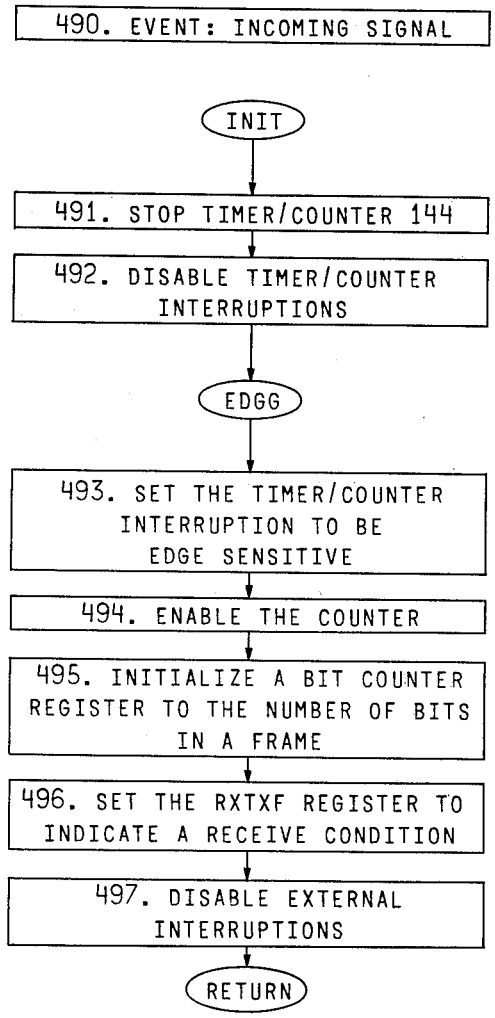

490. EVENT: INCOMING SIGNAL (INIT)

491. STOP TIMER/COUNTER 144

492. DISABLE TIMER/COUNTER INTERRUPTIONS (EDGG)

493. SET THE TIMER/COUNTER INTERRUPTION TO BE EDGE SENSITIVE

494. ENABLE THE COUNTER

495. INITIALIZE A BIT COUNTER REGISTER TO THE NUMBER OF BITS IN A FRAME

496. SET THE RXTXF REGISTER TO INDICATE A RECEIVE CONDITION

497. DISABLE EXTERNAL INTERRUPTIONS (RETURN)

FIG. 19

```
DEFINITIONS
  BCOUNT EQU R6    TISEN EQU 0FFH
  RXTFG  EQU 20H   ATEMP EQU R7

0003        CALL  INIT
            RETR
            NOP
    INIT:   STOP  TNCT
            DIS   TCNTI
            SEL   RB1
            MOV   ATEMP,A
    EDGG:   MOV   A, #TISEN
            MOV   T,A
            EN    TCNTI
            STRT  CNT
            MOV   @R1, #08H
            MOV   BCOUNT, #0CCH
            DIS   I
            MOV   A, ATEMP
    RETURN  RET
```

FIG. 20A

```
500. EVENT: TIMER INTERRUPTION
            ↓
           (RX)
            ↓
501. RETRIEVE THE RXTXF FLAG
            REGISTER
            ↓
Y ⟋ 502. IS A MESSAGE BEING RECEIVED ⟍
   ⟍        OR TRANSMITTED?         ⟋
            ↓ N
        ( FIG. 20B )
        (  LOOK    )
            ↓
N ⟋ 503. IS A MESSAGE BEING ⟍
   ⟍     TRANSMITTED?        ⟋
            ↓ Y
        (   TX    )
        ( FIG. 20C )
            ↓
N ⟋ 504. IS A FIRST RECEIVED BIT ⟍
   ⟍         FLAG SET?            ⟋
            ↓ Y
        (  START  )
        ( FIG. 20B )
            ↓
          ( HLD )
            ↓
521. SET A TIME VALUE INTO THE
    TIMER 144 AND START THE TIMER
            ↓
522. CLEAR THE ACCUMULATOR AND
            CARRY BIT
            ↓
  ⟋ 523. IS THE INCOMING SIGNAL A ⟍ N
   ⟍         LOGICAL "1"?          ⟋
            ↓ Y
    524. SET THE CARRY BIT
            ↓
         (TISRD)
            ↓
525. SHIFT THE INCOMING SIGNAL
        INTO A SERIAL BUFFER
            ↓
N ⟋ 526. HAVE ALL THE BITS IN THE    ⟍
   ⟍   RECEIVED MESSAGE BEEN RECEIVED? ⟋
            ↓ Y
527. SET THE RXTXF FLAG REGISTER
TO INDICATE A RECEIVED DONE STATE
            ↓
         ( SEXIT  )
         (FIG. 20B)
```

FIG. 21A

```
DEFINITIONS
BCOUNT EQU R6        PS2 EQU 247
ATEMP  EQU R7        PFIRST EQU 237
LSTATES EQU 4        TIMEH EQU 254
HSTATES EQU 6        TIMEL EQU 252
PS EQU 236           DELAYH EQU 6
PEX EQU 237          DELAYL EQU 4

RX(0007)  SEL    RB1
          MOV    ATEMP,A
          MOV    A,@R1
          JB7    LOOK
          JB1    TX
          MOV    A,BCOUNT
          JB7    START
          MOV    R3,#6
HLD:      NOP
          DJNZ   R3,HLD
          MOV    A,#PS
          MOV    T,A
          STRT   T
          CLR    A
          RLC    A
          JNT1   TISRD
          CPL    C
TISRD:    MOV    R0,#22H
          MOV    R5,#02H
SLOOP:    XCH    A,@R0
          RRC    A
          XCH    A,@R0
          INC    R0
          DJNZ   R5,SLOOP
          DJNZ   BCOUNT,SEXIT
          MOV    @R1,#84H
          JMP    SEXIT
```

```
START:    JB6    HPD
          JNT1   FFPD
LVE:      MOV    R1,#80H
          EN     I
ETIME:    MOV    A,#PEX
          MOV    T,A
          STRT   T
SEXIT     CLR    F1
          CPL    F1
RIST:     MOV    A,ATEMP
RETURN:   RETR
LOOK:     JB0    TINTR
          JMP    ETIME
TINTR:    JN1    ETIME
          JMP    LVE
HPD:      MOV    A,#PS2
          MOV    T,A
          STRT   T
          MOV    A,BCOUNT
          ANL    A,#0BFH
          MOV    BCOUNT,A
          MOV    R1,#0
          JMP    SEXIT
```

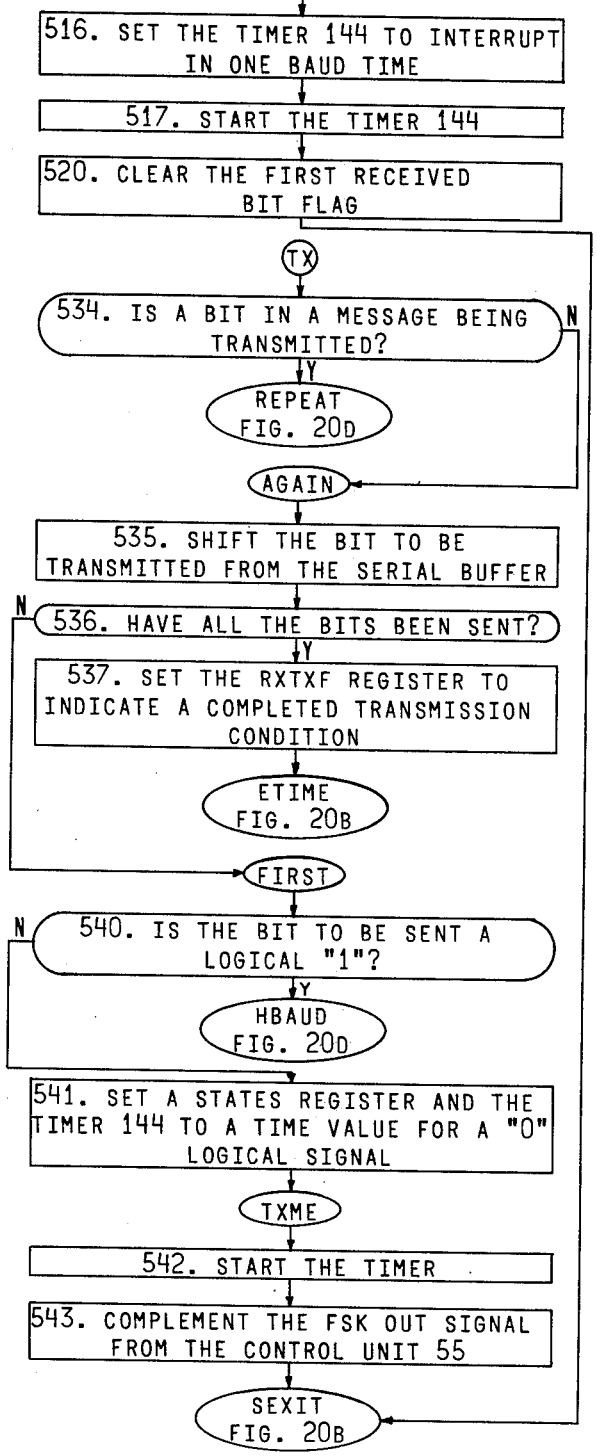

| | | |
|---|---|---|
| HBAUD: | MOV | R4,#HSTATES |
| FREQH: | MOV | A,#TIMEH |
| | JMP | TXME |
| REPEAT: | MOV | A,R2 |
| | JB0 | WTMH |
| WTML: | MOV | R3,#DELAYL |
| WSTE1: | NOP | |
| | DJNZ | R3,WSTE1 |
| | JMP | FREQL |
| WTMH: | MOV | R3,#DELAYH |
| WSTE2: | NOP | |
| | DJNZ | R3,WSTE2 |
| | NOP | |
| | NOP | |
| | JMP | FREQH |

MULTIFUNCTION TELEPHONE WITH MESSAGE INFORMATION AND CONTROL INFORMATION CIRCUITS FOR CONNECTING STATIONS AND COMMON EQUIPMENT IN A TELEPHONE NETWORK

TABLE OF CONTENTS

Cross References to Related Patent Applications
Background of the Invention
Summary
Brief Description of the Drawings
Description of an Illustrative Embodiment
  A. General Description
  B. Specific Description
    1. Multifunction Telephone Structure
      a. Voice Signal Path and Telephone Receiver and Transmitter 52
      b. Power Supply 57 and Local Power Option 60
      c. Phase Loop Receiver and Transmit Driver 54
      d. Audio Amplifier 61 and Speaker 62
      e. Hook Switch Circuit
      f. Tone Ringer 63 and Transducer 64
    2. Common Equipment
      a. Control Circuit 47
      b. Line Card 41
    3. Operation
      a. Microport Control Unit 40 to Line Card 41
      b. Line Card 41 to Multifunction Telephone 16A
      c. Multifunction Telephone
      d. Multifunction Telephone 16A to Line Card 41
    4. Detailed Operation of the Multifunction Telephone
      a. Background State
      b. External Event State
      c. Timer Interrupt State
  c. Summary of the Description
Claims

CROSS REFERENCE TO RELATED PATENT APPLICATIONS

U.S. patent application Ser. No. 855,181 filed Nov. 25, 1977, by Gueldenpfennig et al, titled "Digital Private Branch Exchange" and assigned to the assignee of this invention;

U.S. patent application Ser. No. 06/060,963 filed July 26, 1979 by Niertit et al, titled "Fully Electronic Telephone Network" and assigned to the assignee of this invention;

U.S. patent application Ser. No. 120,570 filed on even date herewith by Barry Slingsby, titled "Control Circuit for Concurrently Monitoring and Controlling Functions and Frequency Modulation Status Information in a Digital Data Network" and assigned to the same assignee as the present invention.

U.S. patent application Ser No. 120,786 filed on even date herewith by Ronald W. Christain et al, titled "Telephone Network Including Common Equipment with Message Information and Control Information Circuits for Connecting to Stations Having Multifunction Telephones" and assigned to the same assignee as the present invention.

BACKGROUND OF THE INVENTION

This invention generally relates to telephone systems and, more specifically, to multifunction telephones that are adapted for use in in private telephone networks.

Private telephone networks are generally used in corporations, institutions, and other organizations that require a number of telephones and a number of telephone trunks. There are two types of private telephone networks: key telephone system networks and private branch exchange networks. Key telephone systems are usually used in small office systems whereas the private branch exchange is used in larger systems. Each type, however, has certain common characteristics and generic elements. For example, each type includes equipment at a central location that will perform some switching function for acoustic (e.g., voice) signals.

U.S. patent application Ser. No. 855,181 discloses a private branch exchange that operates under the control of digital data processing equipment. This digital data processing equipment includes a central processor unit and memory units. The memory units store control information and control programs for enabling the central processor unit to operate the private branch exchange, especially basic call processing functions that include call switching. However, the use of digital data processing equipment as a control mechanism also enables a number of other functions to be performed easily and inexpensively.

Some examples of such functions include conference, "camp-on", call forwarding, and automatic calling functions. The conference function allows a first party to talk simultaneously with a second party and to add and drop third parties from the conversation. If the "camp on" function is available and the first party is talking with a second party when an incoming call is received from a third person, the "camp on" function places the incoming call into a hold condition. When the first and second parties complete their telephone conversation, the first party receives a signal indicating that an incoming call is on hold. The conversation can then begin. If a party in an office temporarily moves to another office, the call forwarding function enables the private branch exchange to automatically transfer all calls to another extension that is designated by the party. If a party dials a telephone number and that line is busy, the automatic calling function allows the number to be redialed merely by pushing a single button.

A number of existing private telephone networks perform one or more of the foregoing and other functions. Generally, a telephone in such a network is known as a multifunction telephone and includes a number of control, or function, pushbuttons on the telephone. Common equipment, including data processing equipment, polls the telephones in sequence by sending a message to the telephone and then receiving a message indicating that a button has been activated. The data processing equipment processes other information in conjunction with received messages to identify a specific function. Control programs in the data processing equipment define each function. This provides a very flexible private telephone network as it is merely necessary to change or add a control program to change or add a function. Thus, a standard mechanical configuration can provide a very flexible set of functions which a customer can then individually select for his particular application and needs.

In both key telephone systems and private branch exchange networks uninterrupted cables interconnect the common equipment at the central location and individual telephones at remote sites. The cables that interconnect the common equipment and multifunction telephones include at least two separate signal paths. One signal path constitutes an acoustic, or voice, signal path and another signal path constitutes a data signal path for control signals. Each signal path includes a pair of conductors to ensure the reliability of transmissions over these paths. Reliability is also ensured by specifying a maximum length for the data signal path and, therefore, the cable. This maximum corresponds to a loop resistance of about 200 ohms. The actual maximum length depends upon wire size, but conventionally the maximum length is from 2,000 to 3,000 feet.

More specifically, some signal encoding and decoding is used to convey the data signals over the data signal path. In some networks, for example, digital data signals are converted to diphase or Manchester phase representations for transmission over the data signal path. As the encoded signals travel along the data signal path, they degrade. One particularly important degrading influence is amplitude attenuation, because the detection and decoding process is sensitive to signal amplitude. At some data signal path distance the data signals can no longer be reliably separated from noise. This distance also corresponds to an impedence of about 200 ohms. One apparent solution, that would greatly increase the maximum signal path length, is the installation of conventional modems. However, that solution has not been practicable for private telephone networks due to expense. Each line would require a conventional modem at the common equipment and another conventional modem at the telephone. A conventional modem includes a clock, a modulator for converting digital signals in serial form to analog signals and a demodulator for converting analog signals to digital signals in serial form. The modem also includes serial-parallel conversion means to couple the serial digital data at the modulator and demodulator to parallel signals for a digital interface at the respective ones of the common equipment or telephone. As is apparent, there are increased costs if two modems are to be incorporated in each line; and in a private telephone network, the overall increase can be prohibitive. Moreover, the overall size of the telephones would have to be increased to accomodate the modem. These alterations also would increase the cost of the telephone.

All these costs and other problems have made it impractical to use conventional modems in a private telephone network. As a result, the private telephone networks that include multifunction telephones accept the maximum signal path limitations. Thus, commercially available networks that have a multifunction telephone capability normally limit the signal paths to a range from 2,000 to 3,000 feet.

In the currently available telephone networks, the central processor unit at the common equipment exclusively controls all operations in the multifunction telephone. This eliminates much of the circuitry that would otherwise be incorporated in a multifunction telephone. Thus, the telephone itself can be manufactured at a low cost. However, the central processor unit must perform the additional operations. At some point, the central processor unit is no longer able to perform all the operations and still maintain adequate switching speeds. The least expensive solution, then, is to replace the central processor unit with one of greater capability and increased memory. However, this also increases the cost of the common equipment.

Another possible solution is to distribute functions to the telephone. However, this is a difficult task because the telephone is an "event-oriented" device. Typical events include removing or replacing the handset and dialing. Normally encountered procedures for controlling such a central processor unit coupled with the execution times for performing these procedures can lead to timing and synchronization problems. Obviously a central processor unit of sufficient speed and capability might be used successfully. However, sufficient speed and capability are achieved only with equipment that would increase the telephone costs to prohibitive levels.

Moreover, many of these private networks utilize common equipment that is especially adapted for multifunction telephones. Modification of a currently installed private telephone network for conventional telephones may be possible only at significant expense.

SUMMARY

Therefore, it is an object of this invention to provide a multifunction telephone which is inexpensive to produce.

Another object of this invention is to provide a multifunction telephone which has a minimal effect on the expense of common equipment.

Yet another object of this invention is to provide a multifunction telephone which enables the telephone to be positioned farther from the common equipment than was possible in the prior art.

Yet still another object of this invention is to provide a multifunction telephone which can operate in a private telephone network over long transmission lines with high reliability.

Still another object of this invention is to provide a multifunction telephone in which the control functions, including processing and modulation, are combined in a single control element.

Yet another object of this invention is to provide a multifunction telephone that utilizes a microcomputer for controlling the telephone.

In accordance with this invention, a private telephone network includes telephone transmission lines for interconnecting common equipment at a central location with multifunction telephones at each of several remote sites. The transmission lines include a first signal path for conveying acoustic information and a second signal path for conveying modulated data signals representing supervisory information. A central switch in the common equipment selectively interconnects pairs of the first signal paths to enable voice or other acoustic information transfers. Another control in the common equipment connects to the second signal path for transmitting and receiving control data in a frequency modulated form to and from the second signal path.

Each multifunction telephone converts audio information between an acoustic form and an electrical form. Moreover, at least one function element in the telephone performs a predetermined function in response to control data from the common equipment. At least one other function element in the telephone generates control data for transfer to the common equipment. These elements operate with control data represented by electrical logic signals. Circuits in the telephones modulate and demodulate the control data between its electrical logic form and a frequency modulated form that is adapted for transfer over the second signal path.

The use of frequency modulation for conveying the control signals provides long-line reliability and enables increased distances between the common equipment and the telephones. Also, it has been found that a single microcomputer can perform all the control functions at the multifunction telephone and can concurrently frequency modulate the data signals. This reduces the expense which would be required if separate elements were used. Moreover, the use of the microcomputer enables a reduction in the amount of processing that the common equipment must do.

This invention is pointed out with particularity in the appended claims. The above and further objects and advantages of this invention may be better understood by referring to the following detailed description taken in conjunction with the accompanying drawings.

BRIEF DESCRIPTION OF THE DRAWINGS

FIG. 9 is a detailed logic diagram of portions of the common equipment shown in FIG. 2;

FIGS. 15A and 15B constitute a memory map that is useful in understanding the detailed operation of the multifunction telephone shown in FIG. 3;

FIG. 18 is a flow diagram that depicts certain operations that occur within the control element shown in FIG. 6;

FIG. 19 depicts an assembly language listing for implementing the flow diagram shown in FIG. 18;

FIG. 20, comprising FIGS. 20A through 20D, is a flow diagram that depicts still other operations that occur within the control element shown in FIG. 6; and FIG. 21, comprising FIGS. 21A through 21D, depicts an assembly language listing for implementing the flow diagram shown in FIG. 20.

DESCRIPTION OF AN ILLUSTRATIVE EMBODIMENT

A. General Description

Figure 1:
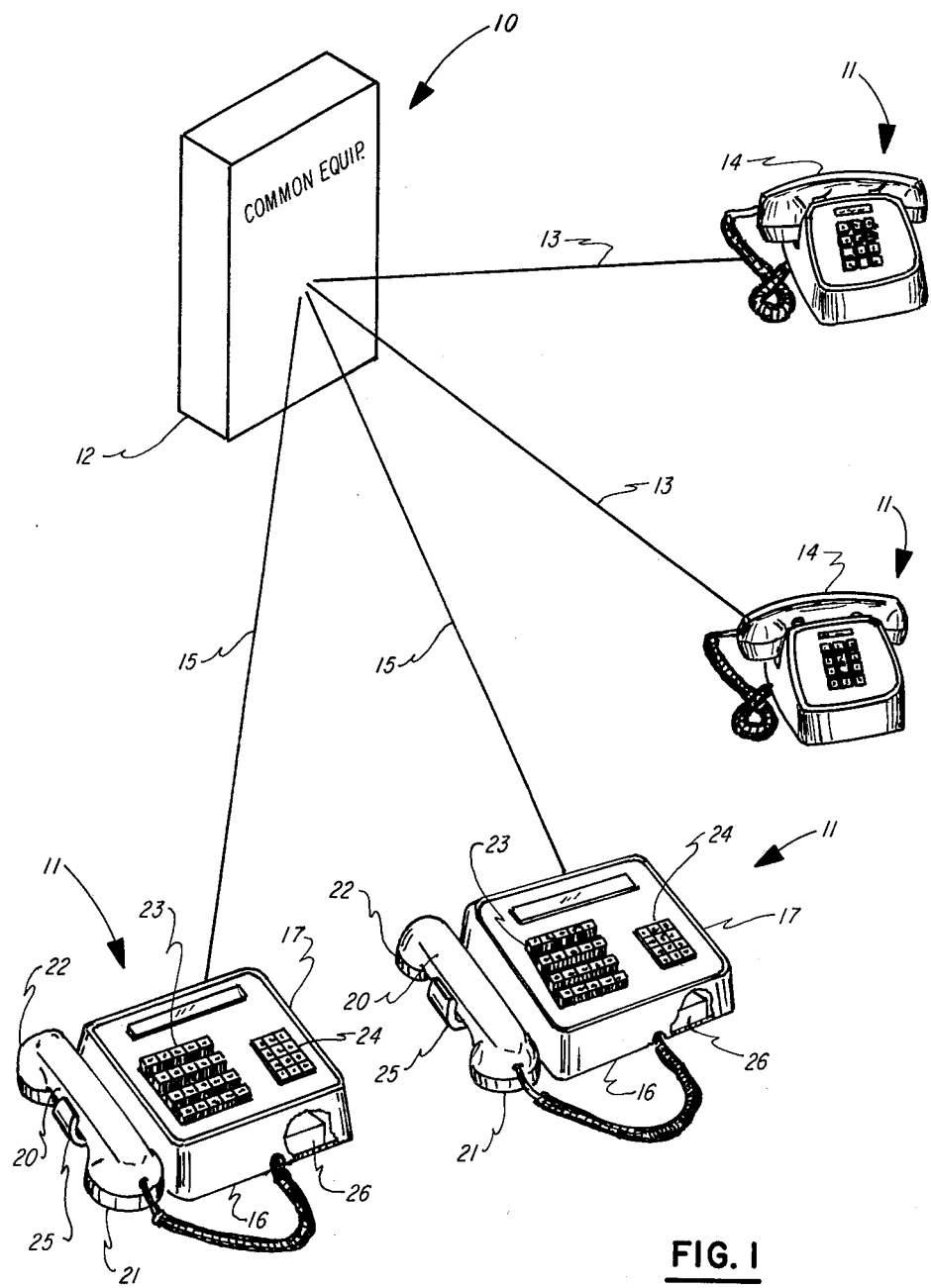
FIG. 1 is a pictorial representation of a private telephone network that utilizes conventional telephones and multifunction telephones constructed in accordance with this invention.

FIG. 1 depicts a private telephone network that includes a central location 10 and a plurality of remote sites 11. The network may be of the "key telephone system" or "branch exchange" type. Common equipment 12 at the central location 10 interconnects all the remote sites. In a key service unit type of network, the common equipment 12 comprises portions of a distributed switch. Other portions of the switch are located in the individual telephones. The switch portions at the common equipment multiplex a number of functions to reduce the number of conductors that would otherwise be required to interconnect the common equipment and the telephones. At a "branch exchange" the common equipment comprises a central switch that operates like the switch in a central office.

In either type of network the common equipment 12 includes control logic and a switching matrix. Cables 13 couple the common equipment 12 to conventional telephones 14. In accordance with this invention, other cables 15 interconnect the common equipment 12 and multifunction telephones 16.

Each multifunction telephone includes a base 17 and a handset 20. The handset 20 contains an acoustic transducer for converting acoustic information to electrical information and another transducer for converting electrical information into acoustic information. A microphone 21 and earpiece 22 perform these functions, respectively. A number of function buttons 23 and a dial pad 24, situated in groups in the housing 17, generate control information in a logical form, specifically, electrical logic signals. That is, each button is on or off and will include an electrical, single-pole, single-throw, normally open momentary-on switch. Lights are usually disposed in cavities in the buttons 23 for display purposes, such as showing that a corresponding button has been depressed. The housing 17 also includes a cradle 25 for the handset 20 and a control circuit 26.

Figure 2:
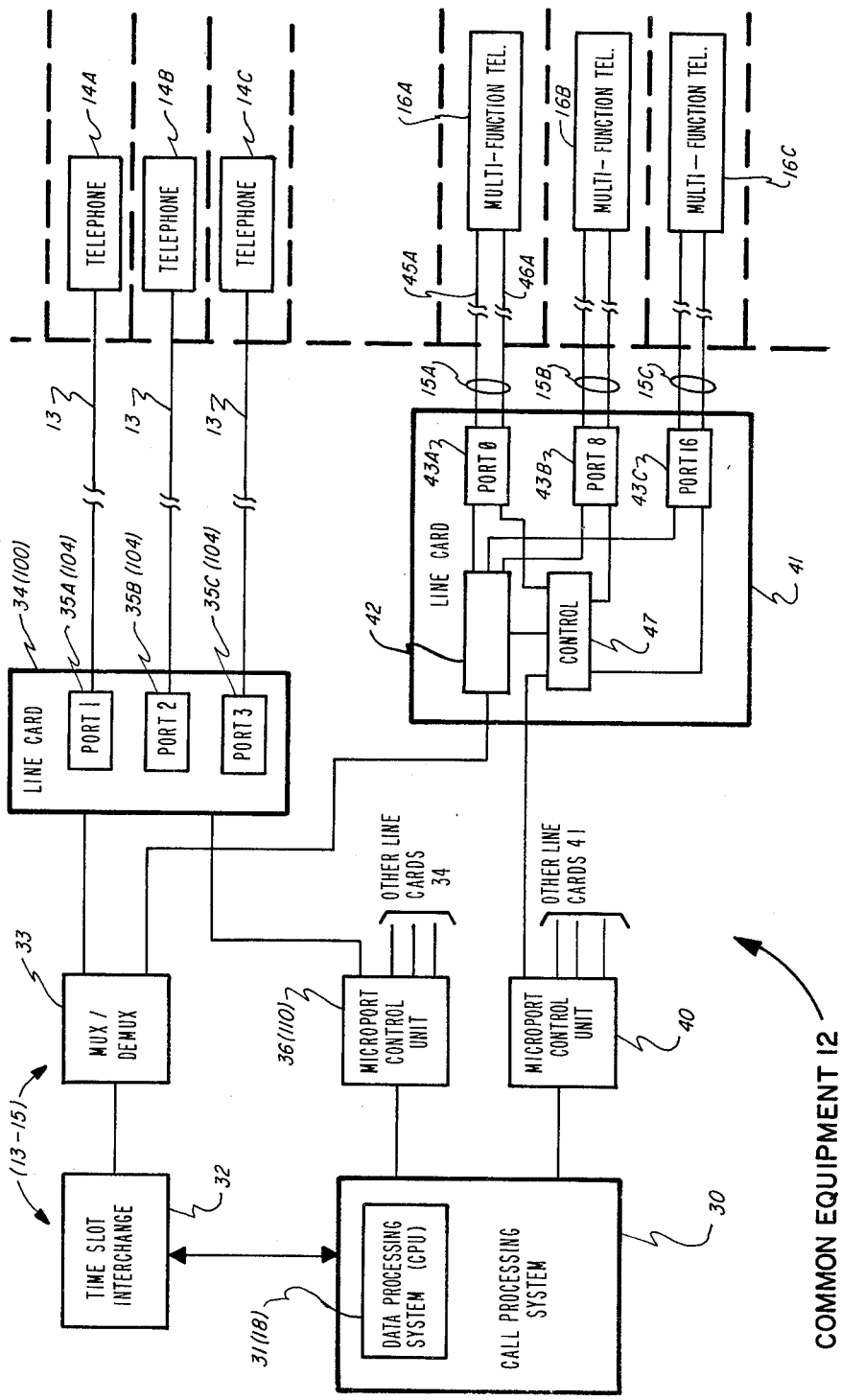
FIG. 2 is a block diagram of a private telephone network such as shown in FIG. 1 that illustrates common equipment and telephones adapted to utilize this invention.

FIG. 2 is a block schematic of a private telephone network that incorporates multifunction telephones. The reference numerals in parentheses correspond to reference numerals that are utilized in U.S. patent application Ser. No. 855,181 that describes one embodiment of a digital private branch exchange. For purposes of this discussion, it will be assumed that the common equipment 12 in FIG. 1 comprises a digital private branch exchange of the type dislcosed in that patent application. Therefore, the description of the common equipment 12 will be limited primarly to equipment modifications that are necessary for adapting the common equipment for use with the multifunction telephone.

More specifically, the telephone network in FIG. 2 comprises a call processing system 30. The system 30 includes a data processing system (CPU) 31 (18) that controls the telephone network. Voice signals are coupled through a time slot interchange 32 and a multiplexer/demultiplexer (MUX/DEMUX) circuit 33 that together constitute a transmission time slot interchange network such as the networks 13 through 15 in FIG. 1 of the above-referenced patent application. Voice signals are further routed through a line card 34 (100) between the MUX/DEMUX circuit 33 and various conventional telephones. In FIG. 2, these are telephones 14A, 14B, and 14C.

The line card 34 (100) includes a port circuit for each of the telephones; and these port circuits are designated by reference numerals 35A through 35C (104). Control, or supervisory, information is routed to the line card 34 through a microport control unit 36 (110) that connects to the system 30 and also to other line cards. As described in the foregoing U.S. patent application Ser. No. 855,181, the system thus far described in FIG. 2 enables telephone communications over two-wire cables 13 that couple each line card to its respective telephones.

To provide a multifuncton telephone capability in accordance with this invention, the telephone network shown in FIG. 2 is modified by incorporating a modified microport control unit 40. This unit corresponds structurally to the microport control unit 36. However, control programs in the modified microport control unit 40 are altered, as will become apparent. The modified microport control unit 40 couples signals from the system to a new line card 41 that operates with the multifunction telephone.

The line card 41 includes a conventional connection 42 to the MUX/DEMUX circuit 33 for voice signals. This routes the voice signals to port circuits 0, 8, and 16 that are designated by reference numerals 43A through 43C respectively. Each port has an address, or number; for example, "0", "8", and "16" designate specific ports and correspond to port addresses that are utilized by the system 30 and the microport control unit 40. Each port circuit connects to a multifunction telephone. Three multifunction telephones, 16A, 16B, and 16C, are disclosed. Cables 15A, 15B, and 15C couple port circuits 43A, 43B, and 43C to multifunction telephones 16A, 16B, and 16C respectively. Each cable contains two signal paths. For example, cable 15A comprises a voice signal path 45A and a data signal path 46A.

From the foregoing description, it will be apparent that the only structural change to the common equipment 12 is the addition of a new line card 41. All other circuit structure in the common equipment remains the same. In addition, control programs that are utilized by the microport control unit 40 and the common equipment 12 are altered. As a result, the modification of existing common equipment 12 to operate in accordance with this invention requires a minimal effort.

Figure 3:
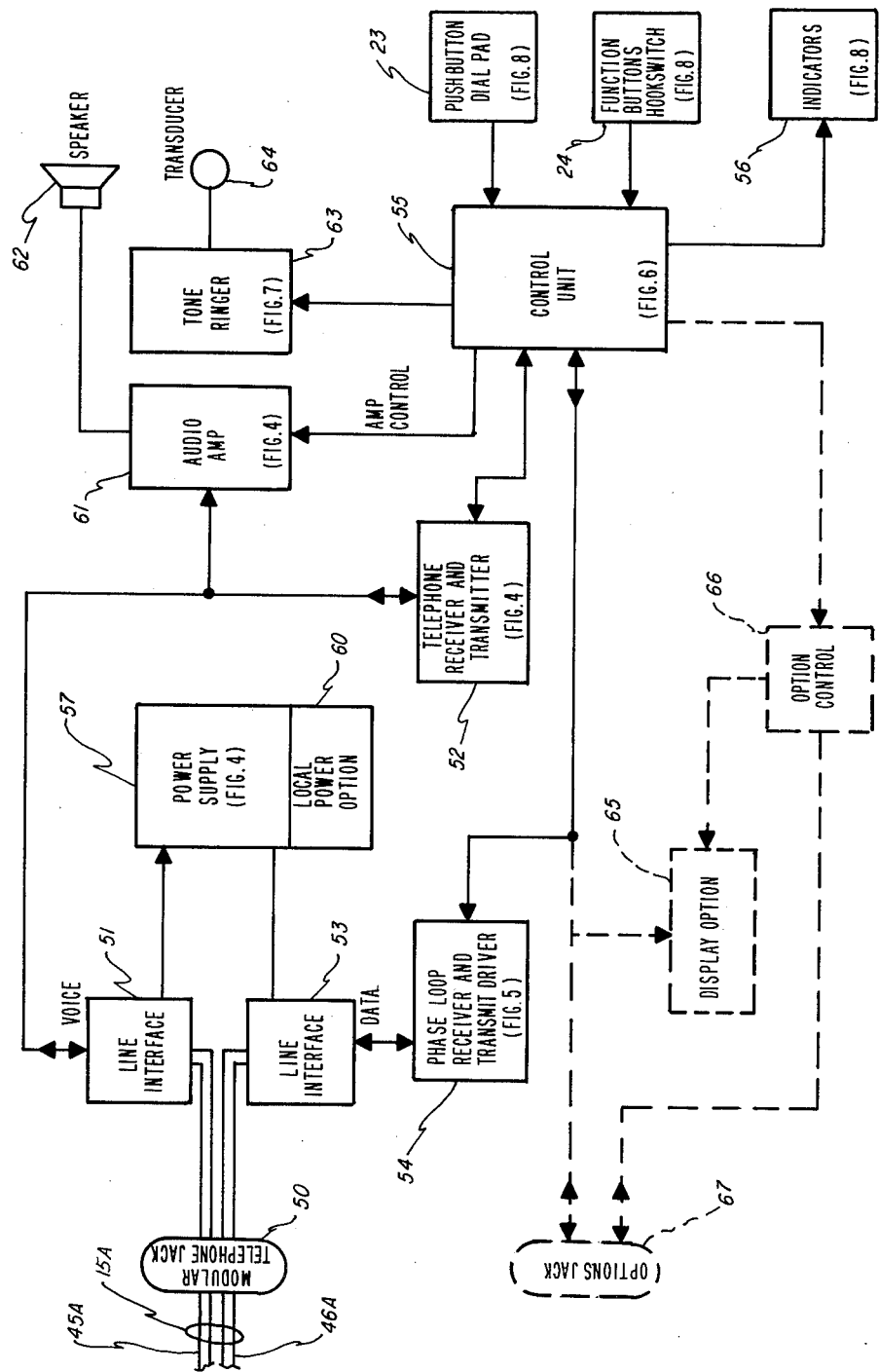
FIG. 3 is a block diagram of a multifunction telephone constructed in accordance with this invention.

FIG. 3 is a block diagram of the multifunction telephone 16A, but is representative of all the multifunction telephones. It includes a conventional, modular telephone jack 50 that connects to the voice signal path 45A and the data signal path 46A of the cable 15A. A line interface circuit 51 couples voice signals between the voice signal path 45A and a telephone receiver and transmitter 52. The telephone receiver and transmitter 52 includes the microphone 21 and earpiece 22 shown in FIG. 1.

In accordance with this invention, the data signals are coupled over the data signal path 46A in a frequency modulated form, specifically a frequency-shift-keyed (FSK) form. Incoming data signals pass through the modular telephone jack 50 and a line interface 53 to be decoded in a phase loop receiver and transmit driver 54. The driver 54 generates digital signals in a serial bit stream that is coupled to a control unit 55. Data is transferred from the multifunction telephone 16A in FIG. 3 to the common equipment 12 when the control unit 55 directly generates frequency-shift-keyed signals that are coupled through the driver 54 and the line interface 53 onto the data signal path 46A.

Referring again to FIG. 2, a typical transfer is initiated by the microport control unit 40 in response to signals from the call processing system 30. As described more fully later, the microport control unit 40 issues a message that includes a unique code that identifies a polling operation and a command message that defines some predetermined function. The command messages are described in detail later; however, as an example, the message might contain an instruction to turn on one specific lamp in one of the buttons. These lamps are depicted as indicators 56 in FIG. 3. This message is received in the control 47 and conveyed to the appropriate one of the port circuits 43A through 43C. Assuming that the message is transmitted to the multifunction telephone 16A, the port 43A converts the information into a predetermined digital form and transmits corresponding FSK signals onto the data signal path 46A.

At the telephone 16A in FIG. 3, the phase loop receiver and transmit driver 54 converts these FSK signals into digital form. The control unit 55 receives the message in digital form, performs the necessary operations to energize the designated indicator 56, and forms a status message. This message may indicate that an error has occurred or, alternatively, it may indicate that one of the buttons in the dial pad 23 or one of the buttons 24 is closed. As previously indicated, the control unit 55 then directly converts this message into an FSK form for transmission back to the common equipment 12.

Referring again to FIG. 2, the line card 41 decodes the status message and the microport control unit 40 processes the message. If one of the function buttons 23 is actuated, the microport control unit 40 utilizes the identification in the message to initiate a sequence of operations corresponding to a predetermined function. If a button on the dial pad 23 in FIG. 3 is actuated, the microport control unit 40 (FIG. 2) accumulates the various dialed digits and then transfers the complete telephone number to the call processing system 31. If a further response is necessary, such as generating a ringing tone in the multifunction telephone 16A, commands from the microport control unit 40 to the multifunction telephone 16A produce that operation. As becomes more apparent latter, in this specific embodiment all supervisory information passes over the data signal path 46A. Only voice signals pass over the voice signal path 45A.

The use of frequency-shift-keyed signalling over the data signal path 46A provides greatly improved performance over long distances. Frequency-shift-keyed signals can be detected to much lower levels because the detection is dependent upon frequency and not upon signal amplitude. It has been found that reliable transmission can occur until a termination impedance of about 1,900 ohms is reached as opposed to approximately 200 ohms in the currently available systems. For wire of a given size, this is approximately a ninefold increase in the potential distance between port 43A and multifunction telephone 16A in FIG. 2 over distances achieved in the prior art.

B. Specific Description

1. Multifunction Telephone Structure

Figure 4:
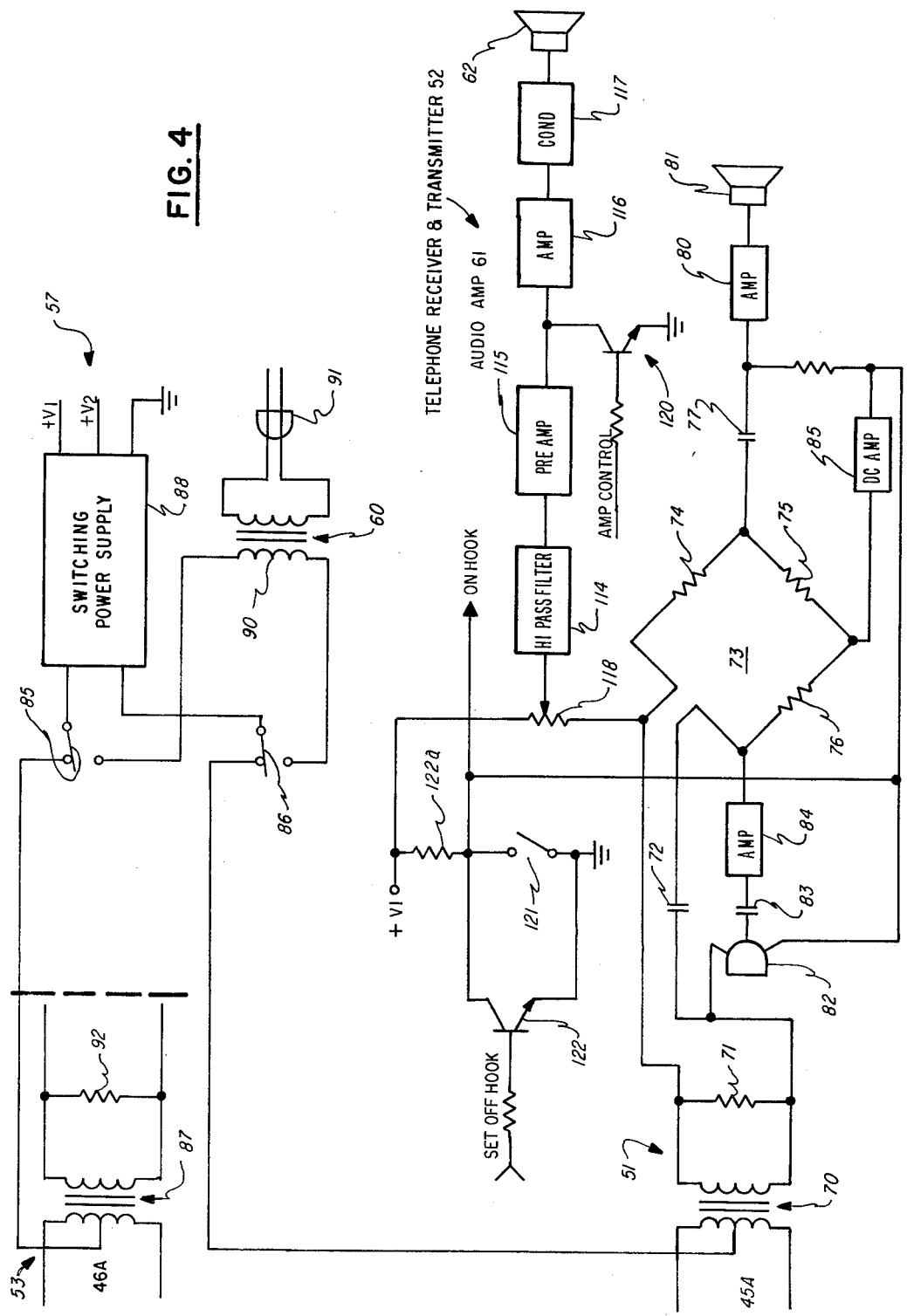
FIG. 4 is a detailed logic diagram of portions of the telephone shown in FIG. 3.

Referring to FIG. 3, the multifunction telephone 16A additionally includes a power supply 57 and a local power option 60 that are further depicted in FIG. 4. The control unit 55 generates an AMP CONTROL signal to control the operation of an audio amplifier 61 that will amplify the incoming voice signals for broadcast by a speaker 62. The audio amplifier 61 and speaker 62 are shown in more detail in FIG. 4.

At various times, it is necessary for audible signals to be generated. Examples include ringing the telephone for an incoming call or signalling the operation of the pushbuttons by means of audible feedback. A tone ringer 63 and transducer 64 that operate under the control of the control unit 55, are shown in more detail in FIG. 7.

The control unit 55 is also adapted for connection to a display option 65, shown in phantom, which operates in response to an option control 66 and which may convey signals through an option jack 67.

a. Voice Signal Path and Telephone Receiver and Transmitter 52

Referring to FIG. 4, a coupling transformer 70 in the voice line interface 51 couples the voice signals to and develops them across a resistor 71 and capacitor 72 that constitute one leg of a bridge circuit 73. Resistors 74, 75 and 76 represent resistive circuits that form the other legs of the bridge 73. As the voltage varies across the leg comprising the resistor 71 and capacitor 72, corresponding signals are developed across the resistor 75. A capacitor 77 couples these signals through an amplifier 80 to a speaker 81 which is the earpiece 22 in FIG. 1.

When a person speaks into the mouthpiece 21 in FIG. 1, a microphone 82, that comprises a variable capacitance device that retains a charge, generates AC signals. A capacitor 83 couples the signals through an amplifier 84 to develop a signal that unbalances the bridge 73 and produces corresponding signals across the leg containing the resistor 71. The transformer 70 then couples the voice signals onto the voice signal path 45A. A DC amplifier 85, connected to the bridge 73, maintains a stable DC reference during transmission. This telephone receiver and transmitter 52 is shown in more detail and described more fully in U.S. patent application Ser. No. 06/060,963.

b. Power Supply 57 and Local Power Option 60

Still referring to FIG. 4, the power suppy 57 is adapted to generate various power supply voltages, designated as +V1 and +V2 voltages, in response to a DC voltage that can be derived either from the signal paths or from a local power source. More specifically, in the position depicted in FIG. 4 coupled switches 85 and 86 connect to center taps from the line side of the transformer 70 and from a transformer 87 that connects to the data path 46A. A common terminal in each of the switches 85 and 86 connects a switching power supply 88. The switching power supply 88 includes an input rectifier circuit, an inverter circuit, a rectifier circuit, and regulators for producing the regulated +V1 and +V2 voltages. This is a conventional switching power supply, and no further discussion of the internal operation of the supply 88 is necessary.

Above certain cable lengths, it will not be possible to derive a sufficient DC supply from the signal paths 45A and 46A. In this case, a local power option 60, comprising a transformer 90 and a conventional plug 91, can be utilized. The switches 85 and 86 are merely moved to their alternate positions, thereby to couple the AC signal, which is reduced by the transformer 90, to the input rectifier of the switching power supply 88.

c. Phase Loop Receiver and Transmit Driver 54

Figure 5:
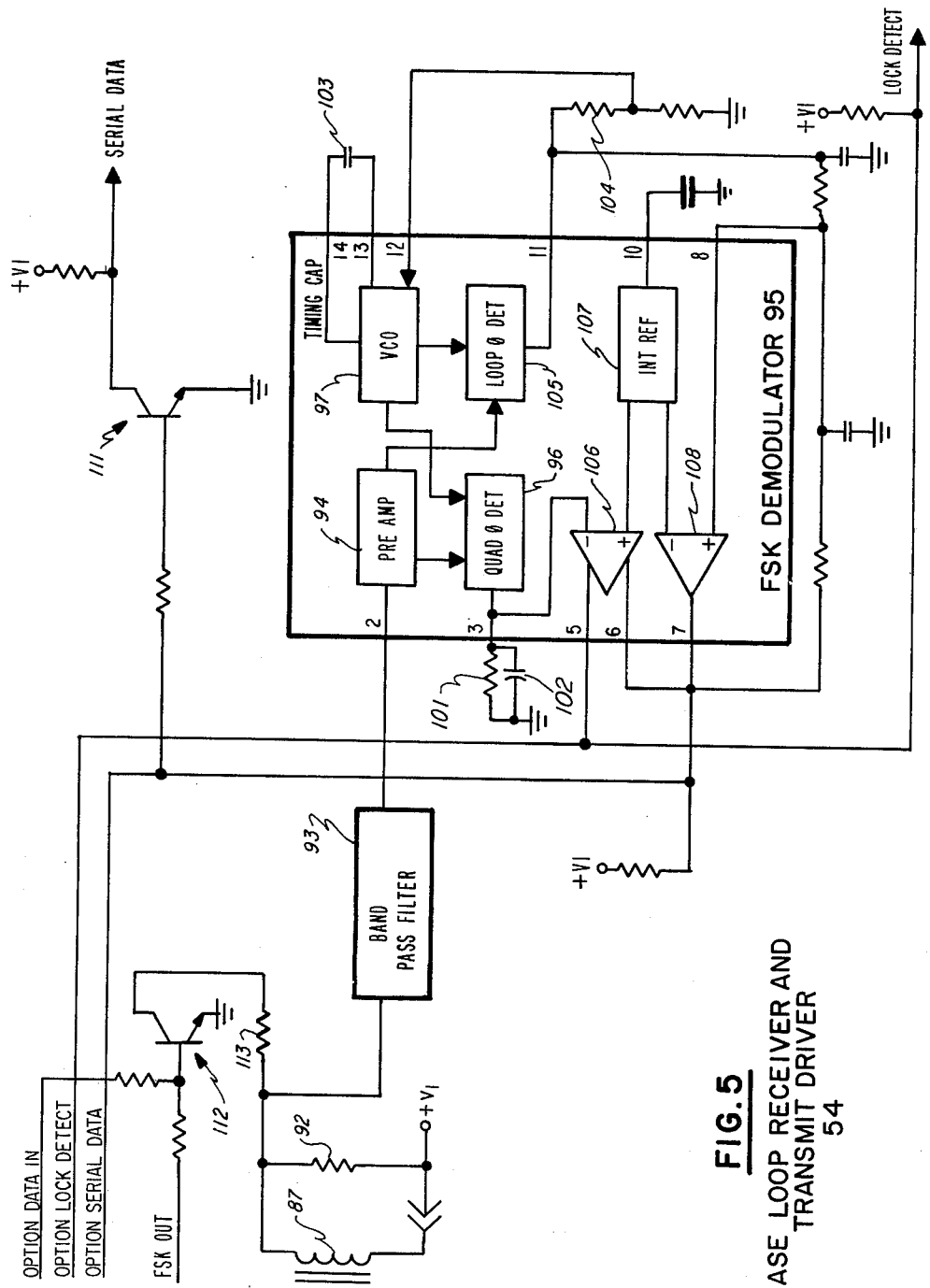
FIG. 5 is a detailed logic diagram of portions of the telephone shown in FIG. 3.

Incoming signals in frequency-shift keyed form are coupled through the transformer 87 shown in FIGS. 4 and 5 to develop a corresponding voltage across a resistor 92 in FIG. 5. The resulting frequency-shift-keyed signal is coupled through a band pass filter 93 to a preamplifier 94 in an FSK demodulator circuit 95. The FSK demodulator 95 in this specific embodiment includes an XR/2211 monolithic phase-lock loop system manufactured by the Exar Corporation. A quadrature phase detector 96 connects to the preamplifier 94 and a voltage controlled oscillator 97 to generate a carrier detect signal after a time delay determined by a resistor 101 and capacitor 102. The voltage controlled oscillator 97 connects to a timing capacitor 103 and a timing resistor network 104 that determines the center frequency for the oscillator 97. The FSK demodulator 95 also includes a loop phase detector 105 and a comparator circuit 106 that compares the output from the quadrature phase detection circuit 96 to a reference signal from an internal reference 107 thereby to generate a binary LOCK DETECT signal that is asserted when a phase lock condition exists. Another comparator circuit 108 provides FSK demodulation.

Two signals of importance are generated by the FSK demodulator 95. The LOCK DETECT signal is asserted by the comparator 106 whenever a phase lock condition exists. A SERIAL DATA signal is generated by a transistor switch 111 in response to the demodulated signals from the comparator 108. Thus, the transistor switch 111 operates as a drive for SERIAL DATA signals that are coupled to a T1 input of the control unit 55 shown in FIG. 6.

During transmission, the control unit 55 (FIG. 6) produces FSK signals on an FSK OUT conductor, and these signals are coupled to a transistor switch 112 in FIG. 5. The switch 112 connects through a resistor 113 and resistor 92 to the +V1 supply voltage. Thus, the switch 112 impresses frequency-shift-keyed signals across the resistor 92 to be coupled across the transformer 87 onto the data signal path 46A in response to the FSK OUT signals.

d. Audio Amplifier 61 and Speaker 62

As previously indicated, the control unit 55 generates an AMP CONTROL signal to control the operation of the audio amplifier 61 in FIG. 3. Referring again to FIG. 4, the audio amplifier 61 includes a high pass filter 114, a preamplifier 115, an amplifier 116, and conditioning circuits 117 that connect to the speaker 62. The audio amplifier connects to a potentiometer 118 thereby to control the volume of the sound from the speaker 62. When the AMP CONTROL signal is asserted (i.e., is at a positive voltage), it energizes a transistor 120 and grounds the input of the amplifier 116, thus disabling the amplifier 116 and the speaker 62. When the AMP CONTROL signal is at a nonasserted level, the transistor switch 120 does not conduct, so signals pass from the preamplifier 115 through the amplifier 116 to drive the speaker 62.

e. Hook Switch Circuit

Still referring to FIG. 4, each telephone includes a hook switch represented as a switch 121 that responds to the movement of the cradle 25 in FIG. 1. The hook switch 121 in FIG. 4 is open, or nonconducting, when the handset is on the cradle. At various times during the operation of the multifunction telephone, the control unit 55 generates a SET OFF HOOK signal. When this signal is asserted, it biases a transistor 122 into conduction and grounds the microphone 82 and bridge 73 so they are operative. The transistor 122 is in parallel with the hook switch 121. Therefore it forces an off hook condition at various times, even when the telephone handset is on the cradle.

The transistor switch 122 and the hook switch 121 are coupled through a resistor 122A to the +V1 voltage. Thus, when both the switches 121 and 122 are in a nonconducting state, an ON HOOK signal is asserted. The ON HOOK signal is an input signal to the control unit 55.

f. Tone Ringer 63 and Transducer 64

Figure 6:
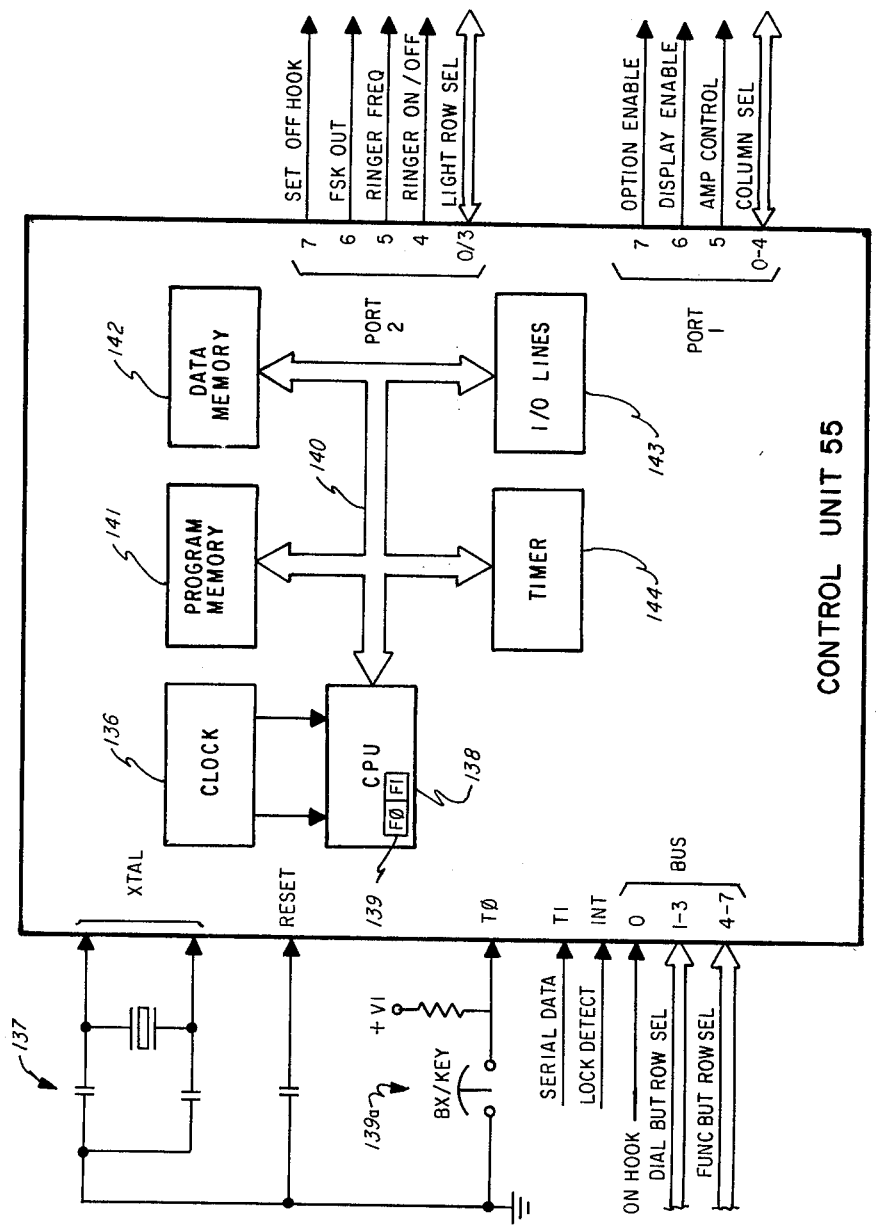
FIG. 6 is a detailed logic diagram of portions of the telephone shown in FIG. 3.
Figure 7:
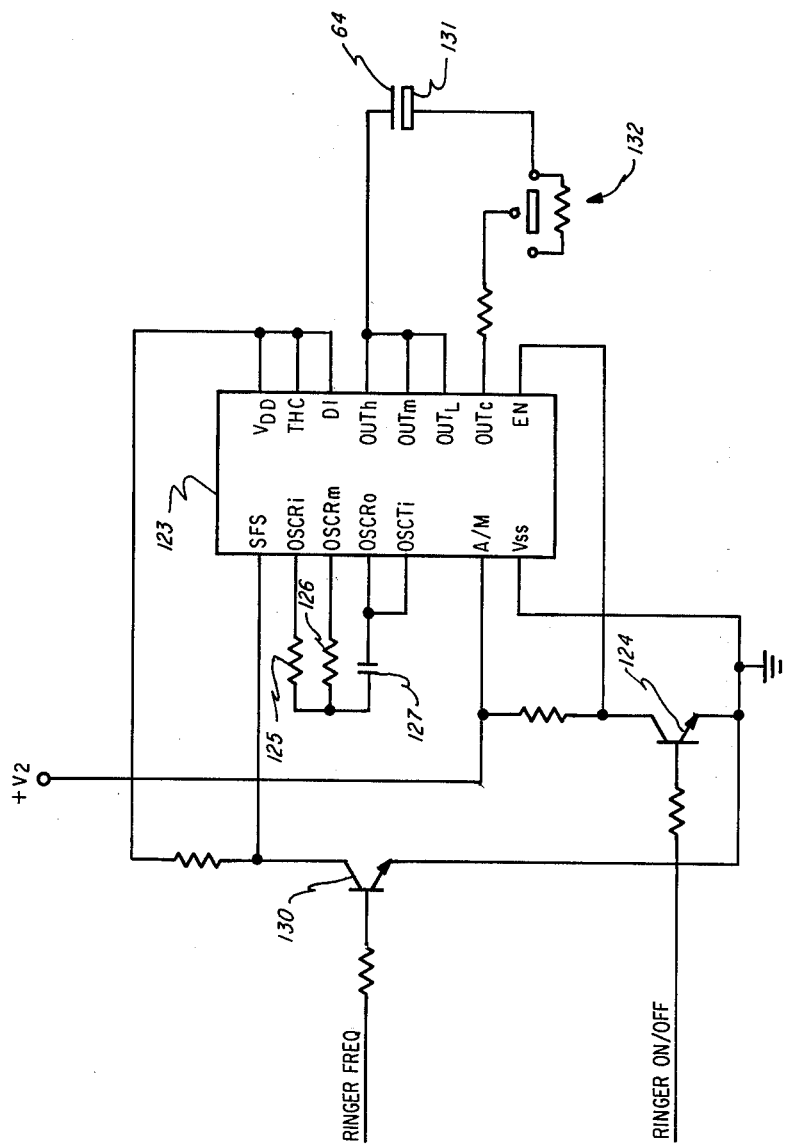
FIG. 7 is a detailed logic diagram of portions of the telephone shown in FIG. 3.

Referring to FIG. 7, the tone ringer 63 comprises an AMI 2561 Tone Ringer Circuit 123 manufactured by American Microsystems, Incorporated. A RINGER ON/OFF signal turns the tone ringer circuit 123 on and off. More specifically, this signal, which is generated by the control unit 55 in FIG. 6, drives a transistor switch 124 that enables the tone ringer circuit 123 when the RINGER ON/OFF signal is not asserted.

The tone ringer circuit 63 also can be switched, when enabled, to produce either a single characteristic frequency or a mixture of two characteristic frequencies. The two characteristic frequencies are selected by resistors 125 and 126 and a capacitor 127 that connect to various oscillator timing inputs of the tone ringer circuit 123. A RINGER FREQ signal from the control unit 55 controls the conduction of a transistor switch 130 that connects to a single frequency source (SFS) control input of the tone ringer circuit 123 and thereby controls whether the single or dual tone ringing is produced.

The output signal from the tone ringer circuit 123 is coupled to the transducer 64 which includes a cavity resonator 131 and a control circuit 132. The control circuit 132 defines "loud", "soft", and "off" positions. In FIG. 7 the circuit 132 is depicted as comprising a slide switch in the "off" position. Moving the slider to the right in FIG. 7 produces a loud tone; moving the slider to the left produces a soft tone.

The tone ringer 63 shown in FIG. 7 provides a number of audible functions for control and alarm purposes. For example, it generates a ringing signal at the telephone to alert people that someone is calling in on the telephone. As the user actuates various dial control buttons, it also produces the audible feedback signals that indicate the striking of those buttons.

g. Control Buttons 23 and 24 and Display Lights 56

Figure 8:
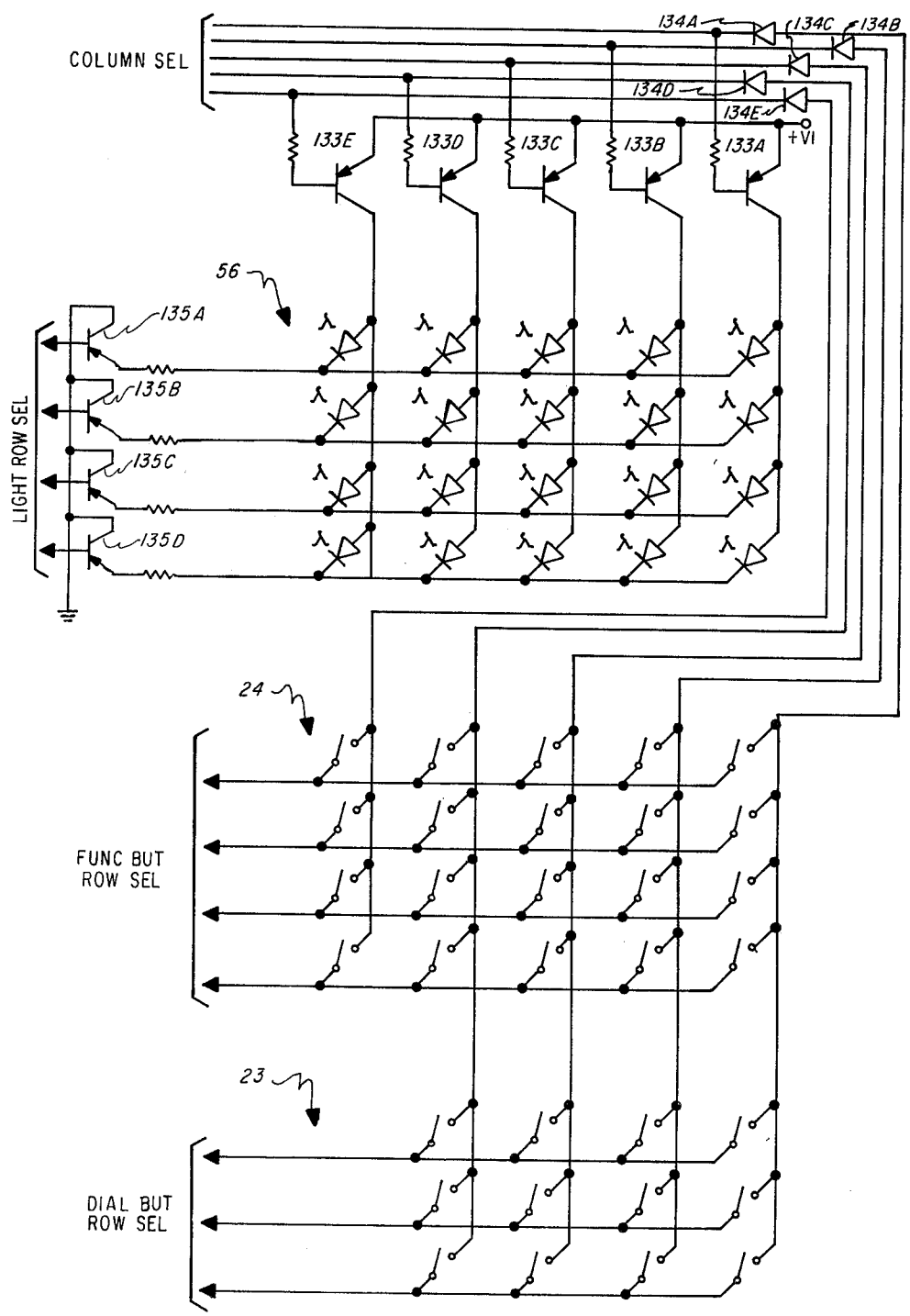
FIG. 8 is a detailed logic diagram of portions of the telephone shown in FIG. 3.

Referring to FIG. 8, the dial buttons 23, the function buttons 24, and the lights 56 are arranged in a matrix. A particular position or positions on the matrix is selected by coincidence of COLUMN SELECT signals and row selection signals. More specifically, LIGHT ROW SEL signals are applied to individual rows of the indicators 56 and COLUMN SEL signals are applied to transistor switches 133A through 133E that individually connect to column conductors from the indicators 56 and through diodes 134A through 134E to the column conductor in the buttons 23 and 24. If the COLUMN SEL signal that energizes transistor switch 133E is asserted, then the four light-emitting diodes connected to that transistor switch 133E are enabled. Any of those four that are connected to LIGHT ROW SEL conductors that are held at a nonasserted, or zero, level will be illuminated through corresponding switching transistors 135A through 135D that ground the corresponding row conductors.

To monitor the various function buttons 24, the control unit 55 in FIG. 6 shifts a COLUMN SEL signal to a low level. Then the control unit 55 reads the FUNC BUT ROW SEL signals that are coupled through the diodes 134A through 134E thereby to ascertain, for the selected column, which of the buttons have been actuated. An analagous operation occurs for the dial buttons, which are monitored by DIAL BUT ROW SEL signals.

h. Control Unit 55

The control unit 55 comprises a microprocessor system. One such system includes an 8049 microcomputer manufactured by Intel Corporation. The components in the microcomputer are shown in FIG. 6 and include a clock 136 that is energized by a crystal oscillator 137. The clock 136 provides timing signals to a central processor unit 138 that includes two flags 139 that are designated as F0 and F1 flags. A bus 140 connects the central processor unit 138 to a program memory 141, a data memory 142, various I/O lines 143, and a timer 144. The timer 144 provides an internal interruption of the central processor unit 138 when a predefined interval has elapsed. The various I/O lines 143 connect to PORT 1 lines that include, at bit positions of increasing bit significance, conductors for the COLUMN SEL signals, the AMP CONTROL signal, a DISPLAY ENABLE signal, and an OPTION ENABLE signal. PORT 2 conductors include, at positions of increasing bit significance, conductors for the LIGHT ROW SEL, RINGER ON/OFF, RINGER FREQ, FSK OUT, and SET OFF HOOK signals. There is also a bidirectional bus connection which includes, in order of increasing bit significance, conductors for the FUNC BUT ROW SEL, DIAL BUT ROW SEL, and ON HOOK signals. The LOCK DETECT signal from the FSK demodulator 95 in FIG. 5 is applied to an interrupt (INT) input. More specifically, if the LOCK DETECT signal is asserted, an interrupt is produced, providing interruptions are enabled. The SERIAL DATA signal from the FSK demodulator 95 in FIG. 5 connects to a T1 testable input. A switch 139a defines a binary input signal to a T0 input thereby to allow certain modifications to occur in the program, depending upon whether the connection that the multifunction telephone is to be used with a digital private branch exchange type or with a key telephone system type of telephone network.

2. Common Equipment 12

Figure 10:
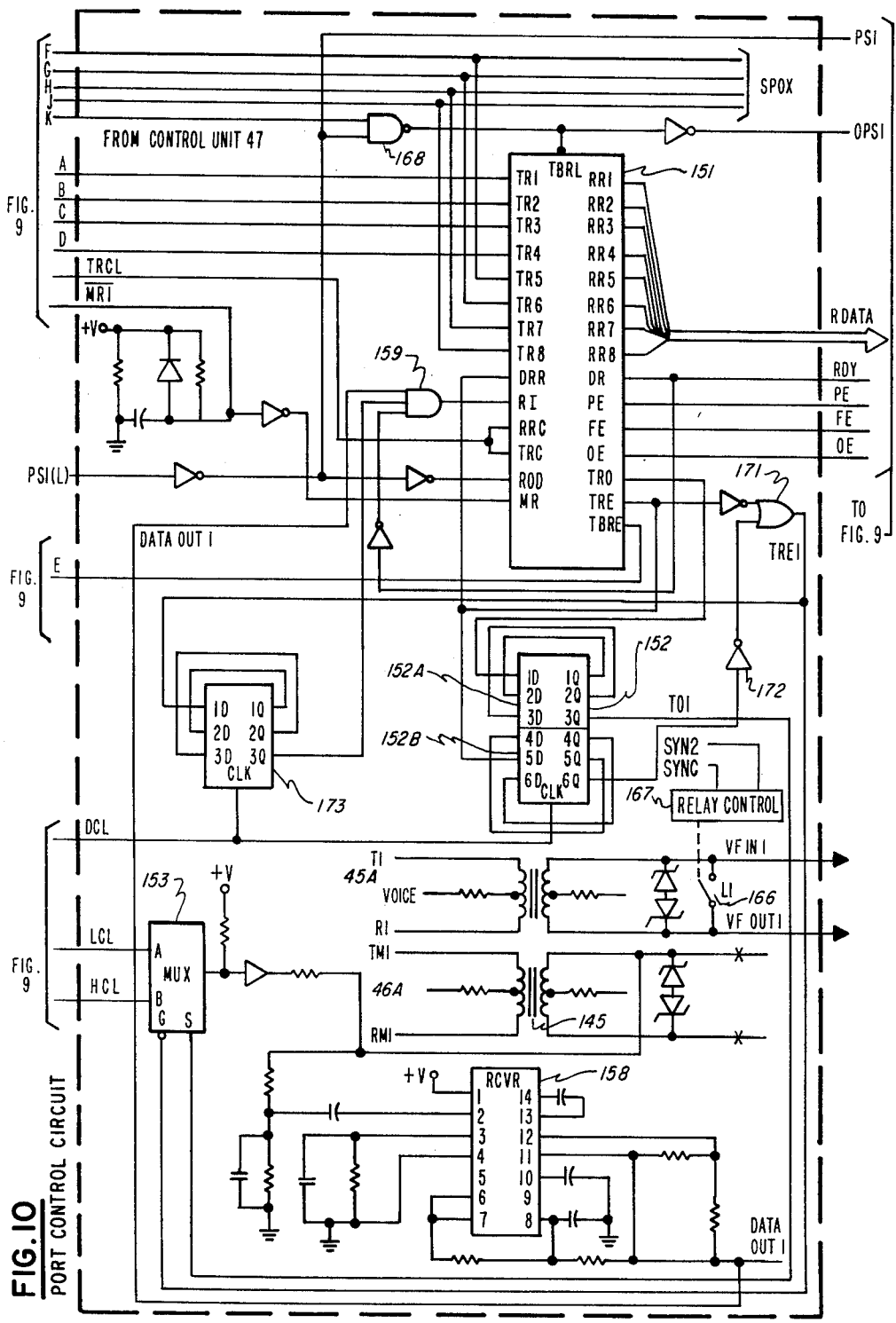
FIG. 10 is a detailed logic diagram of portions of the common equipment shown in FIG. 2.

As previously discussed with respect to FIG. 2, a line card 41 for interconnecting the cables 15 with a microport control unit 40 and connection equipment 33 comprises a voice path connection 42, a plurality of port circuits 43, and a line card control circuit 47. FIG. 9 depicts one embodiment of a line card control circuit 47. FIG. 10 depicts an embodiment of one port circuit 43A.

The call processing system 30 polls individual ones of the standard telephones 14 and multifunction telephones 16 to establish communications. When a specific telephone is polled, supervisory information is transferred through a corresponding microport control unit that converts commands from the call processing system 30 into sequences of supervisory information that control the operation of the line card. In addition, each microport control unit retrieves sense information that indicates the status of the line cards and the telephone including dialed digit and on hook information. The specific nature of the supervisory and sense information for standard telephones is described in U.S. patent application Ser. No. 855,181.

Communications between the microport control unit 40 and the line card 41 are analogous to the transfers between the microport control unit 36 and the line card 34. More specifically, a transfer with one of the ports 43 is initiated when the microport control unit transfers supervisory information on SPOX conductors that connect to the control 47 (FIG. 9) and a port strobe signal PS that identifies a specific port circuit and corresponding telephone. This supervisory information has a specific form that uses three successive transfers. In succession, these transfers send synchronizing data, x data and y data to the line card. The x data and y data define an operation to be performed. As the microport control unit transfers supervisory information into the control 47 in FIG. 9, it retrieves the status information in the form of SPIX sense signals from a prior polling operation.

Figure 11:
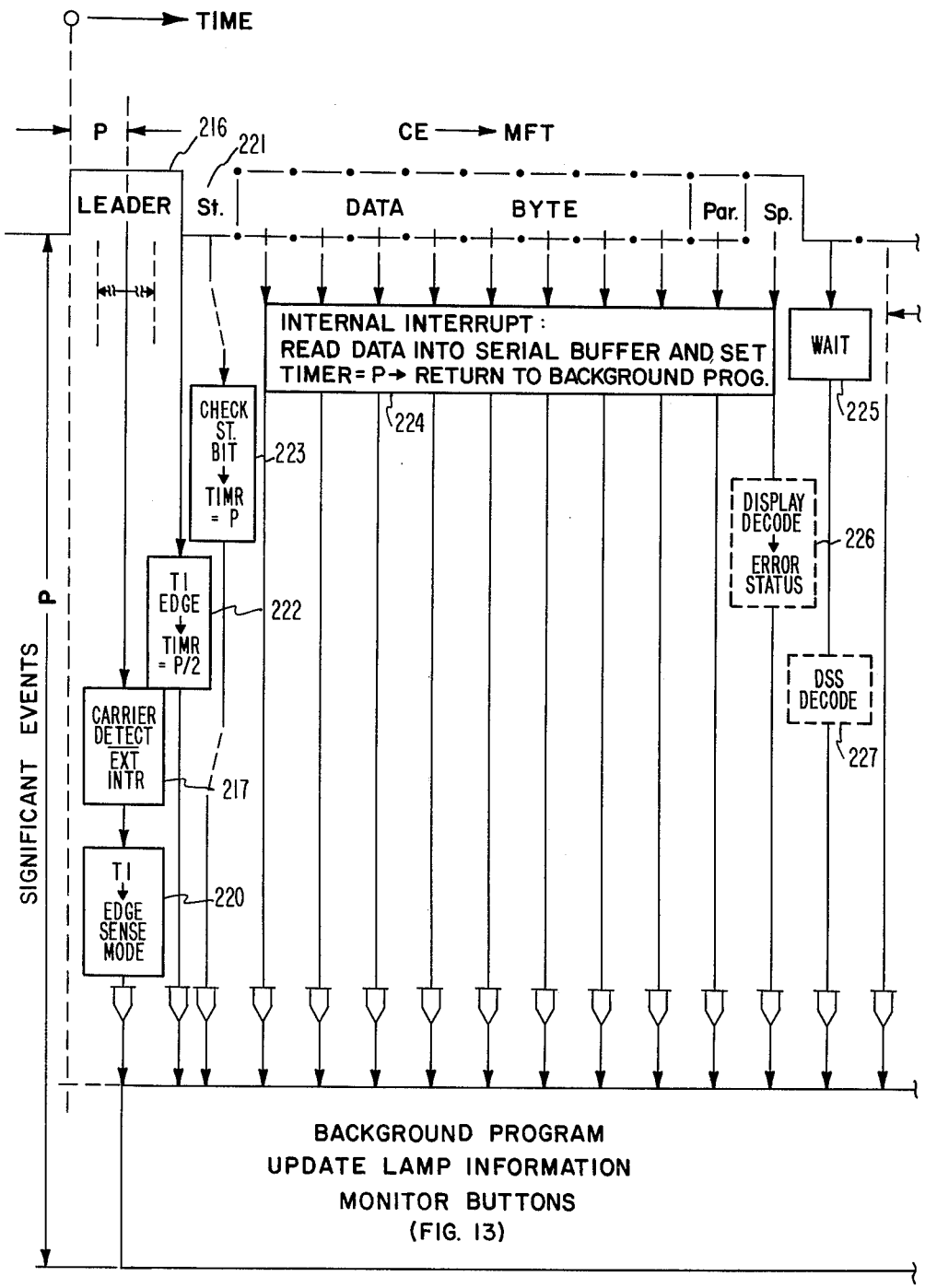
FIG. 11 depicts the format of the messages that are transferred between the multifunction telephone and common equipment.

By inspection, FIG. 11 discloses that the x data defines a group of commands and is in the nature of an operation code. For example, x data with a value of "0" or "1" specifies an operation for energizing the indicators 56 in FIG. 3 whereas x data having a value "F" specifies one of several control operations. The y data then further acts either as a specifier to identify the indicator or as a supplemental operation code. Specifically, for x data values of "0" and "1", the y data specifies which particular indicator is to be turned on; for x data having a value of "F", the y data defines a specific function.

The control unit 47 buffers this supervisory information from the microport control unit 40, and the port circuit 43, such as shown in FIG. 10, converts this information into the message format that is disclosed in FIG. 11 for transmission onto the data signal path 46A (FIG. 2). Specifically, the message comprises, in sequence, two leader bits, a start bit, the x data bits and y data bits, a parity bit, and at least one stop bit. The leader bits enable a receiver that includes a phase lock loop to detect the incoming message. The start bit allows the receiver to synchronize with the incoming message. The parity bit indicates the parity of the data byte comprising the x data and y data bits, and the stop bit indicates that the message has terminated. This message is transferred through a coupling circuit represented by a coupling transformer 145 in FIG. 10 onto the data signal path 46A.

After the multifunction telephone receives a message with supervisory information, it returns a message having the same form as shown in FIG. 11. This incoming message is received by the port circuit shown in FIG. 10, but only after the status information from a prior polling operation has been removed from the control 47. The port circuit shown in FIG. 10 decodes this information and converts it into parallel form for transfer to the control 47 during a next polling operation.

a. Control Circuit 47

Referring again to FIG. 9, the line card 41 operates in response to clocking signals from an oscillator 146 and a clock divider 147. The clock divider 147 produces a TRCL signal as a basic clocking signal (e.g., 12.8 kHz). A DCL clocking signal has a frequency corresponding to a baud rate (i.e., the rate at which bits in a message are transferred) over the data signal path. In one specific embodiment, the DCL signals have a frequency of 800 Hz. The LCL and HCL clocking signals from the clock divider 147 correspond to the mark and space frequencies (e.g., 1600 Hz and 2400 Hz respectively).

Incoming supervisory information is coupled to a latch 148 in response to a port strobe (PS) signal. In FIGS. 9 and 10 signals, such as the PS signal, are shown with a suffix "(L)" that indicates that the signal is a ground assertion signal; that is, the signal is logically true when it is at a low or ground level. If there is no suffix, the signal is a positive assertion signal; that is, the signal is logically true when it is at a positive level. As only four bits of information can be transferred over the SPOX conductors in parallel (i.e., a data "nibble" that is one-half a data "byte"), the latch 148 buffers the x data nibble so it can be obtained in parallel with the successive y data nibble as the data byte in FIG. 11. The latch 148 also contains a SYNC FF 1 flip-flop 149 and a SYNC FF 2 flip-flop 150 that are used in decoding the incoming message from the microport control unit.

b. Line Card 41

Now referring to FIG. 10, the incoming supervisory information from the latch 148 in FIG. 9 and from the SPOX conductors are applied in parallel to TR inputs of a universal asynchronous receiver/transmitter (UART) 151. One such UART is a TR1863A asynchronous receiver/transmitter manufactured by Western Digital Corporation. The UART responds to the TRCL clocking signal at its TRC clocking input by coupling data bytes at the TR inputs in seriatim through a transmitter buffer register to a transmitter register. A TBRL input signal is asserted to load data bytes into the transmitter buffer register. TBRE and TRE signals are asserted whenever the transmitter buffer register and the transmitter register, respectively, are empty. When the transmitter register contains a data byte, the TRE signal shifts to a nonasserted state and disables the receiver through a DRR(L) input. The x and y data nibbles then are transmitted serially from a transmitter output (TRO) to a shift register 152 that affixes the leader to the message so that a TO1 binary signal corresponds to the message to be transmitted. The TO1 signal controls the transfer of the mark and space signals through a multiplexer 153 and then through the transformer 145 for transmission onto the data signal path 46A.

When status information is being received from one of the port circuits 43, it is received as a data byte designated as RDATA signals. As each PS1 port strobe transfers successive nibbles to the line card 41, it also energizes an ROD input to the UART 153. These signals then cause a line card status data nibble and the x and y data nibbles from the UART 151 to be transmitted onto the SPIX sense conductors as successive nibbles by data selectors 154 through 157.

More specifically, data signals from the coupling transformer 145 pass through a receiver 158 and a gate 159 to a serial receiving input (RI) of the UART 151. The UART 151 then assembles the data received in serial form into parallel form. TRCL signals also drive the receiving circuitry through an RRC receiver clocking circuit. When the data has been assembled, the UART 151 enables a data ready (RDY) signal at a DR output in FIG. 10 and the RDY signal is then asserted in coincidence with the assertion of the corresponding port strobe signal.

The UART 151 also produces various error signals, including a parity error (PE) signal, a framing error (FE) signal, and an overrun error (OE) signal. Universal asynchronous receiver/transmitters such as the UART 151 shown in FIG. 10 are well known in the art, and so no further discussion of the internal operation of the UART 151 is necessary. If the message is scanned without error, the RDATA is applied to the data selectors 154 and 155 thereby to be selectively retrieved by the microport control unit 40 during the next polling operation.

3. Operation a. Microport Control Unit 40 to Line Card 41

Whenever it is time to poll the multifunction telephone 16A shown in FIG. 2, the microport control unit 40 initiates the three transfers to the line card 41. In the embodiment shown in FIGS. 9 and 10, the line card receives a hexadecimal "D" during the synchronizing transfer. Reference to FIG. 11 indicates that this character is reserved to the common equipment. It is not a valid character for either the x data or y data nibbles at the telephone. However, the line card 43A responds to messages "D", "DDD", and "DD0" and the telephone responds to a message with an x data nibble of "D" by returning a status message. Receivers 160 couple each successive data nibble to a decoder 161 that includes AND gates and inverters for generating a SYNC DECODE "D" signal any time a "D" appears on the SPOX conductors. Although the resulting SYNC signal enables a flip-flop 162 to be set, the flip-flop 162 does not set during a transfer to the telephone. The coincidence of the energization of the decoder 161 and a port strobe signal energizes an AND gate 163 when the SYNC FF 2 flip-flop 150 is cleared. When this occurs, an OR gate 164 produces a clocking input to the latch 148. This loads the "D" into four stages of the latch 148. In addition, the SYNC FF 1 flip-flop 149 sets and enables the next PS pulse to energize an AND gate 165 that is also enabled when the SYNC FF 2 flip-flop is cleared.

When the x data nibble is sent, the corresponding port strobe signal energizes the AND gate 165, so the OR gate 164 clocks the latch 148 again, now storing the x data nibble in the latch 148. In addition, the SYNC FF 2 flip-flop 150 sets as its data input is connected to the asserted output of the SNYC FF 1 flip-flop 149. This disables both the AND gates 163 and 165, so no further data nibbles can be loaded into the latch 148. Then the next PS strobe is sent with the y data nibble on the SPOX conductors.

As previously indicated, the microport control unit 40 in FIG. 2 also transmits supervisory information to control the various port circuits including the port circuit 43A. Two messages, "DDD" and "DD0" control a loop around relay 166. This relay 166 is used for testing the port circuit during an idle mode; and, as shown in FIG. 10, a relay control circuit 167 controls the relay 166. Both messages are transferred to the corresponding telephone over the data signal path 46A, but there is no response by the telephone except to return status information. The first "D" again is a synchronizing signal. When the control 47 receives the second "D", the decoder 161 in FIG. 9 again conditions the flip-flop 162 to be set at the trailing edge of the second port strobe (PS) pulse. This produces a SYN2 signal. When the control 47 receives the third port strobe pulse, the SYNC DECODE "D" signal will be either asserted or not asserted, depending upon whether the relay is to be energized. At the end of the message, the flip-flop 162 is set and enables the control circuit 167. The SYNC signal then controls the energization of the relay 166.

b. Line Card 41 to Multifunction Telephone 16A

Now referring to FIG. 10, a NAND gate 168 generates an OPS1 signal in response to the coincidence of the SYNC FF2 signal and a PS1 signal for the port circuit 43A in FIG. 11 during the third port strobe when the y data nibble is transferred. When asserted, the OPS1 signal loads the x data nibble from the latch 148 and the y data nibble from the SPOX conductors in parallel into the transmitter buffer register of the UART 151. The TBRE signal then shifts to a nonasserted level and this signal is coupled back through OR gates 169 and 170 in FIG. 9 to clear the latch 148. With this data transfer to the transmitter register, a TRE signal shifts to a nonasserted state and conditions the complemented DRR input of the UART 151 to reset the PE, FE, and OE signals and initialize the UART 151. An OR gate 171 also asserts a transmitter enabled TRE1 signal that is coupled to an enabling input of the multiplexer 153 thereby to allow the transfer of HCL clocking signals to the data signal path 46A.

The data for controlling the transfer between the two frequencies is supplied through the shift register 152. Serial data from the UART 151 must pass through the three stages 152A of the shift register 152, so the shift register 152 acts as a delay for the start bit and the x and the y data nibbles and permits the leader bits to be appended to the beginning of the message. More specifically, during an idle state the TRO signal is at a high level to constitute a stop bit and the TRE signal is asserted as the transmit register is empty. As a result, the TRO and TRE signals condition sections 152A and 152B respectively, so that all the stages are set by the succession of DCL clocking signals.

When a transmission begins, the TRO signal output shifts to a "0" level corresponding to a start bit and the TRE signal shifts to a nonasserted state and energizes the OR gate 171. Successive DCL clocking signals transfer ONE's onto the TO1 conductor until the start bit passes through the shift register section 152A. This may comprise two or three clock pulses depending upon the specific sequence and timing of the change of states of the DCL and TRO signals from the UART 151. After these bits, the y and x data nibbles are transmitted in succession before the stop bit.

With the three stage delay of the shift register 152A, the TRE1 signal from the OR gate 171 must be forced to an asserted level even after the transfer from the UART 151 ends. During the transmission, all the stages in the section 152 are cleared, so that an inverter 172 energizes the OR gate 171. When the TRE signal shifts to an asserted state at the end of the transmission from the UART 151, three additional DCL clock pulses are required to condition the inverter 172 so that the TRE1 signal terminates.

When the transmission from the UART 151 is complete, the TRE signal ceases to provide an overriding signal to the DRR input thereby to enable the receiving portion of the UART 151 prior to the actual completion of transmission through the modulator comprising the multiplexer 153. Another latch 173 delays the transfer of any received data until a time interval after the completion of the transmission from the latch 152A. This prevents spurious signals from being received. Specifically, the various stages in the shift register 173 are cleared in response to the TRE1 signal during a transmission. This disables an AND gate 159 and, with the TRE signal at the DRR inputs, prevents any response to the incoming signals. When the TRE1 signal shifts to a nonasserted state at the end of the transmission, three additional DCL clock pulses are required to allow the shift register 173 to set the stage that enables the AND gate 159. Thus there is a period of time between the transmission of a message and the subsequent receipt of a message during which the receiving portion of the UART 151 continues to be disabled, and this time corresponds to the interval shown between the messages shown in FIGS. 12A and 12B. Thus, the line card transmits the message over the data signal path 46A as frequency-shift-keyed signals.

c. Multifunction Telephone 16A

As described in detail later, the multifunction telephone receives this message and converts it into a digital message in the phase loop receiver 54 shown in FIG. 5. The control unit 55 assembles and processes the incoming message thereby to control a corresponding output function, such as ringing the telephone or energizing indicators. Concurrently with the assembly of incoming messages, the control unit also monitors various other functions, such as activation of a dial pad button. Then the control unit 55 composes a return message.

When the leader bits are received, the FSK demodulator 95 in FIG. 5 generates the LOCK DETECT signal that conditions the control unit 55 to receive and process the message to be returned to the common equipment and transmits the message in a frequency-shift-keyed form onto the data signal path 46A.

d. Multifunction Telephone 16A to Line Card 41

Now referring to FIG. 10, the incoming frequency-shift-keyed signals on the data signal path 46A are coupled to the FSK demodulator 158 that is similar to the FSK demodulator 95 shown in FIG. 5. The resulting serial data stream then passes through the AND gate 159 that is now enabled, to appear as received data at the RI input of the UART 151. The UART 151 assembles this data stream after receiving the appropriate number of bits and then asserts an RDY signal at a data ready (DR) output with the next PS signal. The RDY signal is complemented to disable the AND gate 159 and block the receipt of any further serial data at the RI input. The UART 151 then can transmit the data byte in parallel at RR outputs in coincidence with a corresponding port strobe. If an error exists, the UART 151 will generate an OE signal if an overrun is detected, a PE signal for a parity error, and an FE signal for a framing error concurrently with the RDY signal. These error conditions are defined by the UART manufacturer.

The UART 151 continues to store the RDY and any error signals until the next polling operation, so the status and x and y data nibbles can be routed through the data selectors 154 and 155 onto the SPIX sense conductors in response to a sequence of corresponding port strobe signals. Specifically, at the end of the reception of a message from the telephones connected to any line card, the OPS, BPS, and PS signals are at nonasserted levels. This conditions the data selectors to couple status signals through the data selectors 155 and 154, but these signals are not yet applied to the SPIX conductors. The status signals include the RDY signal, an ERROR signal from data selectors 156 and 157, a power up (PU) signal, and a PORT ID signal that is asserted during transfers with the port circuit 43C. Specifically, the various pariy error, framing error, overrun error, and RDY signals from each port circuit are coupled to data selectors 156 and 157. During each port strobe signal, the data selectors 156 and 157 transfer only the corresponding PE, FE, OE and RDY signals. An OR gate 174 then generates the ERROR signal that is coupled to the data selector 155. The RDY signal is also coupled to the data selector 155, as are the power status (PU) signal and the PORT ID signal.

As previously indicated, a transfer of supervisory data to a line card requires a sequence of three corresponding port strobe signals. For the line card shown on FIGS. 9 and 10, three PS1 signals would be sent. These signals also control the transfer of the sense information into the SPIX conductors. During the first PS1 signal, a NOR circuit 158 conditions the data selector 154 to transfer the status information from the B inputs to the data selector 155 onto the SPIX conductors.

When the second PS1 signal is received, the x data nibble is transmitted onto the SPIX conductors. The assertion of the PS1 signal first enables the UART 151 in FIG. 10 to transmit all the received data onto the R DATA conductors. Now the BPS signal is asserted, so the x data nibble is selected by the data selector 155 and is gated into the SPIX conductors.

When the third PS1 signal is received, the UART 151 again transmits all the received data into the R DATA conductors. However, the OPS1 signal is now asserted, by the NAND gate 168 in FIG. 9, so the data selector 154 couples the y data nibble at its "B" input onto the SPIX conductors. Thus, during each polling operation, the microport control unit 40 (FIG. 2) transmits a command over the SPOX conductors and retrieves line card status and telephone status over the SPIX conductors.

4. Detailed Operation of the Multifunction Telephone 16A

Figure 12:
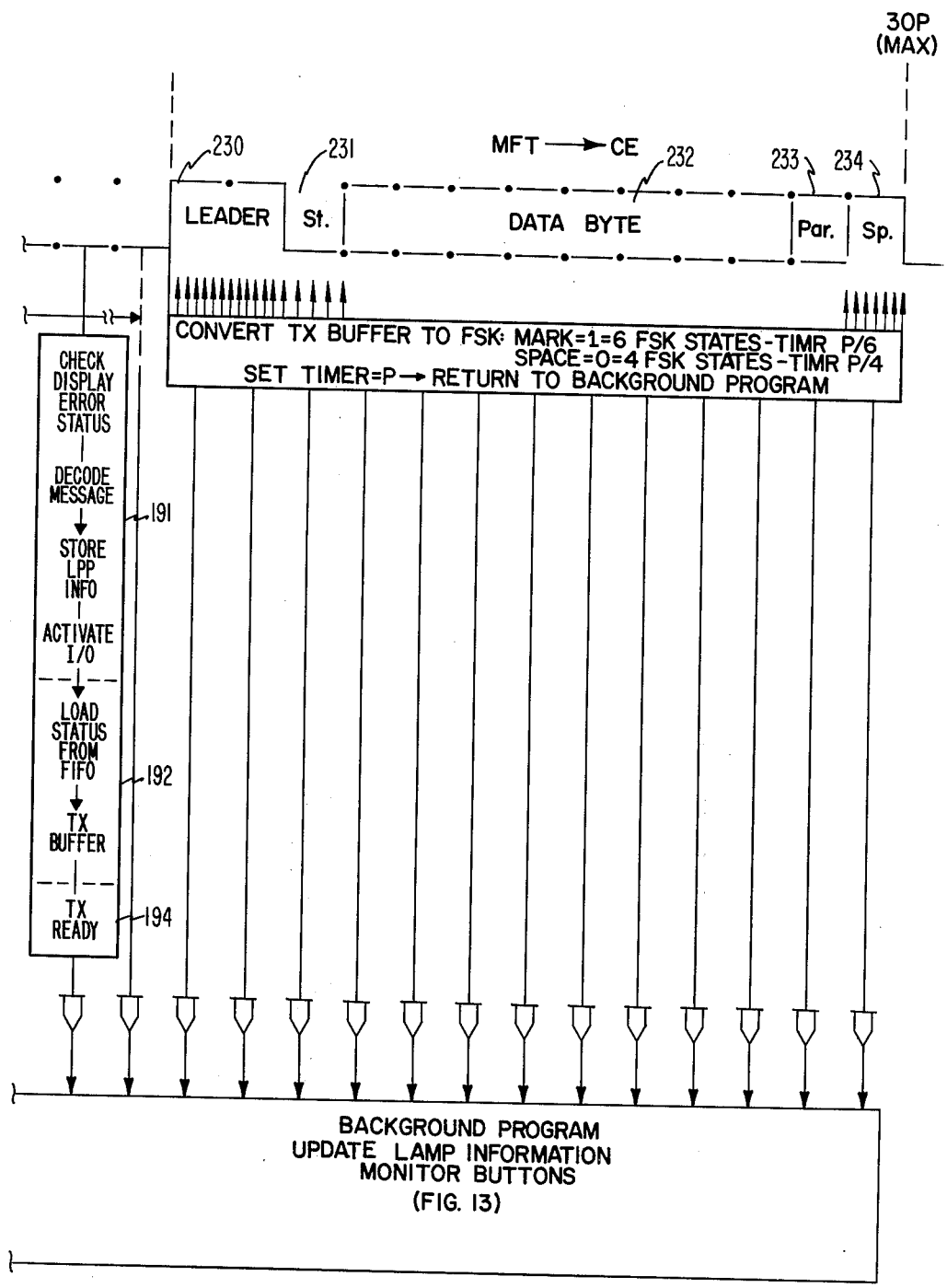
FIGS. 12A and 12B constitute a timing diagram that is useful in understanding the operation of the multifunction telephone system shown in FIG. 3.

To understand various aspects of this invention and specifically the detailed operation of the control unit 55 in FIGS. 3 and 6, it will be helpful first to generally discuss the operation of the control unit 55. The control unit 55 operates with three basic programs in the program memory 141 in FIG. 6. Each program is processed in accordance with a different operating state of the control unit 55. These programs and their corresponding machine states are specified as a "background" program and state; an "external event interruption" program and state; and a "timer interruption" program and state. The interaction of these various states and programs is depicted in FIGS. 12A and 12B and in the flow charts of FIGS. 13 and 14, that relate to the general operation of the background program.

Figure 13:
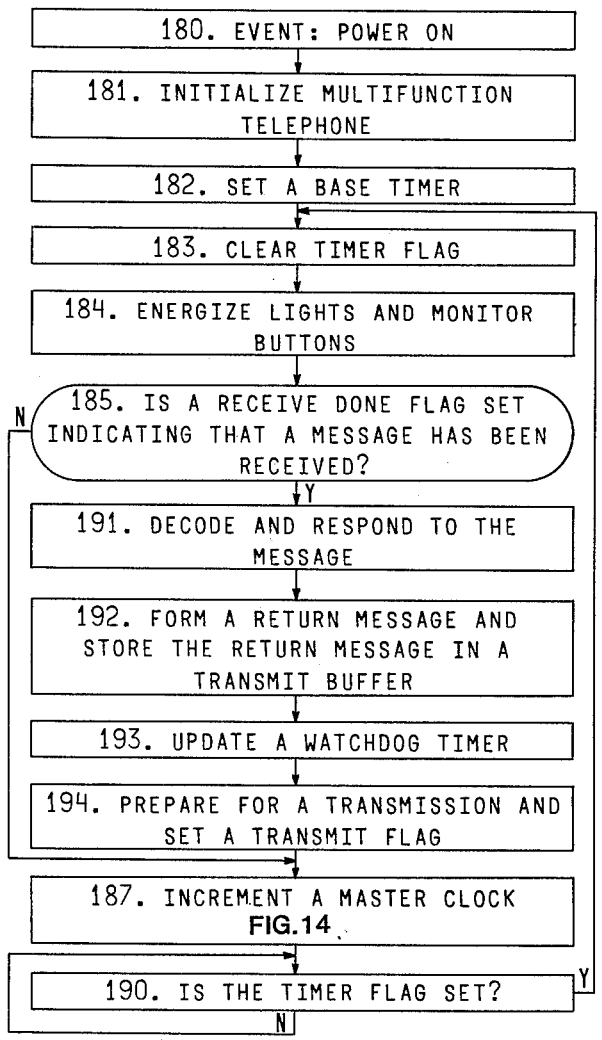
FIG. 13 is a generalized flow diagram that depicts certain operations that occur within the control element shown in FIG. 6.

Referring first to FIG. 13, the control unit begins to process the background program when power is applied to the control unit 55 as shown by step 180. In step 181 the control unit 55 initializes the multifunction telephone and sets a base timer in step 182. This timer controls the intervals between starts of successive iterations of a loop comprising steps 183 through 185, 187, and 190 through 194.

During each iteration the control unit 55 clears the timer 144 (step 183) and utilizes information in the data memory 142 to energize the various lights and monitor the various function and dial pad buttons (step 184). Then the control unit 55 tests to determine whether a complete message has been received from the common equipment (step 185). In an idle state, no such message is being received so step 185 shifts to step 187 to increment a master clock and then, in step 190, tests to determine whether the timer flag has been set. The control unit 55 then remains in step 190 until the base time established in step 182 has elapsed. When this time does elapse, the control branches back to step 183 to begin another iteration.

In one specific embodiment of this invention, data is transmitted over the data signal path at a rate of 800 baud. Thus, each information bit is transmitted in approximately 1.25 milliseconds (ms). This time is designated by "P" at the top of FIG. 12A. In addition, this same period of time corresponds to the vertical distance "P" that is shown in FIG. 12A. Normally each iteration of the loop in FIG. 13 requires less than one baud time to execute. This is true even when the control unit 55 has received a message.

When a message has been received, step 185 in FIG. 13 branches to step 191. In step 191, the control unit decodes and responds to the message that was received and forms a return message that is stored in a transmit buffer (step 192). In step 193, a watchdog timer is updated to indicate that a polling operation has occurred. The watchdog timer disables the multifunction telephone if a predetermined interval (e.g., 10 seconds) passes between successive polling operations. In step 194, the control unit prepares itself for transmitting a message and sets a transmit flag, thereby to enable the transmission of the status message.

Figure 14:
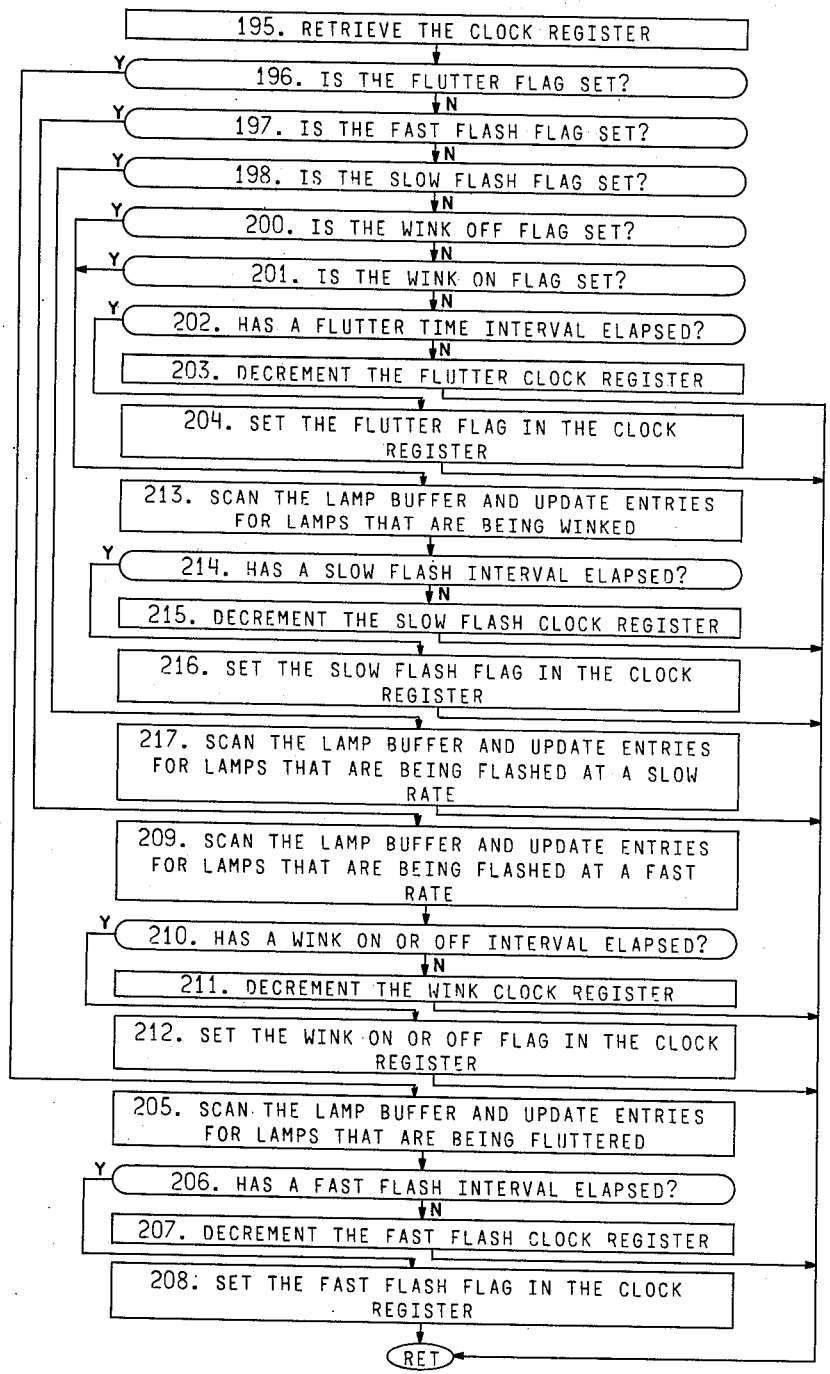
FIG. 14 is a generalized flow diagram that depicts other operations that occur within the control element shown in FIG. 6.

Step 187 in FIG. 13 represents a process by which the control unit updates the output functions it is to perform. This process is shown in FIG. 14 in slightly more specific terms, and it periodically updates a lamp buffer table 142 that is shown in FIG. 15B at locations 2C through 3F in the data memory 142. There is one memory location corresponding to each lamp, and this memory location contains two items of information. The first item is the nature of the illumination of the particular lamp; that is, whether the lamp is turned off or is being flashed or is being winked. The second item establishes a correspondence between the lamp and the row conductors to which it attaches.

A clock register at location 4A, shown in FIG. 15B, is retrieved in step 195 of FIG. 14. This register contains a number of flags. They include a flutter flag, a fast flash flag, a slow flash flag, a wink on flag, and a wink off flag. When any one of these flags is set, the control unit 55 scans and updates the lamp buffer. If no flag is set, steps 196 through 201 branch to step 202 to test a flutter clock register at location 4B in the data memory 142. If the flutter time has not elapsed, the control unit decrements the register and the process is complete. When the flutter time interval does elapse, the control unit sets the flutter flag in step 204. Then the process again is complete.

When the flutter flag is set during an iteration of the loop in FIG. 13, the control unit 55 branches from step 196 in FIG. 14 to step 205 to scan the individual lamp buffers and update the entries for lamps that are being fluttered. When all the lamps have been tested, the control uses step 206 to determine whether a fast flash interval has elapsed. The fast flashing rate is somewhat slower than the flutter rate. If that interval has not elapsed, step 206 branches to step 207 to decrement a fast flash clock register in location 4C (FIG. 15B). Otherwise step 206 branches to step 208 to set the fast flash flag in the clock register.

When the fast flash flag is set during an iteration, step 197 branches to step 209 to scan the lamp buffer to update those entries that indicate a corresponding lamp is being flashed at a fast rate. Then a wink clock register at location 4E is tested in step 210. The winking operation requires two discrete settings of the wink clock register as the duty cycle for winking is not a 50 percent duty cycle as it is for fluttering and flashing. Thus, the timing must be altered depending upon whether the winking lamps are being turned on or turned off. If either interval is not completed, the wink clock register decrements in step 211. Otherwise the wink on or wink off flag is set in step 212.

Each time the wink on or wink off flag is set, step 200 or step 201 transfers control to step 213 to update the entries. Then, in steps 214 through 216, a slow flash clock register at location 4D is tested to control the updating of that register and setting of the slow flash flag. If the slow flash flag is set, step 198 branches to step 217 to update the slow flashing lamp entries in the lamp buffer.

Referring again to FIGS. 13 and 12A, the control unit 55 processes the loop, including steps 183 through 185 and 187, in an interval that is less than the time "P". The base timer then controls the loop to assure an iteration during each "P" interval. Again in the specifically depicted embodiment, "P" represents 1.25 milliseconds.

When an incoming message is sent to the multifunction telephone, the leader bits 216 (FIGS. 11 and 12A) are detected at block 217 (FIG. 12A) and act as the external event interruption. The control unit 55 uses its external event interruption program to enable the control unit 55 to sense the edge of the start bit in block 220. When this program is processed, the control unit 55 begins to process the background program at whatever point it was at the time of the interruption.

The leading edge of the start bit in block 221 produces a first of several successive timer interruptions that occurs in block 222. The block 222 resets the timer to test the start bit midway through the bit time as shown by block 223. Thereafter, successive timer interruptions to the background program at an interval "P" test bits in the incoming data byte, the parity bit, and the stop bit in the center of their respective bit times. Specifically, the successive processing of the timer interruptions enables the control unit 55 to receive the data and assemble it for storage in the data memory 142. The time required to perform this internal interruption routine is significantly less than the time "P", so the additional time to process the timer interruption sequence for each data bit does not extend the total background program time beyond the "P" time.

When all the incoming message has been received and assembled, some additional bit times are provided. These are designated by a wait block 225, followed by blocks 226 and 227 that enable the optional display to be updated. The control unit 55 also assembles the message to be returned as previously indicated and designated by blocks 191, 192, and 194.

When this operation has been completed, the control unit 55 is ready to transmit data back to the common equipment 12 and the corresponding transmit cycle begins as shown in FIG. 12B. The message contains the corresponding leader bits 230 followed by the start bit 231, the data byte 232, the parity bit 233, and the stop bit 234. The control unit 55 transmits this message in response to timer interruptions and concurrently with its processing of the background program. If a separate frequency-shift-keyed transmitter were used, the interruptions would occur at the baud rate. However, in this specific embodiment, the control unit 55 generates the frequency-shift-timed signals directly to produce the mark and space signals. At a baud rate of 800 baud, a mark frequency of 2400 Hz, and a space frequency of 1600 Hz, six timer interruptions occur each baud time to generate the mark frequency while four timer interruptions occur each baud time to generate the space frequency.

Given this general background of the operation of the control unit 55, it is now possible to discuss the operation of one specific embodiment of the control unit 55. FIGS. 15A and 15B constitute a memory map of those portions of the data memory 142 in an Intel 8049 microcomputer that are utilized by the background, external event interruption, and timer interruption programs. Specifically, FIGS. 15A and 15B specify each location with a hexadecimal address and the function of that location. Register bank and register designations are provided for addresses that define general purpose registers within the Intel 8049 microcomputer. For example, data memory address 20 contains an RXTXF register that is a transfer status register and that is the location that the control unit uses in step 185 (FIG. 13) to determine whether a message has been completed. The information in the RXTXF register indicates, at various times, whether the control unit is receiving a message, has completed receiving a message, is transmitting a message, has completed transmitting a message, or is idle (i.e., in the background state).

In FIG. 15B, locations 2C through 3F constitute the lamp buffer. Each of locations 2C through 3F corresponds to a predetermined lamp in the multifunction telephone. The exact correspondence between a lamp buffer and the position of the specific lamp that that buffer defines is set forth in a table that is maintained in the program memory 141.

Figures 20B, 21B:
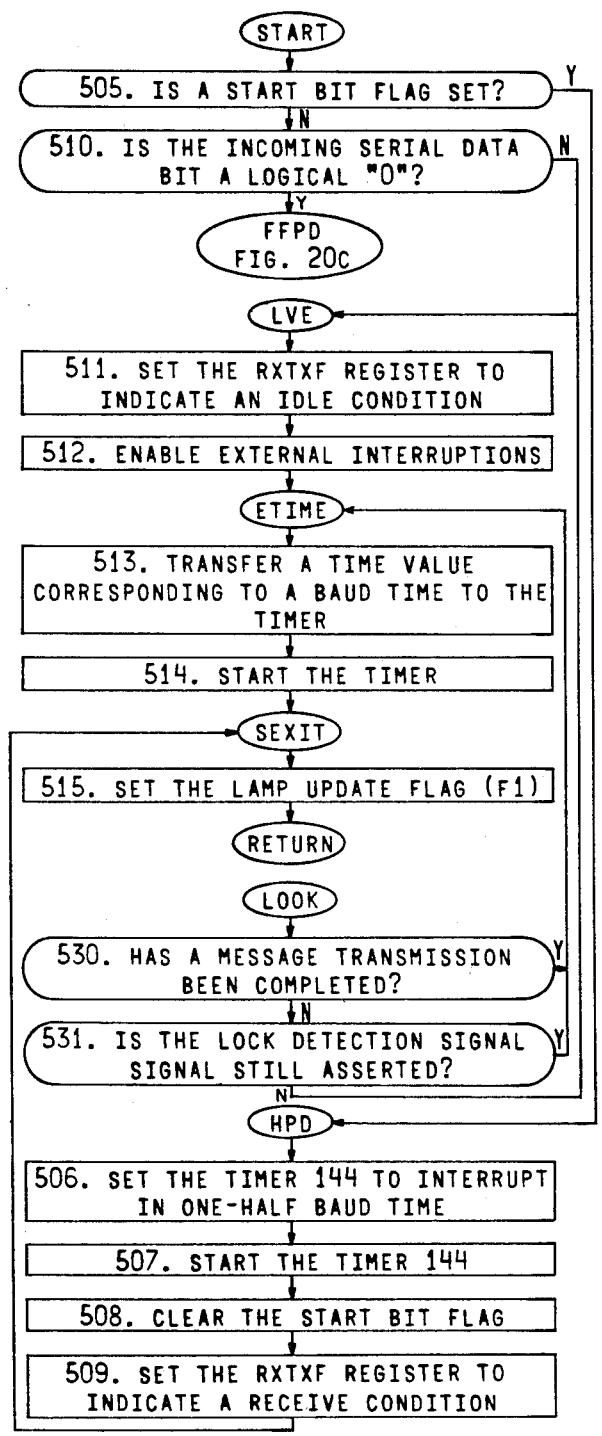

FIG. 16, that comprises drawings 16A through 16T, constitutes a flow chart that generally describes the processing by the control unit 55 during the background mode. FIG. 16A is positioned adjacent to FIG. 17A. FIG. 17A contains a listing of assembly language instructions for an Intel 8049 microcomputer system that implements the steps defined in FIG. 16A. This positional correspondence between particular steps in the programs shown in sheets comprising FIGS. 16, 18, and 20 with the corresponding sheets of assembly language listings that comprise portions of FIGS. 17, 19, and 21 is generally maintained in the drawings. Symbolic addresses have been included in both the flow diagrams and the assembly language listings to facilitate cross references between the two. There are areas, however, where positional correspondence is not maintained, noticeably with respect to FIGS. 16O through 16T and the corresponding assembly language drawings that are identified as FIGS. 17O/T-1 through 17O/T-4. However, the symbolic addresses still provide the functional correspondence. It is believed that the assembly language programs in FIGS. 17, 19 and 21 will be evident from the flow diagrams of FIGS. 16, 18, and 20 respectively. Therefore, no additional discussion of the assembly language programs is included.

There are a list of definitions at the beginning of FIG. 17A and at the beginning of FIGS. 19 and 21A. These definitions equate specific symbols to locations in the data memory 142 or to particular values or constants. For example, in FIG. 17A, the initial definition indicates that "BOUNCE EQU 5". An analysis of the program indicates that "BOUNCE" is a constant that is utilized during the decoding of function keys. The phrase "RPATN EQU R3" indicates that the R3 register is designated by symbolic address "RPATN" and, as shown in FIG. 15A, is used for decoding specific buttons that have been activated. A third entry "WDOG EQU 48H" establishes a symbolic address "WDOG" for location 48 (in hexadecimal as designated by "H") that is the address of a watchdog timer.

The flow diagrams are in significant detail. It would be merely repetitive to discuss each step in the same specific language that is used in the flow diagram. Therefore, the following discussion summarizes particular steps or groups of steps that the control unit 55 utilizes to operate in accordance with this invention.

a. Background Mode

Now referring to FIG. 16A, the control unit 55 responds to the application of power, as represented by step 180, by initializing the telephone utilizing steps 251 through 255 (step 181 in FIG. 13). Referring to FIG. 3, this sequence turns off the various external devices such as the audio amplifier 61 and speaker 62 and the indicators 56, clears certain portions of the data memory 142, and initializes others. Steps 256 and 257 (step 182 in FIG. 13) enable external event interruptions and set the timer to the base value that will ensure that the background program is processed at the repetition rate corresponding to time "P". As shown in FIG. 6, the external event interruption signal is the LOCK DETECT signal generated when the FSK demodulator 95 in FIG. 5 detects the leader of an incoming message.

Figures 16B, 17B:
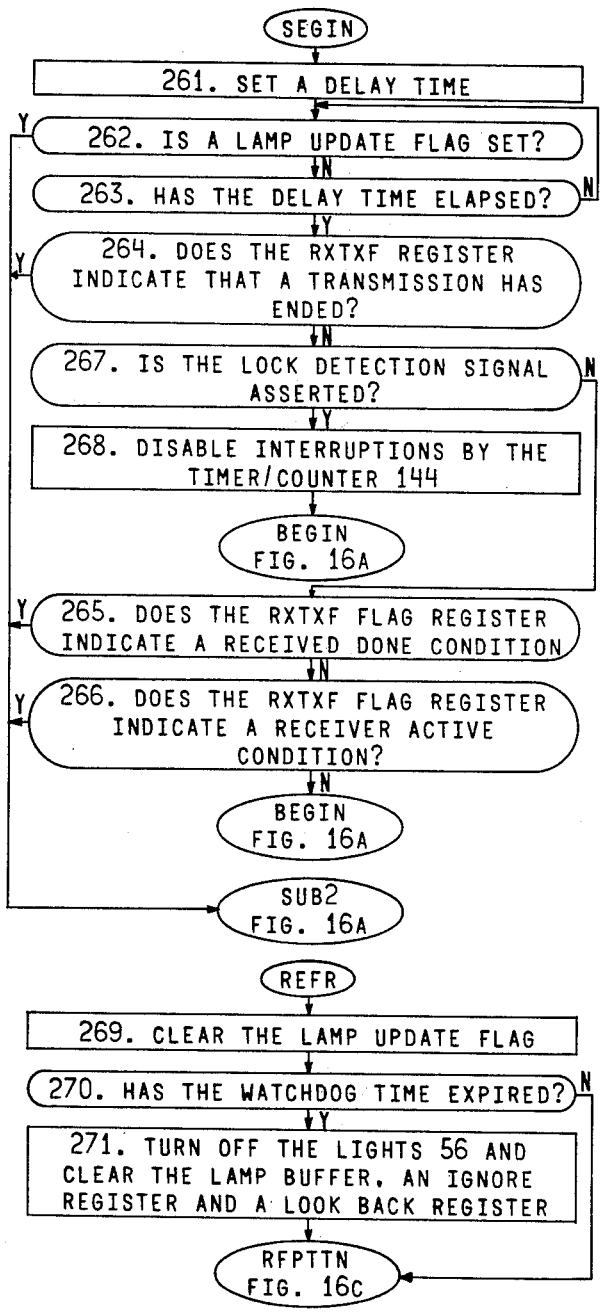
FIG. 16, comprising
FIGS. 16A through 16T, is a detailed flow diagram to show the operations depicted generally in FIGS. 13 and 14.
FIG. 17, comprising FIGS. 17A through 17K, 17L-1, 17L-2, 17M-1 through 17M-4, 17N-1 through 17N-6, and 17O/T-1 through 17O/F4, is an assembly language listing for implementing the flow diagram shown in FIG. 16.
Figures 16C, 17C:
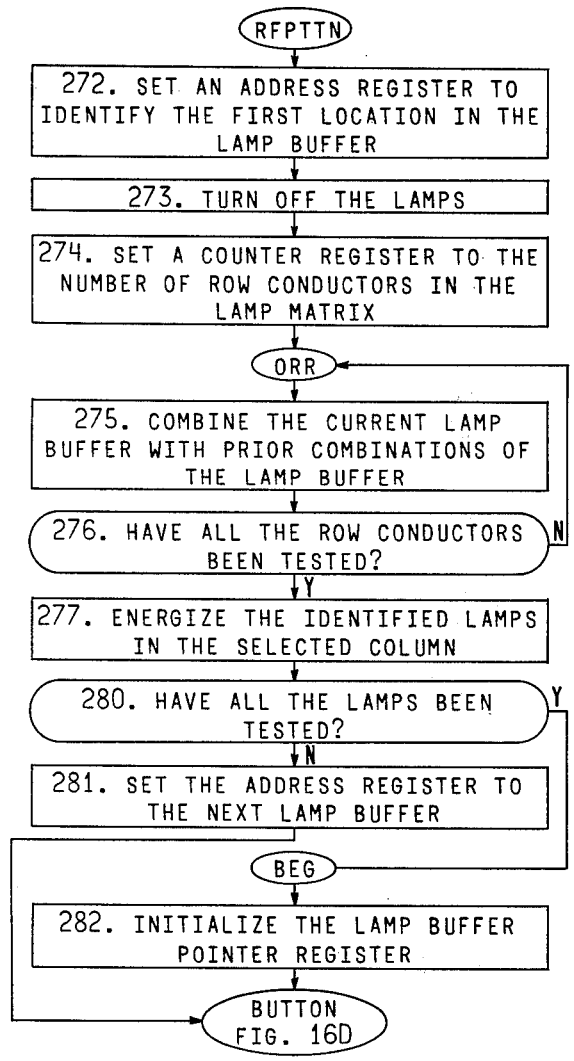
Figures 16D, 17D:
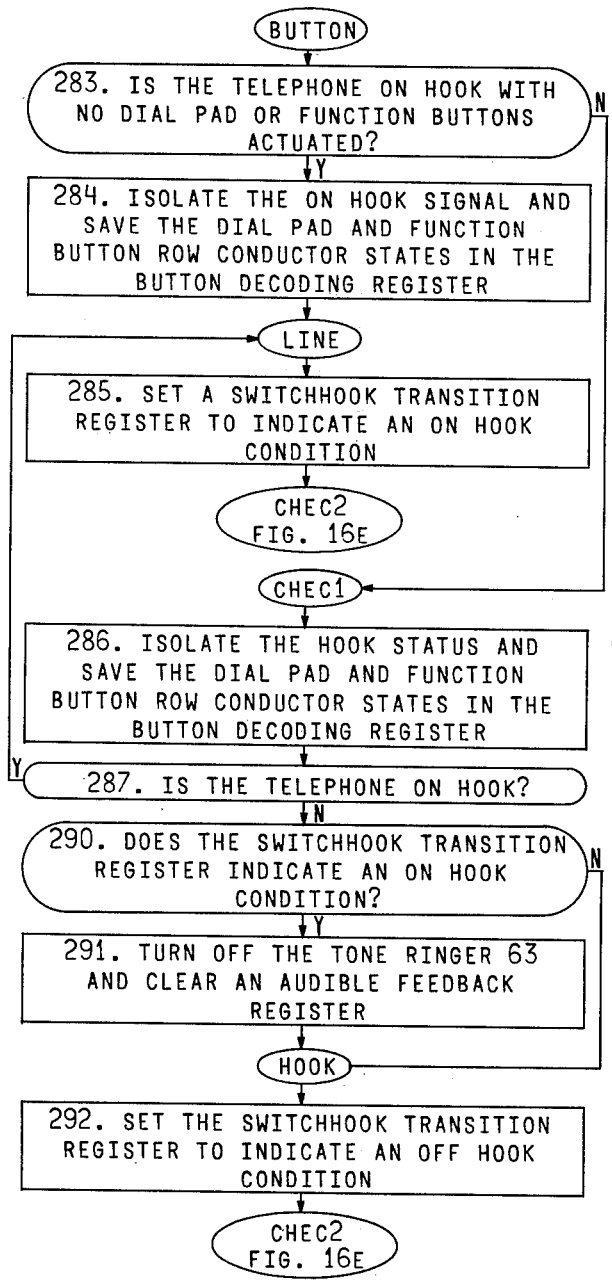

In step 260, the control unit calls a lamp refresh subroutine that is shown beginning in FIG. 16B. When that subroutine (steps 183 and 184 in FIG. 13) has been completed, control returns to step 261 in FIG. 16B, which then sets a delay time. Steps 262 and 263 increase this delay if no lamp updates are to occur to compensate for shorter processing times and thus maintain a constant iteration time.

The RXTXF register in location 20H of data memory 142 stores, in this specific embodiment, a number of hexadecimal values that correspond to specific states. The RXTXF register contains an "80H" in the background, or idle, state; an "84H" when a message has been received; an "02H" when the control unit 55 is is transmitting a message; and an "81H" when a transmission has been completed. Any other value in the RXTXF register by default is considered to indicate a receive mode. Steps 264, 265, and 266 test the RXTXF register. If a message has been received, is being received, or has been transmitted, these steps return control to step 260 in FIG. 16A. Steps 267 and 270 establish a priority whereby an incoming message will override a message that is being transmitted. If a LOCK DETECTION signal is asserted in such a condition, then the internal interruptions are disabled before control returns to step 256 in FIG. 16A.

The lamp refresh subroutine called in step 260 of FIG. 16A begins by clearing the lamp update flag in step 269, (i.e., an F1 internal flag in the CPU 138 shown in FIG. 6). Steps 270 and 271 test for regular polling and shift the telephone to an inactive status if regular polling does not occur. When this polling test is complete, the control unit 55 continues to process the background program of FIG. 16 by transferring control to step 272 in FIG. 16C.

As previously indicated, each lamp buffer location corresponds to a specific lamp and contains a function code nibble and a row address nibble. The function code nibble identifies a particular lamp operation (e.g., fluttering, flashing, winking). The row address nibble indicates the row position of the lamp. As becomes apparent later, steps 272 through 277 and 280 through 282 are processed while a specific column conductor (FIG. 8) is energized. This column is identified by a value in a current digit register at location 05. For each column position, there is a block of four consecutive lamp buffer locations and each row address nibble establishes a positional correspondence between a bit position in the nibble and one row conductor. The steps in FIG. 16C use a row address bit of "0" to turn on the corresponding lamp and a "1" to turn it off. Once all the lamp buffer locations have been tested, the current digit register and a lamp buffer pointer register are set to initial values (step 282). Thus when the steps outlined in FIG. 16C have been processed, the lamps in a particular column are individually energized or deenergized by the row conductors depending upon the status of the corresponding bit positions in the lamp buffer. Although the actual energization of each lamp is for a short interval (i.e., 1.25 oms), the persistence of the human eye integrates the output at an approximate 6.25 millisecond repetition rate, so the lights are viewed as being turned on or as fluttering, flashing, or winking.

FIGS. 16D through 16H depict the process for ascertaining the status of each of the dial pad buttons 23, function buttons 24 (FIG. 3), and hook switch 121 (FIG. 4). Basically, during each iteration the control unit 55 tests the various row selector conductors for a given column conductor in sequence. When any of the buttons or the hook switch is activated, the corresponding information is saved in a button decoding register in step 284 and a switch hook transition register is set to indicate an on-hook condition in step 285.

Even with no button activity, the status is still retained in the button decoding register in step 286 along with the hook status. If the telephone is on hook, step 287 returns control to step 285. If the telephone is off hook, then control passes to step 290 where the state of the hook switch during the previous iteration is tested. If the telephone was on hook, then a transition to an off hook condition is found, and step 290 passes control to step 291 whereupon the tone ringer 63 is deenergized and an audible feedback register is cleared in step 291. The audible feedback register is utilized for generating tones of a predetermined interval each time that the user activates one of the pads to provide an audible feedback. Otherwise, there is no change in hook status and control passes directly from step 290 to 292. The switch hook transition register then is set to indicate an off hook condition at step 292 and then control transfers to step 293 in FIG. 16E. Control also transfers to step 293 from step 285 in FIG. 16D.

Steps 293 through 298 in FIG. 16E control the tone ringer when it is being used for audible feedback. These steps specifically utilize the audible feedback register to ascertain the time at which the tone ringer 63 should be turned off and, therefore, control both the RINGER ON OFF and RINGER FREQ signals that are generated by the control unit 55.

Next, the control unit 55 begins a column by column monitoring of the various function and dial buttons to ascertain those that have been activated. A single column identification is provided by the current digit register during each iteration, and a bit scan counter register identifies particular ones of the row conductors in sequence. Both registers, therefore, act as counters and provide information for storage in a key location register. All these registers are initialized or updated in steps 300 through 303.

Figures 16F, 17F:
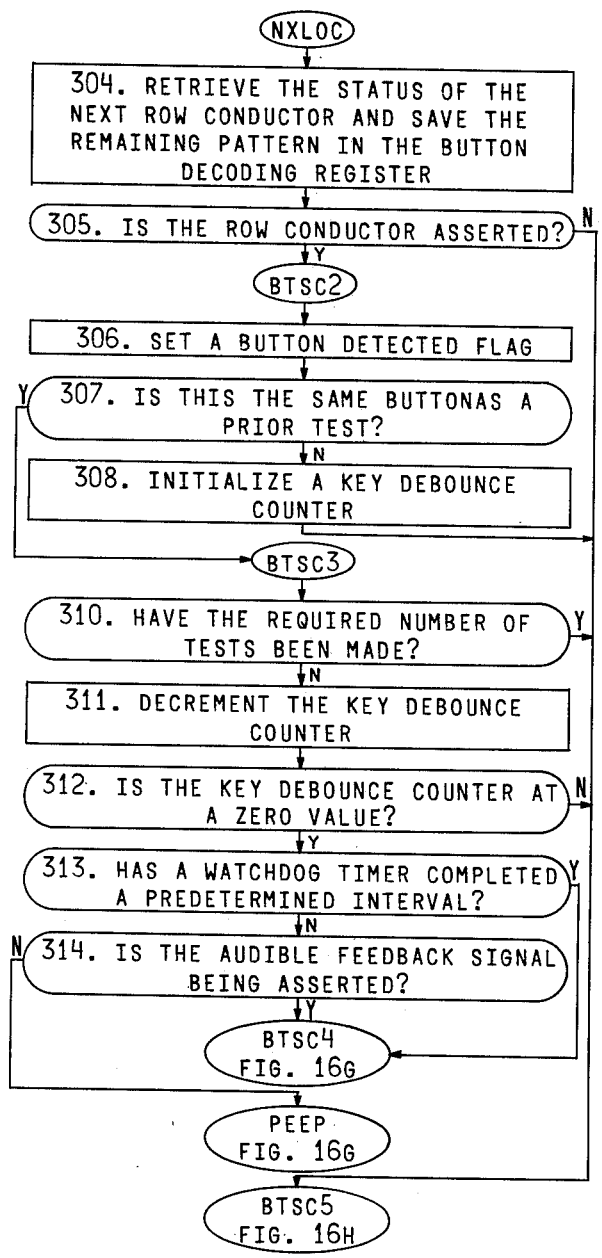
Figures 16H, 17H:
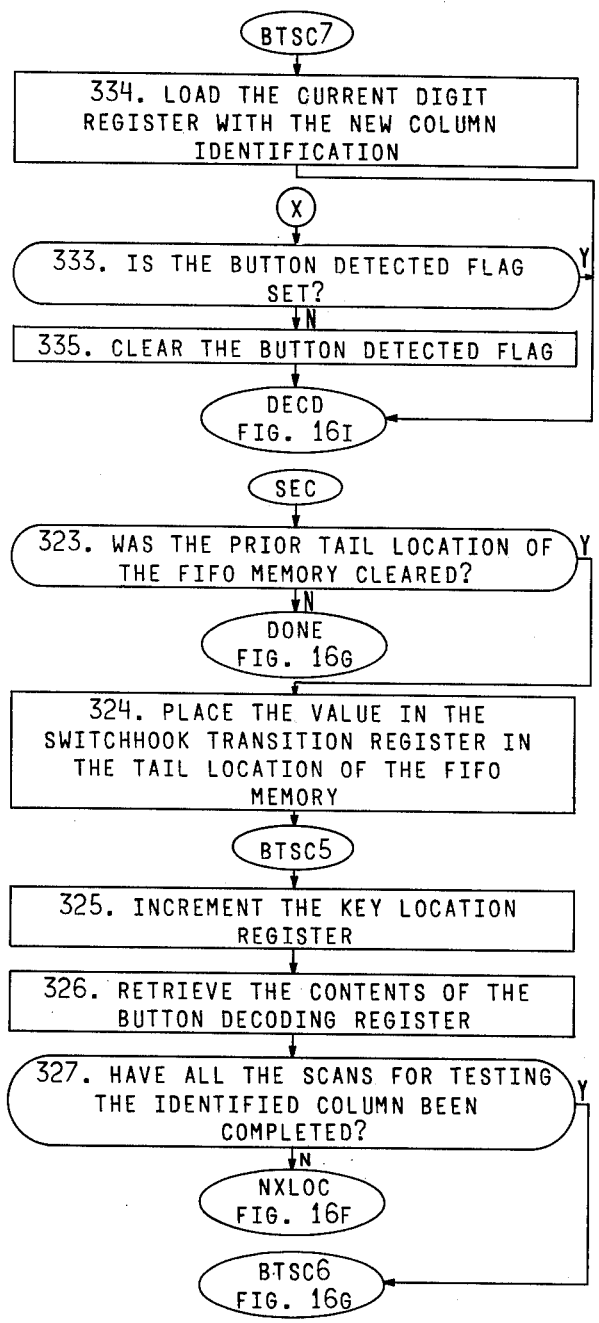

Steps 304 through 312 in FIG. 16F minimize improper response to a signal. When one of the dial buttons or function buttons is activated, the contacts initially alternately make and break contact or "bounce". It also is possible for an operator to strike two or more buttons in an overlapping sequence. The control unit 55 operates to disregard either condition. It only signals the common equipment after a single button has been depressed for a specified interval without any bouncing.

When no buttons are depressed, a key location register at location 24H is set to identify a first button in sequence and a last key register at location OH (i.e., the R3 register in the RBO bank) is set to identify the first row conductor in the matrices 23 and 24 in FIGS. 3 and 8.

Figures 16I, 17I:
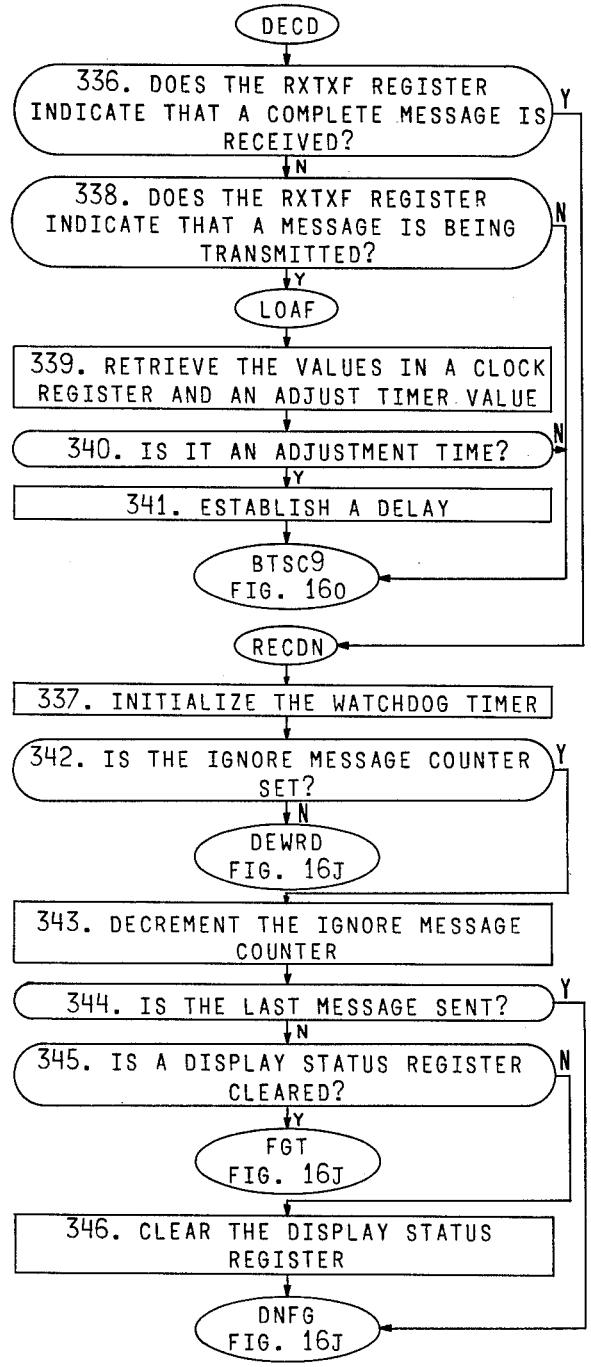

If no row conductors are active, the key location register is incremented to identify the first button in the next column and control passes to step 330 in FIG. 16G to identify the next column in sequence and to clear the button detected flag in step 335 (FIG. 16H) before branching to the decoding routine in FIG. 16I. Otherwise, the key location register is incremented to identify each button in sequence and to determine if it is activated. If it is activated, a button detected flag sets and a key debounce counter at location 28H is set to a predetermined value (e.g., "05H"). This is depicted from step 300 in FIG. 16E through step 308 in FIG. 16F.

When a button is detected, the contents of the key locations register and the last key register are compared. The last key register contains the key number for the previously detected button. If the numbers are not the same, step 307 branches to step 308 and control passes to FIG. 16H to initiate another scan. Control also transfers to FIG. 16H if all the tests have not been completed. When the required number have been completed, the control unit 55 uses steps 316 and 317 in FIG. 16G to turn on the tone ringer 63 in a single tone mode to provide audible feedback for the interval that is transferred to the audible feedback counter at location 26H. In addition, steps 320 through 322 establish data in a FIFO (First-In, First-Out) memory comprising locations 29H and 2AH that identifies the successfully detected button. Then steps 325 through 327 in FIG. 16H, steps 330 and 331 in FIG. 16G, and step 334 in FIG. 16H enable a transfer to the decoding circuitry in FIG. 16I. If all the row conductors have not been scanned, step 327 shifts control to step 304 in FIG. 16F. If the iterations are complete, then the button flag is cleared in step 335 in FIG. 16H before control transfers to FIG. 16I. Steps 304 through 312 require that the same results be achieved during a number of successive steps or tests before the control unit 55 validly indicates that the button has been activated.

Referring again to FIGS. 16G and 16H, when a button is detected the control unit 55 first loads all the bits on the incoming message into a FIFO memory comprising locations 29H and 2AH in the data memory 142 as shown in FIG. 15B. Both locations must contain data. Thus some information must be transferred or shifted through the FIFO memory and the accumulator. This is accomplished differently depending upon whether the location 2A of the FIFO memory contains information. Specifically, the shifting operation is provided by steps 321 and 322 in FIG. 16G and steps 323 and 324 in FIG. 16H. When the shifting operation has been completed, the system is reset for a next operation in steps 325 through 327.

Thus, if the key is bouncing the key debounce counter will not be decremented because step 307 will pass control to step 308. Likewise, if two buttons are depressed, step 307 again will pass control to the key debounce counter in step 308. When the various steps outlined in FIGS. 16E through 16H, corresponding to steps 183 and 184 in FIG. 13, have been completed, all the buttons have been scanned and any button that has been depressed for the appropriate period of time has been identified. Then, control can pass to FIG. 16I to decode any incoming message.

FIGS. 16I through 16M and corresponding FIGS. 17I through 17M constitute the details of steps 185 and 191 in FIG. 13. If the RXTXF register indicates that a complete message has been received, step 336 in FIG. 16I transfers control to step 337, which is the first of a sequence of steps that decode the message. If the control unit 55 is idle or is receiving a message, step 338 transfers control directly to FIG. 16O to implement the various operations of FIG. 14. If a message is being transmitted, then it is merely necessary to test the flags in the clock register and adjust the timer value in steps 339 through 341. This compensates time variations that occur in processing FIGS. 16O through 16T. Specifically, the additional delay corresponds to the time difference between the time for actually scanning and updating the lamp buffers and the time to update a specific register that is necessary when the clock register is cleared.

Still referring to FIG. 16I, the receipt of a message indicates a polling operation, so the watchdog timer is reset to begin a new interval at step 337. Certain commands, specifically those commands in which the x data nibble is "E", enable the transfer of a display message to the multifunction telephone for display purposes. The y data nibble specifies the number of data bytes to be transferred, and this information is sent to an ignore message counter at location 27 in FIG. 15B. Steps 342 through 349 (FIG. 16J) control the transfer of the message and inhibit improper telephone response to data bytes in the display message. Once the display message has been received, the RXTXF register is set to an idle state (i.e., it receives an "80H") in step 347 and control passes to the steps of FIG. 14. If the display is not operating properly, step 348 shifts operations to FIG. 16N to prepare a status message for transfer back to the central location or to step 349 to establish an error message.

Figures 16J, 17J:
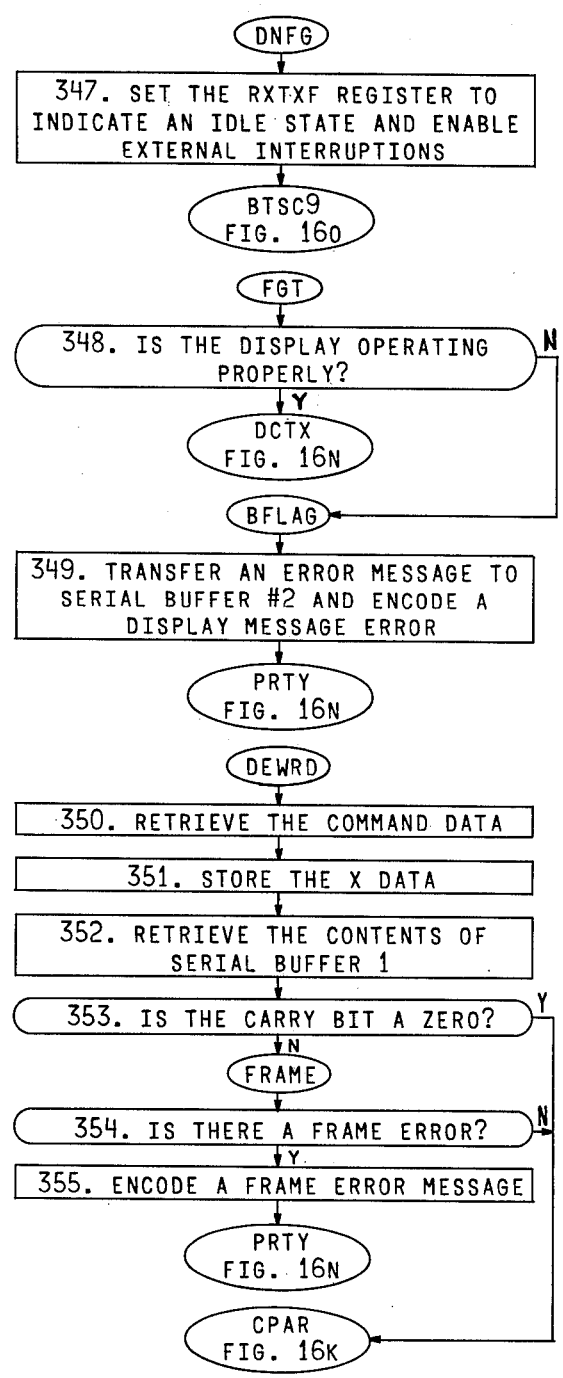

For other incoming messages, however, control passes from step 342 in FIG. 16I to step 350 in FIG. 16J to decode the data byte. Locations 22 and 23 in FIG. 15A constitute two serial buffers that store the x and y data nibbles plus the parity and stop bits. Steps 350 through 355 in FIG. 16J and steps 356 and 357 in FIG. 16K perform framing and parity tests on the data in the serial buffers. If an error exists, an appropriate error message is encoded and control passes to FIG. 16N to transmit the error message. Otherwise, the x and y data nibbles then are decoded further to effect the appropriate operation.

Steps 360 through 362 in FIG. 16K determine whether the control unit 55 is in a loop back mode that causes each command to be "looped back" or returned in the message sent to the common equipment. For each command, other than a reset command, control transfers directly to FIG. 16N after preparations to return the command are completed in step 362.

A loop back operation continues until a reset command ("FA") is received. The reset command also can be sent at any other time. When the reset command is received, control transfers to step 363 in FIG. 16L to initialize the system. Specifically, a number of data memory locations including the loop back register are cleared.

Figures 1, 16L, 17L:
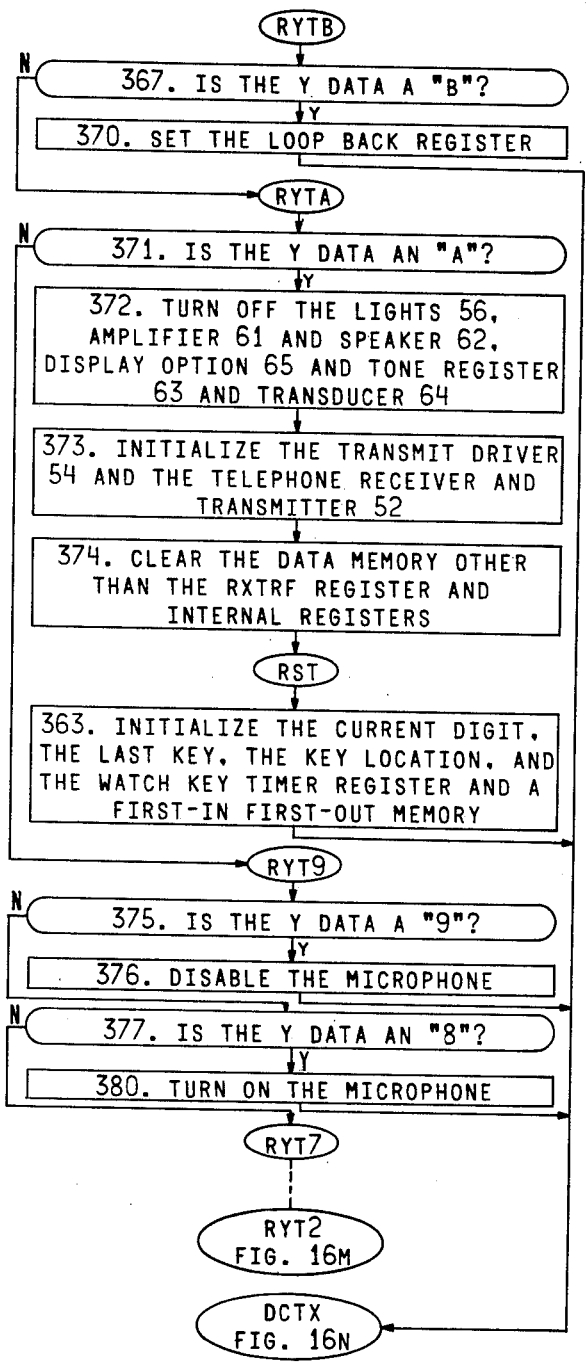

Steps 364 through 366 in FIG. 16K, steps 367, 370 through 377, and 380 in FIG. 16L and steps 381 through 387 and 390 through 396 in FIG. 16M are representative of various tests and operations during which various other commands are decoded. More specifically, steps 364 in FIG. 16K through step 380 in FIG. 16L depict decoding operations for other commands with an "F" in the x data nibble.

X data nibbles having any value from "0" through "B" establish a lamp control operation. Steps 391 through 394 depict the response to a "BP" command where "P" identifies a lamp number that, through a table in FIG. 17N-5, establishes the lamp coordinates in the matrix. The lamp number is an offset into this table. The corresponding table entry and a code for designated operation (for fluttering of the lamp with the "BP" command) is transferred into the corresponding lamp buffer location. This operation is repeated for messages that contain each of the other lamp command messages.

When the message has been decoded, as represented by steps 191 and 192 in FIG. 13 and blocks 191 and 192 in FIG. 12B, the control unit 55 is conditioned to transmit the status message back to the common equipment according to the process set forth in FIG. 12B and this is set forth more specifically in step 194 in FIG. 13 and in FIG. 16N. While the foregoing programs have established the exact data to be transferred, it is still necessary to place the data in a format which corresponds to the format shown in FIG. 11. That is, the data must be preceded by at least two baud times of leader signal and the start bit, and must be followed by the parity and stop bits. During normal operations the foregoing sequences transfer to step 400 and to step 401 that retrieves the contents of the switch hook transition register if both FIFO memory locations are not full.

The leader and start bits are forced as a constant into serial buffer number 2 in step 402. The x and y data nibbles of the status message are retrieved from a table that is depicted in FIG. 17N-4 in step 403 and transferred to the serial buffer number 1 in step 404. If an error or another message, including a status message that indicates a button has been detected, has been generated, no access to the table is necessary. Serial buffer number 1 contains the appropriate message. Thus, these error and status messages enable a transfer of control directly to step 404, bypassing steps 400 through 403.

Step 405 determines the parity bit and step 406 then packs the buffers utilizing a parity buffer register to pack the leader bits, start bit, and five bits of the data byte into serial buffer number 2 and the sixth through eighth bits in the data byte, the parity bit and a succession of "1's" representing the stop bit into serial buffer number 1. Steps 407, 410 and 411 transfer a constant indicating the status of the BX/KEY switch 138 in FIG. 6 into a transmitted character counter to control the number of step bits that are sent to the common equipment.

The control unit is now prepared to transmit data and has completed the steps that are represented by step 192 in FIG. 13 and block 192 in FIG. 12B. In steps 412 and 413, the control unit again disables response to the LOCK DETECT signal as an external interruption and transfers a "02H" to the RXTXF register, thereby to indicate that the control unit 55 is transmitting. This terminates the lamp refresh subroutine that was called by step 260 in FIG. 16A. Thus the system is now prepared to being the processing at step 261 in FIG. 16B.

Figure 16O:
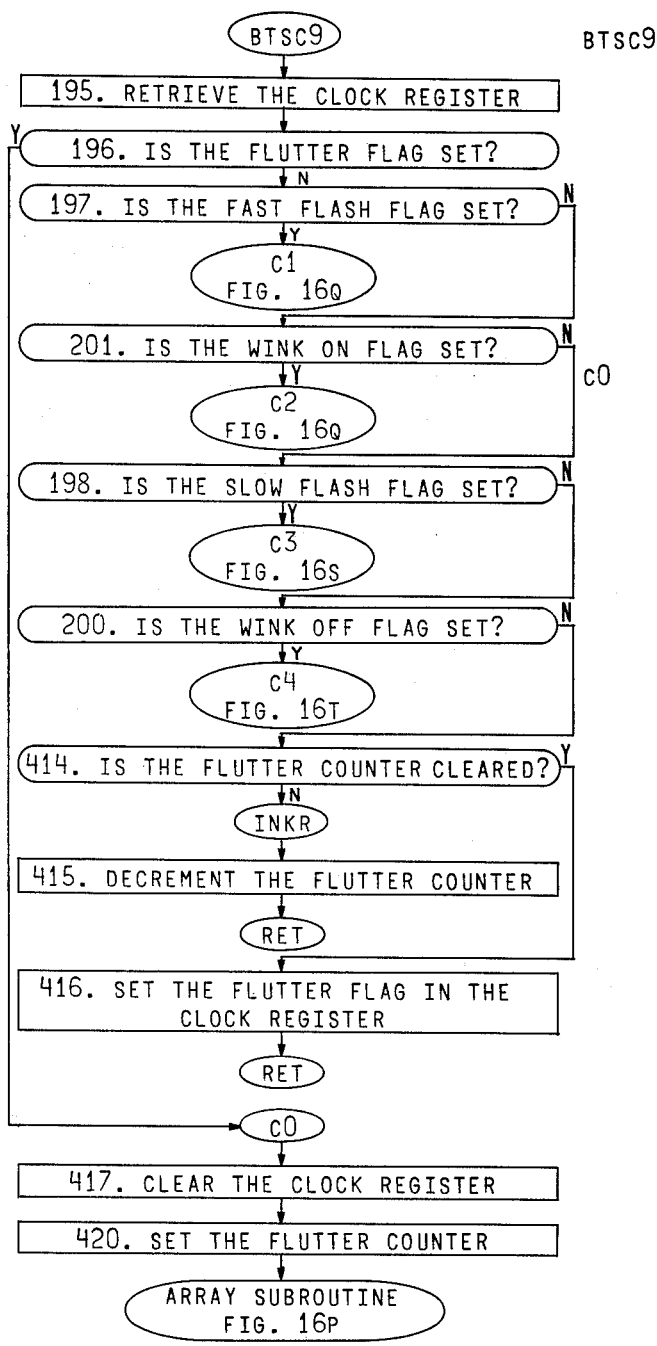
Figure 16Q:
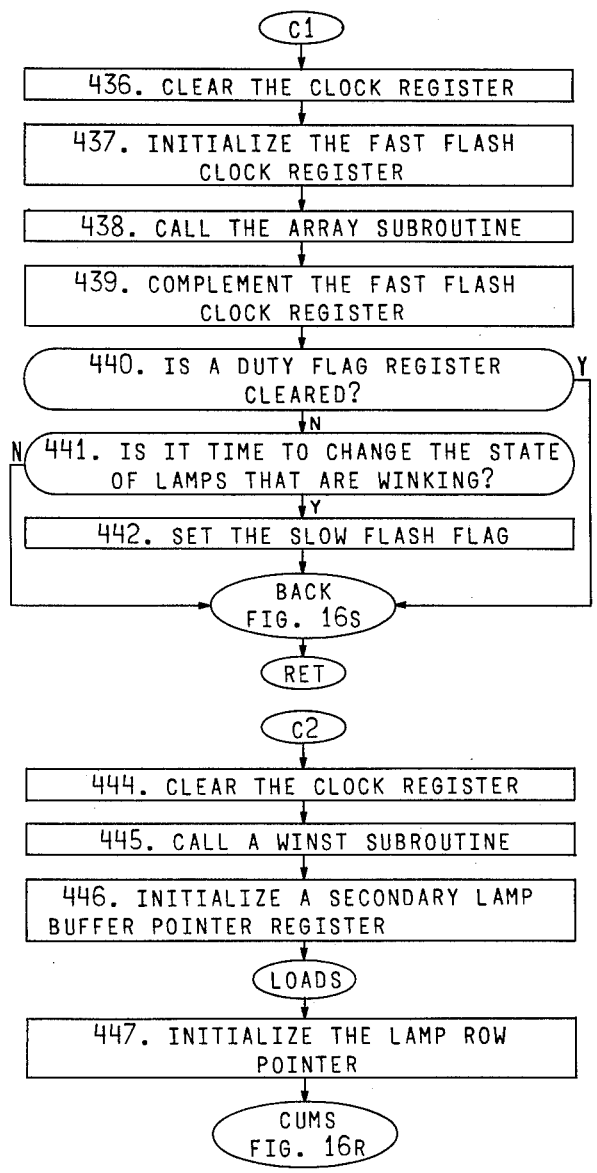

When a message is being transmitted, steps 339 through 341 in FIG. 16I prepare the system to process the steps in FIG. 16O that update the contents of the lamp buffer register. Transfers to FIG. 16O are also made from step 347 in FIG. 16J.

During each iteration of the lamp refresh subroutine, the various flags in the clock register are tested. In step 195, the control unit retrieves the clock register that contains the flutter, fast flash, slow flash, wink off, and wink on flags. If none of these flags are set, no updates of the lamp buffer in FIG. 15B are necessary. Thus, the sequence ends by decrementing the flutter counter if the flutter clock register is not at a zero value or by setting a flutter flag (steps 414 through 416). As apparent, this requires a very short time in comparison with the processing required if one flag is set. However, the delay at steps 261 through 263 in FIG. 16B compensates for the shorter interval.

If the flutter flag is set, the clock register is cleared and the flutter counter at location 42 is preset (steps 417 and 420). Then the lamp buffers are updated by calling an array subroutine that is shown in FIG. 16P and that comprises steps 421 through 430. This subroutine tests each location in the lamp buffer to determine whether the bits identifying the operation to be performed correspond to a flutter operation. It then modifies the lamp position bit in each buffer to indicate directly whether that lamp is to be turned on or off during the next iteration.

After testing each location in the lamp buffer, the array subroutine returns to step 432 to complement the flutter clock register at location 4B. Then the fast flash counter at location 43 is decremented or is set to a new value if it is cleared. If the counter is cleared, the fast flash flag in the clock register is set (steps 433 through 435).

The steps of flashing and fluttering the lamps are accomplished by turning the lamps on and off for equal periods of time; that is, energizing the lamps with a 50% duty cycle. Winking operations, however, operate with unequal duty cycles. Specifically, a lamp that is being winked turns on in synchronization with a slow flash interval and turns off for a fast flash interval. The specific phase of the winking operation is controlled by a duty flag at location 45 in the data memory (FIG. 15B). Two additional registers are used. A wink counter at location 46 contains the timing information that actually controls the duration of the on and off times, and a wink clock register at location 4E that controls shifts between wink on and wink off states.

If the fast flash flag is set, steps 436 through 439 update the lamp buffer locations for fast flashing lamps. Then winking operations are also tested, depending upon the state of the duty flag. If the duty flag is cleared, the slow flash counter is tested (step 441) to determine whether it is the time to change the state of any lamps being winked. If it is, the slow flash flag on the clock register is set. If it is not, of if the duty flag is cleared, control transfers to step 468 in FIG. 16S.

When the wink on flag is set, the clock register is cleared in step 444 and a "winst" subroutine is called in step 445. In this specific embodiment, the winst subroutine performs many of the functions of the array subroutine that is used during flutter updates. That is, each of the lamp buffers is tested in sequence to determine whether the individual buffer contains a wink instruction and appropriately updates the row energization information, depending upon the status of the duty flag register that is tested in step 455. The individual lamp buffers are processed iteratively until the last one has been processed. At that point, the processing shifts to step 461 in FIGS. 16S. If the duty flag is not cleared, the process ends. If it is cleared, control passes to step 465 to test and update the watchdog timer.

Figure 16S:
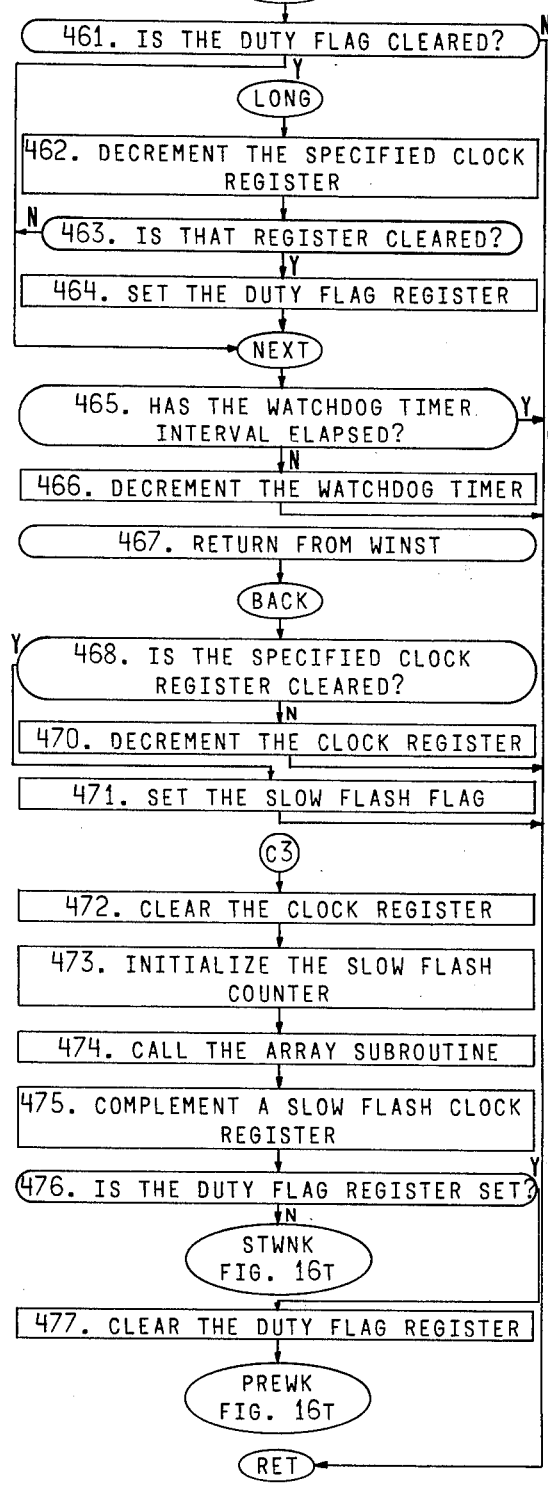

When the winst subroutine is complete, control returns to step 468 in FIG. 16S to decrement the slow flash clock register or set the slow flash flag. When step 198 senses that the slow flash flag is set, control passes to step 472 in FIG. 16S. The slow flash counter is set to an initial value and the array subroutine is then used to update the appropriate lamp buffers. If the duty flag register is set, it indicates the time for turning off any lamps that are being winked. Thus the duty flag is cleared in step 477 and the wink off flag is set in step 481 before teminating the procedure, in this case by returning it to step 260 in FIG. 16A. If the duty flag register is cleared, then lamps that are winked should be turned on, so control passes from step 476 to step 480 in FIG. 16T. If the wink counter register is set, control passes to step 462 which decrements the wink counter register and sets the duty flag register. After this, steps 465 and 466 test and update the watchdog timer as necessary. If the wink counter register is cleared, control passes to step 481 to set the wink off flag.

Figure 16T:
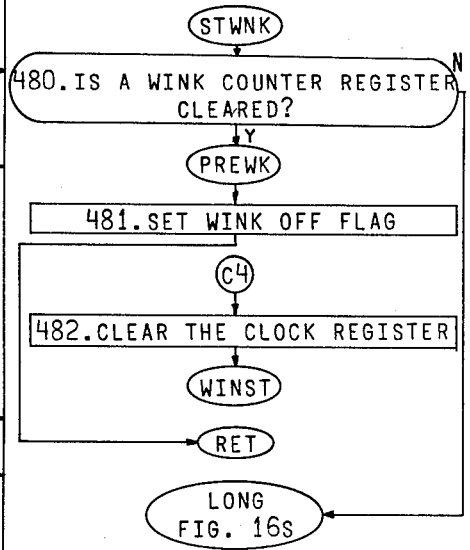

When the wink off flag is set, control passes to step 482 in FIG. 16T to clear the clock register. Then control passes back to step 446 in FIG. 16Q. Now, however, the wink clock register will have been initialized to control the off time.

Thus, FIGS. 16O through 16T disclose an overall lamp buffer update sequence that is processed during each iteration of the loop in FIG. 13 that comprises steps 183 through 194. During each iteration of this loop, however, only one operation occurs in the buffer update routine, according to a priority. In priority, the clock register is tested to determine if any flags are set. If a flag is set, the corresponding counter is set to a predetermined timing value and the various lamp buffers are tested to update those which are being displayed according to the corresponding instruction. Then a counter of lesser priority is tested and if that counter has reached zero the corresponding flag is set. This particular approach is used with this specific embodiment of a microcomputer to assure that iterations of the background program can occur in a time period which is less than one baud time even when external or internal interruptions occur.

b. External Event Mode

Step 490 in FIG. 18 represents the arrival of an incoming signal at the telephone. Specifically, the FSK demodulator 95 in FIG. 5 asserts the LOCK DETECT signal that is applied to the external interruption input of the control unit 55 in FIG. 6. The flowchart in FIG. 18 depicts the steps that are taken when such an external interruption occurs. FIG. 19 contains a set of assembly instructions for implementing the flowchart in FIG. 18.

In steps 491 and 492, the timer/counter 144 in FIG. 6 stops and interruptions from that timer/counter are disabled. This specific embodiment of the control unit 55 can be set to a mode which makes a T1 testable input, that receives the SERIAL DATA signal from the demodulator 95, responsive to an edge transition. Steps 493 and 494 establish that condition and thereby enable the timer/counter 144 to interrupt the background program on the leading edge of the start bit (block 222 in FIG. 12A). A bit counter is then set with a low order nibble that corresponds to a number of bits in the message plus the number of bit times between the end of the incoming message and the beginning of the transmitted message; in this case, a total of twelve bit times. The high order nibble in the bit counter contains a first received bit flag and a start bit flag that are set when the counter register in initialized. In step 496, the control sets the RXTXF register to indicate that a message is to be received and disables the external interruptions in step 497.

c. Timer Interruption State

As indicated, the leading edge of the START bit produces a timer interruption. FIGS. 20A through 20D define the interruption routine; FIGS. 21A through 21D, the assembly language program. Steps 501 through 503 test the RXTXF register. During the first timer interruption, the RXTXF register indicates an idle mode so control passes to step 504 to test the bit counter. Initially, the counter indicates that the first bit is being received, so control then transfers to step 505 in FIG. 20B to test the start bit flag that is included in the bit counter. As a result, transfer passes to steps 506 through 509 that set the timer 144 to a one-half baud time, clear the start bit flag, and assure that the RXTXF register indicates a receive condition.

This setting of the timer 144 ensures that the next monitoring of the incoming signal occurs about halfway through the start bit. When this succeeding interruption occurs, the control unit 55 processes steps 501 through 505. However, during a valid message, the start bit is being received in step 510 of FIG. 20B. If it is not, an error exists, so the RXTXF flag is reset to an idle condition and external interruptions are enabled (steps 511 and 512). Then a number corresponding to the baud time is transferred into the timer, which is started, and a lamp update flag is set (steps 513 through 515). When the start bit is properly detected, control passes to steps 516, 517, and 520 in FIG. 20C that reset the timer to interrupt in a baud time and clear the first received bit flag in the bit counter before setting the lamp update flag in step 515.

During successive bit times, the incoming SERIAL DATA signal is monitored as control passes through step 504 to step 521 in FIG. 20A. Steps 521 through 525 test the incoming data and shift the incoming data bits into serial buffer number one in the data memory 142 (FIG. 15B). When all the bits have been received, the RXTXF flag is set to a received done state (steps 526 and 527) and the lamp update flag is again set (step 515). Thus all the bits in the message, plus the extra bits following the message, are loaded into these buffers to be decoded by the background program as previously described.

Referring again to FIG. 13, and generally to blocks 191, 192, and 194 of FIG. 12B, a transmission begins when the RXTXF register is set to indicate a transmitting mode. In this case, control passes from step 503 in FIG. 20A to step 534 in FIG. 20C. During transmission, each bit is transmitted by the process shown in FIGS. 20C and 20D by interrupting the background program at a rate that corresponds to the frequency-shift-keyed mark and space frequencies. A repeat register indicates whether all the repeats have been completed. If they have, as it is assumed they would have at the beginning of a transmission, step 534 branches to step 535 whereupon the next bit is shifted from the serial buffer to be prepared for transmission. Then if all the bits have been sent, step 537 sets the RXTXF flag to indicate that the transmission is complete.

Otherwise step 536 branches to step 540 which ascertains whether a logical "1" or a logical "0" is to be sent. If a logical "0" is to be sent, a states register is set to the number of states for a space, e.g., four states in this specific embodiment, and a time value that will cause the timer to interrupt at a slow rate is transferred to the timer. The timer is then started and the FSK OUT signal is complemented. If, on the other hand, step 540 tests the incoming signal to be logical "1", then control passes to step 544 which sets the states register and timer to values corresponding to a logical "1". In this specific example, six FSK states are sent. Then control passes back to step 542 in FIG. 20C, whereupon the FSK signal is complemented.

Figures 20D, 21D:
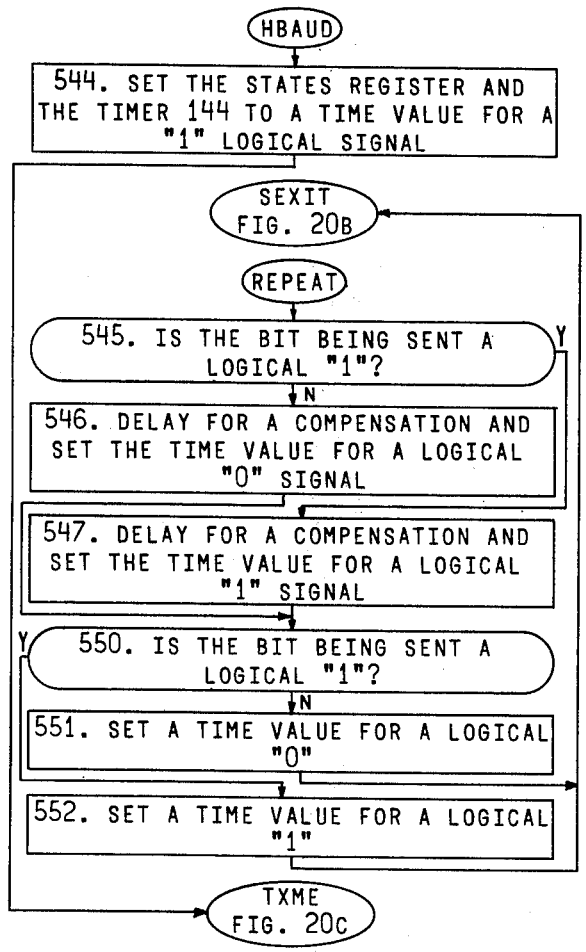

During successive interruptions for a given baud time, step 534 will branch to step 545 in FIG. 20D. If a logical "1" is being sent, a compensation delay is included and then the timer is again set for the logical "1" interruption time. This compensation time corresponds to the shorter time it takes to process the various steps in FIGS. 20A through 20D during a repeat operation. A similar compensation occurs with step 546. Then, after that delay, steps 550 through 552 reset the timer according to whether a logical "0" or logical "1" is being sent.

C. Summary of Description

As has now been described, the multifunction telephone and corresponding network that utilize this invention contain an acoustic or voice signal path for converting the acoustic information between an audible form and an electrical form for transfer over a acoustic signal path to common equipment. All supervisory operations are controlled in response to a polling operation during which a message of a predetermined format is sent to the multifunction telephone over a data signal path. These signals are transmitted in a frequency modulated form that enables long distances to exist between the common equipment and an individual telephone. A control unit, that comprises a microcomputer in one specific embodiment, receives the incoming message initially in response to an external interruption program. This program enables the synchronization of further operations in the control unit with the incoming message by establishing initial conditions in a timer which thereafter provides interruptions at a predetermined rate. A timer interruption program then receives the incoming demodulated information and assembles it into a form to be processed by the microcomputer. Thereafter, the microcomputer transmits a message back to the common equipment.

The microcomputer is adapted to transmit the information directly in frequency modulated form. In addition to these external and internal interruption programs, the microcomputer also processes a background program. The background program is used for controlling the state of various visual indicators and for monitoring the conditions of buttons. It also performs internal timing operations that enable high level commands to be transferred over the supervisory channel by the data signal path, thereby to reduce the amount of work that must be performed by circuitry at the common equipment.

A specific embodiment of this invention has been described to illustrate the features of the various aspects of this invention. It will be apparent, however, that alternate embodiments can be constructed with the achievement of some or all of the advantages of the various aspects of this invention. For example, the use of frequency modulation techniques other than frequency shift keying can be used to transfer the data signals. Moreover, a separate transmitter might be utilized to transmit frequency modulated signals from the telephone to the common equipment, rather than having a single microcomputer perform both the control and transmitting functions. This would still enable the communications over long distances although the cost advantages might not be realized. Therefore, it is the object of the appended claims to cover all such modifications and variations as come within the true spirit and scope of the this invention.

What is claimed as new and desired to be secured by Letters Patent of the United States is:

1. A telephone network for providing telephone communications between a plurality of sites through a central location, said network comprising:
   A. telephone transmission means for independently interconnecting the central location with at least one site, at least one said transmission means including a first signal path for conveying signals corresponding to acoustic information and a second signal path for conveying data signals,
   B. central switching means, at the central location, connected to each of said first signal paths for selectively interconnecting pairs of said telephone transmission means thereby to transfer acoustic information between interconnected sites,
   C. central telephone control means, at the central location, connected to said central switching means and to said second signal paths for transferring frequency-shift-keyed signals representing control data between said control means and each of said second signal paths, and
   D. a multifunction telephone means connected to each of said dual path telephone transmission means at corresponding sites, each said multifunction telephone means including:
   i. acoustic conversion means connected to said first signal path for converting acoustic information between an audible form and an electrical form for transfer between said telephone means and said first signal path,
   ii. at least one first function means for performing a predetermined function in response to control data received from said central telephone means, each said first function means responding to the control data when it is constituted by electrical digital signals,
   iii. at least one second function means for generating electrical digital signals corresponding to control data to be transferred to said central telephone control means,
   iv. decoding means for generating electrical digital signals in response to frequency-shift-keyed signals thereby to control said first function means, and
   v. encoding means including (1) a voltage source for generating a voltage, (2) switching means connected to said voltage source for selectively switching a voltage onto said second signal path means, and (3) a programmed microcomputer system means including (a) a plurality of output signalling means connected to said first function means and to said switching means and (b) a plurality of input signalling means connected to said second function means and said decoding means, said microcomputer system means generating on said output signalling means connected to said switching means a frequency-shift-keyed control signal in response to signals at said input signalling means, said switching means being shifted between conductive and nonconductive states in response to the control signal thereby to couple the frequency-shift-keyed signals onto said second signal path means.

2. A telephone network as recited in claim 1 wherein the control data is conveyed over said second signal path means in a message comprising a predetermined timed sequence of binary digits including a leader for enabling a said decoding means to decode incoming frequency-shift-keyed signals, a start digit for synchronizing said decoding means to the incoming message, a predetermined plurality of data digits representing the control data, a parity digit representing the parity of the data digits, and a stop digit for indicating the termination of the message and wherein each of said central telephone control means and said conversion means in each said telephone means includes means for responding to a message from said second signal path means and means for generating the message, for transfer onto said second signal path means.

3. A telephone network as recited in claim 1 wherein said decoding means in said telephone means comprises (1) filter means for receiving frequency-shift-keyed signals from said second signal path means, (2) lock detection means for generating a lock detection signal when said filter means receives frequency-shift-keyed signals, and (3) frequency-shift-keyed demodulation means connected to said filter means and to said lock detection means for generating a serial digital data signal in response to the signal on said second signal path means, said microcomputer system means receiving the lock detection and serial digital data signals and assembling the control data from said central telephone control means.

4. A telephone network as recited in claim 3 wherein said microcomputer system means generates status data in response to the assembled control data from said central telephone control means and includes storage means for the assembled status data and means for initiating the transfer of a status message including the status data as frequency-shift-keyed signals.

5. A telephone network as recited in claim 4 wherein said microcomputer system means includes (1) variable timer means for generating periodic timing signals after a time period determined by a time value, (2) program storage means for storing a first block of instructions that enable said microcomputer system means to control said first function means and to monitor said second function means, (3) program storage means for storing a second block of instructions that enable the microcomputer system means to respond to the lock detection signal at a corresponding one of said input signalling means by transferring a time value to said variable timer means and by disabling further response to said lock detection means, and (4) program storage means for storing a third block of instructions that are processed each time said variable timer means generates its periodic timing signal and that enable said microcomputer system means to assmble the incoming message from said decoding means and to thereafter transmit the status message, said third block of instructions further enabling response to the signal detection means after the status message is transferred.

6. A telephone network as recited in claim 5 wherein said microcomputer system means includes data memory means for storing transfer status and wherein instructions in each of said first, second, and third blocks of instructions enable said microcomputer system means to alter the transfer status in said data memory means.

7. A telephone network for providing telephone commmunications between a plurality of sites through a central location, said network comprising:
 A. telephone transmission means for independently interconnecting the central location with at least one site, at least one said transmission means including a first signal path for conveying signals corresponding to acoustic information and a second signal path for conveying data signals,
 B. central switching means, at the central location, connected to each of said first signal paths for selectively interconnecting pairs of said telephone transmission means thereby to transfer acoustic information between interconnected sites,
 C. central telephone control means, at the central location, connected to said central switching means and to said second signal paths for transferring frequency-shift-keyed signals representing control data between said control means and each of said second signal paths, and
 D. a multifunction telephone means connected to each of said dual path telephone transmission means at corresponding sites, each said multifunction telephone means including:
  i. acoustic conversion means connected to said first signal path for converting acoustic information between an audible form and an electrical form for transfer between said telephone means and said first signal path,
  ii. at least one first function means for performing a predetermined function in response to control data received from said central telephone control means, each said first function means responding to the control data when it is constituted by electrical digital signals,
  iii. at least one second function means for generating electrical digital signals corresponding to control data to be transferred to said central telephone control means, and
  iv. decoding means for generating electrical digital signals in response to frequency-shift-keyed signals thereby to control said first function means, and
  v. encoding means including (1) controllable voltage source means for generating a voltage onto said second signal path means in response to a control signal, and (2) a programmed microcomputer system means including (a) a plurality of output signalling means connected to said first function means and to said controllable voltage source, (b) a plurality of input signalling means connected to said second function means, and (c) program storage means for storing first instructions that enable said microcomputer system means to monitor signals at said input signalling means and to produce signals at said output signalling means thereby to monitor said second function means and to control said first function means and second instructions that enable said microcomputer system means to generate frequency-shift-keyed signals at said output signalling means connected to said controllable voltage source means whereby said microcomputer system means generates frequency-shift-keyed signals concurrently with its monitoring and controlling.

8. A telephone network as recited in claim 7 wherein one of said first function means comprises (1) a plurality of visual indicating means connected in a matrix having column conductors and row conductors, (2) a voltage source for producing a voltage, and (3) column selection switches for selectively coupling the voltage to said column conductors and wherein said output signalling means includes column selection signalling means connected to said column selection switches and row selection signalling means connected to said row conductors thereby to selectively energize said visual indicating means.

9. A telephone network as recited in claim 7 wherein one of said first function means comprises (1) speaker means for broadcasting signals, (2) amplifier means connected to said acoustic conversion means and said speaker means for energizing said speaker means, and (3) amplifier switching means connected to said amplifier means for controlling the coupling of signals through said amplifier means and wherein said output signalling means includes amplifier control output signalling means connected to said amplifier switching means for controlling the broadcast of acoustic information by said speaker means.

10. A telephone network as recited in claim 7 wherein one of said first function means comprises (1) transducer means for generating a ringing tone, (2) ringer circuit means incuding an enabling input and a tone output connected to said transducer means for driving said transducer means, and (3) switching means connected to said enabling input for selectively enabling said ringer circuit means and wherein said output signalling means includes a ringer control output signalling means that connects to said switching means thereby to control the operation of said ringing circuit means.

11. A telephone network as recited in claim 10 wherein said ringing circuit means includes means for producing a plurality of ringing frequencies for driving said transducer means and selector switching means for controlling the frequency to be generated by said ringing circuit means and wherein said output signalling means includes a ringer frequency control output signalling means for controlling the selection of said ringing means frequencies.

12. A telephone network as recited in claim 7 wherein said acoustic conversion means includes a handset, support means for the handset, and hook switch means connected to said support means for indicating the presence of said handset on said support means, wherein one of said second function means includes switching means for operating in parallel with said hook switch means and wherein said output signalling means includes an off hook output signalling means for controlling conduction through said switching means thereby to control the state of a signal from said hook switch independently of the position of said handset.

13. A telephone network as recited in claim 7 wherein one of said second function means comprises a dial pad means having a plurality of user-activated dial pad switches corresponding to dialed digits and wherein said input signalling means includes dial pad switch identification input signalling means for enabling said microcomputer system means to monitor said dial pad switches.

14. A telephone network as recited in claim 13 wherein said dial pad switches are connected to column conductors and to row conductors in a matrix and wherein said output signalling means includes column output signalling means for selectively energizing said column conductors and wherein said dial switch identification input signalling means connect to said row conductors thereby to identify, for a given column conductor, those of said dial pad switches connected to that column conductor that are activated.

15. A telephone network as recited in claim 7 wherein said acoustic conversion means includes a handset, support means for said handset, and hook switch means for generating a signal indicating the presence of said handset on said support means and wherein said input signalling means includes hook switch input signalling means connected to said hook switch means thereby to monitor the condition of said hook switch means.

16. A telephone network as recited in claim 7 wherein one of said second function means comprises function button means having a plurality of user-activated function buttons and wherein said input signalling means includes function button identification input signalling means for enabling said microcomputer system means to monitor said function buttons.

17. A telephone network as recited in claim 16 wherein said function buttons are connected to column conductors and to row conductors in a matrix and wherein said output signalling means includes column selection output signalling signals for selectively energizing said column conductors and wherein said function button identification input signalling means connect to said row conductors thereby to identify, for a given column conductor, those of the function buttons connected to that column conductor that are activated.

18. A telephone network as recited in claim 7 wherein said controllable voltage source means includes a voltage source for generating a voltage and switching means connecting said voltage source to said second signal path means for selectively switching a voltage onto said second signal path means in response to the control voltage from said microcomputer system means, said switching means being shifted between conductive and nonconductive states in response to the control signal thereby to couple the frequency-shift-keyed signals onto said second signal path means.

19. A multifunction telephone for use in a telephone network wherein the telephone network comprises common equipment means for controlling the network that includes (1) means for generating and receiving control data as frequency-shift-keyed data signals, (2) means for generating and receiving voice signals, and (3) first and second signal path means for the voice signals and the frequency-shift-keyed modulated signals respectively, said multifunction telephone comprising:
  A. acoustic conversion means connected to said first signal path for converting acoustic information between an audible form and an electrical form for transfer between said telephone means and said first signal path,
  B. at least one first function means for performing a predetermined function in response to the control data when it is constituted by electrical digital signals,
  C. at least one second function means for generating electrical digital signals corresponding to control data to be transferred to the central telephone control means,
  D. decoding means for generating electrical digital signals in response to frequency-shift-keyed signals thereby to control said first function means, and
  E. encoding means including (1) a voltage source for generating a voltage, (2) switching means connected to said voltage source for selectively switching a voltage onto said second signal path means, and (3) a programmed microcomputer system means including (a) a plurality of output signalling means connected to said first function means and to said switching means and (b) a plurality of input signalling means connected to said second function means and said decoding means, said microcomputer system means generating on said output signalling means connected to said switching means a frequency-shift-keyed control signal in response to signals at said input signalling means, said switching means being shifted between conductive and nonconductive states in response to the control signal thereby to couple the frequency-shift-keyed signals onto the second signal path means.

20. A multifunction telephone as recited in claim 19 wherein the control data is conveyed over the second signal path means in a message comprising a predetermined timed sequence of binary digits including a leader for enabling a said decoding means to decode incoming frequency-shift-keyed signals, a start digit for synchronizing said decoding means to the incoming message, a predetermined plurality of data digits representing the control data, a parity digit representing the parity of the data digits, and a stop digit for indicating the termination of the message and wherein said microcomputer system means includes means for responding to a message from the second signal path means and means for generating the messages for transfer onto the second signal path means.

21. A multifunction telephone as recited in claim 19 wherein said decoding means comprises (1) filter means for receiving frequency-shift-keyed signals from the second signal path means, (2) lock detection means for generating a lock detection signal when said filter means receives frequency-shift-keyed signals, and (3) frequency-shift-keyed demodulation means connected to said filter means and to said lock detection means for generating a serial digital data signal in response to the signal on the second signal path means, said microcomputer system means receiving the serial digital data signals and assembling the control data from the common equipment means.

22. A multifunction telephone as recited in claim 21 wherein said microcomputer system means generates status data in response to the assembled control data from the common equipment means and includes storage means for the assembled status data and means for initiating the transfer of a status message including the status data as frequency-shift-keyed signals.

23. A multifunction telephone as recited in claim 22 wherein said microcomputer system means includes (1) variable timer means for generating periodic timing signals after a time period determined by a time value, (2) program storage means for storing a first block of instructions that enable said microcomputer system means to control said first function means and to monitor said second function means, (3) program storage means for storing a second block of instructions that enable the microcomputer system means to respond to the lock detection signal at a corresponding one of said input signalling means by transferring a time value to said variable timer means and by disabling further response to said lock detection means, and (4) program storage means for storing a third block of instructions that are processed each time said variable timer means generates its periodic timing signal and that enable said microcomputer system means to assemble the incoming message from said decoding means and to thereafter transmit the status message, said third block of instructions further enabling response to the signal detection means after the status message is transferred.

24. A multifunction telephone as recited in claim 23 wherein said microcomputer system means includes data memory means for storing transfer status and wherein instructions in each of said first, second, and third blocks of instructions enable said microcomputer system means to alter the transfer status in said data memory means.

25. A multifunction telephone for use in a telephone network wherein the telephone network comprises common equipment means for controlling the network that includes (1) means for generating and receiving control data as frequency-shift-keyed data signals, (2) means for generating and receiving voice signals, and (3) first and second signal path means for the voice signals and the frequency-shift-keyed modulated signals respectively, said multifunction telephone comprising:
  A. acoustic conversion means connected to said first signal path for converting acoustic information between an audible form and an electrical form for transfer between said telephone means and said first signal path,
  B. at least one first function means for performing a predetermined function in response to the control data when it is constituted by electrical digital signals,
  C. at least one second function means for generating electrical digital signals corresponding to control data to be transferred to the central telephone control means,
  D. decoding means for generating electrical digital signals in response to frequency-shift-keyed signals thereby to control said first function means, and
  E. encoding means including (1) controllable voltage source means for generating a voltage onto said second signal path means in response to a control signal, and (2) a programmed microcomputer system means including (a) a plurality of output signalling means connected to said first function means and to said controllable voltage source, (b) a plurality of input signalling means connected to said second function means, and (c) program storage means for storing first instructions that enable said microcomputer system means to monitor signals at said input signalling means and to produce signals at said output signalling means thereby to monitor said second function means and to control said first function means and second instructions that enable said microcomputer system means to generate frequency-shift-keyed signals at said output signalling means connected to said controllable voltage source means whereby said microcomputer system means generates frequency-shift-keyed signals concurrently with its monitoring and controlling.

26. A multifunction telephone as recited in claim 25 wherein one of said first function means comprises (1) a plurality of visual indicating means connected in a matrix having column conductors and row conductors, (2) a voltage source for producing a voltage, and (3) column selection switches for selectively coupling the voltage to said column conductors and wherein said output signalling means includes column selection signalling means connected to said column selection switches and row selection signalling means connected to said row conductors thereby to selectively energize said visual indicating means.

27. A multifunction telephone as recited in claim 25 wherein one of said first function means comprises (1) speaker means for broadcasting signals, (2) amplifier means connected to said acoustic conversion means and said speaker means for energizing said speaker means, and (3) amplifier switching means connected to said amplifier means for controlling the coupling of signals through said amplifier means and wherein said output signalling means includes amplifier control output signalling means connected to said amplifier switching means for controlling the broadcast of acoustic information by said speaker means.

28. A multifunction telephone as recited in claim 25 wherein one of said first function means comprises (1) a transducer means for generating a ringing tone, (2) ringer circuit means including an enabling input and a tone output connected to said transducer means for driving said transducer means, and (3) switching means connected to said enabling input for selectively enabling said ringer circuit means and wherein said output signalling means includes a ringer control output signalling means that connects to said switching means thereby to control the operation of said ringing circuit means.

29. A multifunction telephone as recited in claim 28 wherein said ringing circuit means includes means for producing a plurality of ringing frequencies for driving said transducer means and selector switching means for controlling the frequency to be generated by said ringing circuit means and wherein said output signalling means includes a ringer frequency control output signalling means for controlling the selection of said ringing means frequencies.

30. A multifunction telephone as recited in claim 25 wherein said acoustic conversion means includes a handset, support means for the handset, and hook switch means connected to said support means for indicating the presence of said handset on said support means, wherein one of said second function means includes switching means for operating in parallel with said hook switch means and wherein said output signalling means includes an off hook output signalling means for controlling conduction through said switching means thereby to control the state of a signal from said hook switch independently of the position of said handset.

31. A multifunction telephone as recited in claim 25 wherein one of said second function means comprises a dial pad means having a plurality of user-activated dial pad switches corresponding to dialed digits and wherein said input signalling means includes dial pad switch identification input signalling means for enabling said microcomputer system means to monitor said dial pad switches.

32. A multifunction telephone as recited in claim 31 wherein said dial pad switches are connected to column conductors and to row conductors in a matrix and wherein said output signalling means includes column output signalling means for selectively energizing said column conductors and wherein said dial switch identification input signalling means connect to said row conductors thereby to identify, for a given column conductor, those of said dial pad switches connected to that column conductor that are activated.

33. A multifunction telephone as recited in claim 25 wherein said acoustic conversion means includes a handset, support means for said handset, and hook switch means for generating a signal indicating the presence of said handset on said support means and wherein said input signalling means includes hook switch input signalling means connected to said hook switch means thereby to monitor the condition of said hook switch means.

34. A multifunction telephone as recited in claim 25 wherein one of said second function means comprises function button means having a plurality of user-activated function buttons and wherein said input signalling means includes function button identification input signalling means for enabling said microcomputer system means to monitor said function buttons.

35. A multifunction telephone as recited in claim 34 wherein said function buttons are connected to column conductors and to row conductors in a matrix and wherein said output signalling means includes column selection output signalling signals for selectively energizing said column conductors and wherein said function button identification input signalling means connect to said row conductors thereby to identify, for a given column conductor, those of the function buttons connected to that column conductor that are activated.

36. A multifunction telephone as recited in claim 25 wherein said controllable voltage source means includes a voltage source for generating a voltage and switching means connecting said voltage source to said second signal path means for selectively switching a voltage onto said second signal path means in response to the control voltage from said microcomputer system means, said switching means being shifted between conductive and nonconductive states in response to the control signal thereby to couple the frequency-shift-keyed signals onto said second signal path means.

37. A multifunction telephone as recited in claim 25 additionally including power source means including switching power supply means for generating a power supply voltage and first and second connection means for connecting said power supply means to the first and second signal path means, respectively, whereby said power supply means is energized from the first and second signal path means and said power supply means energizes all said means in said multifunction telephone.

38. A multifunction telephone as recited in claim 37 additionally including power circuit means for generating a first voltage in response a commercial power supply means and switching means connected to said power circuit means and to the first and second signal path means for selectively energizing said power supply means from the first and second signal paths and from said power circuit means.

* * * * *